US012421946B2

(12) United States Patent
Janecek et al.

(10) Patent No.: US 12,421,946 B2
(45) Date of Patent: Sep. 23, 2025

(54) PUMP DRIVE SYSTEM

(71) Applicant: Graco Minnesota Inc., Minneapolis, MN (US)

(72) Inventors: Thomas F. Janecek, Flagstaff, AZ (US); Tyler Kenneth Williams, Flagstaff, AZ (US); Andrew J. Kopel, Stanchfield, MN (US); Jarrod C. Drexler, Monticello, MN (US); Douglas S. Ryder, Buffalo, MN (US); Jacob D. Scherer, Clearlake, MN (US); Todd B. Hillukka, Buffalo, MN (US); Nicholas J. Stein, Roger, MN (US); Mark D. Shultz, Ham Lake, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 625 days.

(21) Appl. No.: 17/711,464

(22) Filed: Apr. 1, 2022

(65) Prior Publication Data

US 2022/0220950 A1 Jul. 14, 2022

Related U.S. Application Data

(63) Continuation of application No. 17/313,677, filed on May 6, 2021, now Pat. No. 11,300,112, which is a (Continued)

(51) Int. Cl.

*F04B 17/03* (2006.01)
*B05B 9/00* (2006.01)

(Continued)

(52) U.S. Cl.

CPC ................ *F04B 17/03* (2013.01); *B05B 9/00* (2013.01); *F04B 15/02* (2013.01); *F04B 35/04* (2013.01);

(Continued)

(58) Field of Classification Search

CPC ........ F04B 17/03; F04B 49/065; F04B 43/04; F04B 2203/0201; F04B 35/04; F04B 53/16; F04B 2205/05; F04B 49/06; B05B 9/00

See application file for complete search history.

(56) References Cited

U.S. PATENT DOCUMENTS 1,865,350 A 6/1932 William
2,286,263 A 6/1942 Comins (Continued)

FOREIGN PATENT DOCUMENTS

CN 87202952 U 3/1988
CN 2262110 Y 9/1997

(Continued)

OTHER PUBLICATIONS

International Search Report and Written Opinion for PCT Application No. PCT/US2021/025086, Dated Aug. 31, 2021, pp. 25.

(Continued)

*Primary Examiner* — Peter J Bertheaud
(74) *Attorney, Agent, or Firm* — Kinney & Lange, P.A.

(57) ABSTRACT

A drive system for a fluid displacement pump includes an electric motor, a drive coupled to the rotor at a first end of the electric motor, a pump including a fluid displacement member mechanically coupled to the drive, and a controller configured to control a level of power to the electric motor based on a pressure setting set by a user. The electric motor includes a stator and a rotor disposed on an axis. The drive coupled to the rotor converts the rotational output to a linear, reciprocating input to power a pump.

19 Claims, 18 Drawing Sheets

Related U.S. Application Data continuation of application No. PCT/US2021/025086, filed on Mar. 31, 2021.

(60) Provisional application No. 63/088,810, filed on Oct. 7, 2020, provisional application No. 63/002,681, filed on Mar. 31, 2020, provisional application No. 63/002,676, filed on Mar. 31, 2020, provisional application No. 63/002,691, filed on Mar. 31, 2020, provisional application No. 63/002,687, filed on Mar. 31, 2020.

(51) Int. Cl.

| | |
|---|---|
| ***F04B 9/04*** | (2006.01) |
| ***F04B 15/02*** | (2006.01) |
| ***F04B 35/04*** | (2006.01) |
| ***F04B 43/04*** | (2006.01) |
| ***F04B 49/06*** | (2006.01) |
| ***F04B 53/00*** | (2006.01) |
| ***F04B 53/14*** | (2006.01) |
| ***F04B 53/16*** | (2006.01) |

(52) U.S. Cl.

CPC .............. *F04B 43/04* (2013.01); *F04B 49/06* (2013.01); *F04B 49/065* (2013.01); *F04B 53/16* (2013.01); *F04B 9/042* (2013.01); *F04B 53/006* (2013.01); *F04B 53/146* (2013.01); *F04B 53/147* (2013.01); *F04B 2203/0201* (2013.01); *F04B 2205/05* (2013.01); *F04B 2205/09* (2013.01); *F04B 2207/703* (2013.01)

(56) References Cited

U.S. PATENT DOCUMENTS

| | | | | |
|---|---|---|---|---|
| 2,464,936 | A | 3/1949 | Mcconaghy | |
| 2,737,817 | A | 3/1956 | Harris et al. | |
| 2,821,404 | A | 1/1958 | Sloan | |
| 2,844,103 | A | 7/1958 | Allen | |
| 3,414,302 | A | 12/1968 | Priest | |
| 3,501,180 | A | 3/1970 | Waara | |
| 3,670,630 | A | 6/1972 | Tyson et al. | |
| 3,814,086 | A | 6/1974 | Lemb | |
| 3,857,642 | A | 12/1974 | Miller | |
| 3,967,542 | A | 7/1976 | Hall et al. | |
| 4,060,351 | A | 11/1977 | Cloup | |
| 4,348,159 | A | 9/1982 | Acheson | |
| 4,397,610 | A * | 8/1983 | Krohn | G05D 16/2066 307/118 |
| 4,511,276 | A | 4/1985 | Doutt | |
| 4,635,621 | A | 1/1987 | Atkinson | |
| 4,637,193 | A | 1/1987 | Lange | |
| 4,681,516 | A | 7/1987 | OHara et al. | |
| 4,696,211 | A | 9/1987 | Bitzel | |
| 4,749,300 | A | 6/1988 | Berger et al. | |
| 5,061,077 | A | 10/1991 | Whiteman | |
| 5,122,032 | A | 6/1992 | Shields et al. | |
| 5,128,688 | A | 7/1992 | West | |
| 5,135,329 | A | 8/1992 | Yuda | |
| 5,253,981 | A | 10/1993 | Yang et al. | |
| 5,407,292 | A | 4/1995 | Collins | |
| 5,413,031 | A | 5/1995 | Kohlmeyer | |
| 5,440,282 | A | 8/1995 | Devendorf et al. | |
| 5,509,766 | A | 4/1996 | Leuschner | |
| 5,525,515 | A | 6/1996 | Blattner | |
| 5,711,709 | A | 1/1998 | McCoy | |
| D390,923 | S | 2/1998 | Stevens | |
| 5,751,125 | A | 5/1998 | Weiss | |
| 5,939,813 | A | 8/1999 | Schoeb | |
| 6,032,349 | A | 3/2000 | Wagner et al. | |
| 6,183,225 | B1 | 2/2001 | Thompson | |
| 6,212,998 | B1 | 4/2001 | Thompson et al. | |
| 6,428,287 | B1 | 8/2002 | Denkins et al. | |
| 6,533,488 | B2 | 3/2003 | Blenkush et al. | |
| 6,609,646 | B2 | 8/2003 | Miller et al. | |
| 6,764,284 | B2 | 7/2004 | Oehman | |
| 6,994,500 | B2 | 2/2006 | Ward et al. | |
| 7,036,752 | B1 | 5/2006 | Hsiang | |
| 7,112,025 | B2 | 9/2006 | Ward et al. | |
| 7,448,857 | B1 | 11/2008 | Fugere | |
| 7,568,874 | B2 | 8/2009 | Riedel et al. | |
| 7,626,308 | B2 | 12/2009 | Kang et al. | |
| 7,918,654 | B2 | 4/2011 | Adahan | |
| 8,083,470 | B2 | 12/2011 | Yu et al. | |
| 8,167,583 | B2 | 5/2012 | Harnetiaux et al. | |
| 8,177,524 | B1 | 5/2012 | Kieffer et al. | |
| 8,405,275 | B2 | 3/2013 | Calley et al. | |
| 8,581,866 | B2 | 11/2013 | Park et al. | |
| 8,602,751 | B2 | 12/2013 | Courier | |
| 9,068,567 | B2 | 6/2015 | Hitter et al. | |
| 9,385,572 | B2 | 7/2016 | Lu et al. | |
| 2001/0029838 | A1 | 10/2001 | Blenkush et al. | |
| 2002/0079016 | A1 | 6/2002 | Webb | |
| 2003/0161746 | A1 | 8/2003 | Asayama et al. | |
| 2005/0089427 | A1 | 4/2005 | Riley et al. | |
| 2006/0162549 | A1 | 7/2006 | Wang | |
| 2006/0292016 | A1 | 12/2006 | Hitter et al. | |
| 2007/0272075 | A1 | 11/2007 | Nathan | |
| 2008/0286120 | A1 | 11/2008 | Noord | |
| 2010/0034666 | A1 | 2/2010 | Sidlyarevich et al. | |
| 2012/0291920 | A1 | 11/2012 | Grisley | |
| 2013/0039789 | A1 | 2/2013 | Donado-Munoz | |
| 2013/0078123 | A1 | 3/2013 | Fukasaku et al. | |
| 2013/0078125 | A1 | 3/2013 | Headley et al. | |
| 2013/0183173 | A1 | 7/2013 | Kohli et al. | |
| 2013/0233421 | A1 | 9/2013 | Furet et al. | |
| 2013/0256426 | A1 | 10/2013 | Becker et al. | |
| 2014/0034754 | A1 | 2/2014 | Thompson et al. | |
| 2014/0219819 | A1 | 8/2014 | Roman et al. | |
| 2015/0226192 | A1 | 8/2015 | Hines et al. | |
| 2016/0001624 | A1 | 1/2016 | Meissner et al. | |
| 2017/0122304 | A1 | 5/2017 | Funabashi et al. | |
| 2017/0149304 | A1 | 5/2017 | Li et al. | |
| 2017/0198690 | A1 | 7/2017 | Johnston et al. | |
| 2018/0106244 | A1 | 4/2018 | Wang et al. | |

FOREIGN PATENT DOCUMENTS

| | | | |
|---|---|---|---|
| CN | 2473348 | Y | 1/2002 |
| CN | 1714236 | A | 12/2005 |
| CN | 1298990 | C | 2/2007 |
| CN | 201041118 | Y | 3/2008 |
| CN | 201189501 | Y | 2/2009 |
| CN | 101617162 | A | 12/2009 |
| CN | 201827066 | U | 5/2011 |
| CN | 102202802 | A | 9/2011 |
| CN | 103298564 | A | 9/2013 |
| CN | 103814213 | A | 5/2014 |
| CN | 105121867 | A | 12/2015 |
| CN | 105673378 | A | 6/2016 |
| CN | 106787418 | A | 5/2017 |
| CN | 106795872 | A | 5/2017 |
| CN | 109496250 | A | 3/2019 |
| DE | 4300512 | A1 | 7/1994 |
| EP | 0799672 | A1 | 10/1997 |
| EP | 3299622 | A1 | 3/2018 |
| FR | 2681646 | A1 | 3/1993 |
| GB | 1408095 | A | 10/1975 |
| JP | 2000145577 | A | 5/2000 |
| JP | 2011220223 | A | 11/2011 |
| KR | 200296106 | Y1 | 11/2002 |
| WO | WO9012962 | A1 | 11/1990 |
| WO | 03002257 | A2 | 1/2003 |
| WO | 2006037671 | A1 | 4/2006 |
| WO | 2009076429 | A2 | 6/2009 |
| WO | WO2010066754 | A1 | 6/2010 |
| WO | 2011162822 | A2 | 12/2011 |
| WO | WO2015127497 | A1 | 9/2015 |
| WO | 2016100197 | A1 | 6/2016 |
| WO | 2016100707 | A1 | 6/2016 |

(56) References Cited

OTHER PUBLICATIONS

Invitation to Pay Additional Fees for PCT Application No. PCT/US2021/025121, Dated May 14, 2021, pp. 15.
Invitation to Pay Additional Fees for PCT Application No. PCT/US2021/025132, Dated Jun. 21, 2021, pp. 15.
motorcontroltips.com: Halbach array What is it and how is it used in electric motors pdf from motioncontroltips.com/what-is-halbach-array-and-how-is-it-used-in-electric-motors/ (Year:2021).
Invitation to Pay Additional Fees for PCT Application No. PCT/US2021/025086, Dated Jul. 7, 2021, pp. 18, 18.
First Chinese Office Action for CN Application No. 202180025720.1, Dated Apr. 3, 2024, pp. 16.
International Preliminary Report on Patentability for PCT Application No. PCT/US2021/025086, Dated Oct. 13, 2022, pp. 19.
Second Chinese Office Action for CN Application No. 202180025720.1, Dated Oct. 25, 2024, pp. 16.
Extended European Search Report for European Patent Application No. 25159034.5, dated Apr. 4, 2025, 14 pages.

* cited by examiner

PUMP DRIVE SYSTEM

CROSS-REFERENCE TO RELATED APPLICATIONS

This application is a continuation of U.S. application Ser. No. 17/313,677 filed May 6, 2021 for "PUMP DRIVE SYSTEM," which in turn is a continuation of International PCT Application No. PCT/US2021/025086 Filed Mar. 31, 2021, which claims the benefit of U.S. Provisional Application No. 63/002,676 filed Mar. 31, 2020, and entitled "OUTER ROTATOR DRIVEN PUMP," and claims the benefit of U.S. Provisional Application No. 63/002,681 filed Mar. 31, 2020, and entitled "EXOSKELETON FRAME FOR PUMP DRIVE SYSTEM," and claims the benefit of U.S. Provisional Application No. 63/002,687 filed Mar. 31, 2020, and entitled "ECCENTRIC ROTATOR DRIVEN PUMP," and claims the benefit of U.S. Provisional Application No. 63/002,691 filed Mar. 31, 2020, and entitled "INTEGRATED PUMP-MOTOR BEARINGS," and claims the benefit of U.S. Provisional Application No. 63/088,810 filed Oct. 7, 2020, and entitled "FLUID SPRAYER HAVING RESPONSIVE MOTOR CONTROL," the disclosures of which are hereby incorporated by reference in their entireties.

BACKGROUND

The present disclosure relates generally to fluid displacement systems and, more particularly, to drive systems for reciprocating fluid displacement pumps.

Fluid displacement systems, such as fluid dispensing systems for paint, typically utilize positive displacement pumps such as axial displacement pumps to pull a fluid from a container and to drive the fluid downstream. The axial displacement pump is typically mounted to a drive housing and driven by a motor. A pump rod is attached to a reciprocating drive that drives reciprocation of the pump rod, thereby pulling fluid from a container into the pump and then driving the fluid downstream from the pump. In some cases, electric motors can power the pump. The electric motor is attached to the pump via a gear reduction system that increases the torque of the motor.

SUMMARY

In one example, a fluid displacement pump assembly includes an electric motor, a drive, a pump having a fluid displacement member, and a pump frame. The electric motor includes a stator and a rotor. The stator and rotor are disposed on an axis. The drive is coupled to the rotor at a first end of the electric motor. The fluid displacement member is mechanically coupled to the drive. The drive converts the rotational output to a linear, reciprocating input to the fluid displacement member. The pump frame is mechanically coupled to the electric motor.

In another example, a method of driving a reciprocating pump includes powering an electric motor to cause rotation of a rotor of the motor, receiving a rotational output from the rotor at a drive connected to the rotor, translating the rotational output, by the drive, to linear, reciprocating motion, providing, by the drive, a linear reciprocating input to a fluid displacement member connected to the drive to cause the pump rod to pump fluid by reciprocation, and mechanically supporting, by a pump frame, the reciprocating pump and the electric motor.

In yet another example, a pumping system includes an electric motor, a drive, a pump, and a pump frame. The electric motor includes a stator and a rotor. The stator and rotor are disposed on an axis. The drive is coupled to the rotor to receive a rotational output from the rotor and convert the rotational output to linear reciprocating motion. The pump includes a piston and a cylinder. The piston receives the linear reciprocating motion from the drive to reciprocate the piston within the cylinder. The cylinder and the stator are connected to the pump frame to stabilize both the stator relative to the rotor and the cylinder relative to the piston.

In yet another example, a drive system for a reciprocating fluid displacement pump includes an electric motor, a drive, and a fluid displacement member. The motor includes a stator defining an axis and a rotor disposed coaxially around the stator. The drive is directly connected to the rotor to receive a rotational output from the rotor. The fluid displacement member is mechanically coupled to the drive. The drive member converts the rotational output to a linear, reciprocating input to the fluid displacement member.

In yet another example, a method of driving a reciprocating pump includes powering an electric motor to cause rotation of a rotor of the motor, the rotor disposed outside of and around a stator of the motor, receiving a rotational output from the rotor at a drive directly connected to the rotor, translating the rotational output, by the drive, directly to linear, reciprocating motion, and providing, by the drive, a linear reciprocating input to a fluid displacement member connected to the drive to cause the pump rod to pump fluid by reciprocation.

In yet another example, a fluid displacement apparatus includes an electric motor, a drive, a pump, and a pump frame. The motor includes a stator defining an axis and a rotor disposed around the stator. The drive is connected to the rotor to receive a rotational output from the rotor and convert the rotational output to linear reciprocating motion. The pump includes a piston and a cylinder, the piston receiving the linear reciprocating motion from the drive to reciprocate the piston within the cylinder. The cylinder and the stator are connected to the pump frame to stabilize both the stator relative to the rotor and the cylinder relative to the piston.

In yet another example, a drive system for a reciprocating fluid displacement pump includes an electric motor, a drive, a fluid displacement member, and a support frame. The electric motor includes a stator disposed on an axis and supported by an axle and a rotor disposed coaxially around the stator. The drive is directly connected to the rotor to receive a rotational output from the rotor. The fluid displacement member is mechanically coupled to the drive, wherein the drive is configured to convert the rotational output to a linear, reciprocating input to the fluid displacement member. The support frame is configured to mechanically support the electric motor and the fluid displacement pump, wherein the support frame is mechanically coupled to the stator.

In yet another example, a support frame for a reciprocating fluid displacement pump drive system having an electric motor with an inner stator and an outer rotor includes a first frame member, a second frame member, and at least one connecting member. The second frame member is disposed at an opposite end of the electric motor from the first frame member and separated from the first frame member. The at least one connecting member extends between and connecting the first frame member and the second frame member. The second frame member and the at least one connecting member are configured to at least partially house and to mechanically support the electric motor with the outer rotor.

In yet another example, fluid displacement apparatus includes an electric motor extending along an axis to have a first end and a second end, a drive, a pump, a pump frame, and a motor frame. The electric motor includes a stator extending along the axis and a rotor disposed around the stator and extending along the axis. The drive is connected to the rotor to receive a rotational output from the rotor and convert the rotational output to linear reciprocating motion. The pump includes a piston and a cylinder, the piston receiving the linear reciprocating motion from the drive to reciprocate the piston within the cylinder. The cylinder and the stator are connected to the pump frame to stabilize the cylinder relative to the piston. The motor frame that stabilizes stator. The motor frame includes a plurality of connecting members that extend from the first end of the motor to the second end of the motor. The plurality of connecting members are arrayed around the rotor.

In yet another example, a drive system for a reciprocating pump for pumping fluid includes an electric motor and a drive. The electric motor includes a rotor. The rotor includes an eccentric drive member extending from the rotor. The drive is directly coupled to the eccentric drive member and is configured to drive reciprocation of a fluid displacement member.

In yet another example, a method of driving a reciprocating pump includes powering an electric motor to cause rotation of a rotor on a rotational axis, providing rotational output of an electric motor directly to a drive, providing, by the drive, a linear reciprocating input to a pump rod of the pump, and spraying a fluid from the fluid displacement pump onto a surface. For one revolution of the rotor, the fluid displacement pump proceeds through one pump cycle.

In yet another example, a pumping system includes and electric motor, a drive, and a reciprocating pump. The electric motor includes a rotor. The rotor includes an eccentric drive member extending from the rotor. The drive is directly coupled to the eccentric drive member. The reciprocating pump includes a fluid displacement member coupled to the drive and a pump cylinder at least partially housing the fluid displacement member. The drive is configured to drive reciprocation of the fluid displacement member.

In yet another example, a drive system for powering a reciprocating pump for pumping fluid to generate a fluid spray includes an electric motor, an eccentric drive member, and a drive. The electric motor includes a stator and a rotor. The rotor is configured to rotate on a rotational axis. The eccentric drive member extends from the rotor. The drive is coupled to the eccentric driver and is configured to drive reciprocation of a fluid displacement member.

In yet another example, a method of driving a reciprocating pump for generating a pressurized fluid spray for spraying onto a surface includes powering an electric motor to cause rotation of a rotor on a rotational axis, providing a rotational output from the rotor to a drive, and providing, by the drive, a linear reciprocating input to a fluid displacement member of the pump to cause reciprocation of the fluid displacement member along a pump axis to pump fluid. The rotor is connected to the fluid displacement member by the drive such that for one revolution of the rotor the fluid displacement pump proceeds through one pump cycle.

In yet another example, a pumping system for pumping a fluid to generate a pressurized fluid spray includes an electric motor, an eccentric drive member, a drive, and a reciprocating pump. The electric motor includes a stator and a rotor. The rotor is configured to rotate on a rotational axis. The eccentric drive member extends from the rotor. The drive is coupled to the eccentric drive member to receive a rotational output from the rotor. The reciprocating pump includes a fluid displacement member coupled to the drive and a pump cylinder at least partially housing the fluid displacement member. The drive is configured to receive the rotational output from the motor and convert the rotational output into a linear reciprocating motion to drive reciprocation of the fluid displacement member.

In yet another example, a drive system for a fluid displacement pump includes an electric motor, a drive, a fluid displacement member, and a pump frame. The electric motor includes a stator and a rotor. The stator and rotor are disposed on an axis. The drive is coupled to the rotor at a first end of the electric motor. The fluid displacement member is mechanically coupled to the drive, such that the electric motor experiences a pump load generated by reciprocation of the fluid displacement member during pumping. The pump frame is mechanically coupled to the electric motor and configured to support the fluid displacement pump and the electric motor.

In yet another example, a drive system for a reciprocating fluid displacement system includes an electric motor, a drive, a fluid displacement member, and a pump frame. The electric motor includes a stator and a rotor. The stator and rotor are disposed on an axis. The drive is coupled to the rotor at a first end of the electric motor. The fluid displacement member is mechanically coupled to the drive, wherein the drive converts rotational output from the rotor to linear, reciprocating input to the fluid displacement member. The pump frame is mechanically coupled to the electric motor. The pump reaction forces generated by the fluid displacement member during pumping are transmitted to the pump frame via the drive and the rotor.

In yet another example, a pumping apparatus includes a frame, at least two bearing, an electric motor, a drive, and a pump. The electric motor includes a stator and a rotor configured to output rotational motion. The rotor is supported by the at least two bearings, the at least two bearings supporting rotation of the rotor. The drive is configured to receive the rotational motion and convert the rotational motion into linear reciprocating motion. The pump includes a piston and a cylinder. The piston is configured to receive the linear reciprocating motion to reciprocate within the cylinder through an upstroke and a down stroke. The piston receives a downward reaction force when moving through the up stroke and an upward reaction force when moving through the down stroke. Both of the upward reaction force and the downward reaction force travel through the drive, the rotor, and then to the at least two bearings.

In yet another example, a sprayer includes the drive system of any one of the preceding paragraphs includes a pump and a controller. The pump includes a piston configured to be linearly reciprocated by the drive. The controller is configured to output electrical energy to the electric motor to control operation of the electric motor.

In yet another example, a fluid displacement pump includes an electric motor having a first end and a second end, a drive, and a pump having a fluid displacement member linked to the drive to be reciprocated by the drive. The electric motor includes a stator; and a rotor that rotates about an axis, the stator located radially within the rotor such that the rotor rotates around the stator, the rotor comprising a housing having an opening located on the second end of the electric motor, the housing containing a plurality of magnets that rotate with the housing, and a stator support that extends through the opening to hold the stator stationary while the housing rotates around the stator. The drive is connected to the rotor at the first end of the electric motor, the drive configured to convert rotational output from the rotor to reciprocating motion. The fluid displacement member located closer to the first end of the electric motor than to the second end of the electric motor.

In yet another example, a fluid sprayer includes an electric motor comprising a stator and a rotor; a drive connected to the rotor, the drive configured to convert rotational output from the rotor to reciprocating motion; a pump comprising a fluid displacement member linked to the drive to be reciprocated by the drive; a fluid outlet that sprays the fluid output by the pump; a fluid sensor that outputs a signal indicative of pressure of the fluid output by the pump; and a controller that receives the signal from the fluid sensor and outputs operating power to the stator that causes the rotor to rotate relative to the stator.

The controller configured to deliver a first level of operating power to the stator when the signal indicates that the pressure of the fluid output by the pump is below a pressure setting, the first level of operating power causing the rotor to reciprocate the fluid displacement member via the drive, deliver a second level of operating power to the stator when the signal indicates that the pressure of the fluid output by the pump is one of at or above the pressure setting while the rotor and the fluid displacement member remain stalled while the fluid outlet is closed, the second level of operating power causing the rotor to urge against the drive to cause the fluid displacement member to apply pressure to the fluid while the fluid outlet is closed and the rotor and the fluid displacement member remain stalled.

In yet another example, a fluid sprayer includes an electric motor comprising a stator and a rotor; a drive connected to the rotor, the drive configured to convert rotational output from the rotor to reciprocating motion; a pump comprising a fluid displacement member linked to the drive to be reciprocated by the drive; a fluid outlet that sprays the fluid output by the pump; and a controller that outputs operating power to the stator that causes the rotor to rotate relative to the stator. The controller configured to cause the rotor to reverse rotational direction between two modes in which in a first mode the rotor rotates clockwise making a plurality of consecutive complete revolutions to drive the piston through a first plurality of consecutive pumping strokes, each pumping stroke comprising a fluid intake phase in which the fluid displacement member moves in a first direction and a fluid output phase in which the fluid displacement member moves in a second direction opposite the first direction, and in a second mode the rotor rotates counterclockwise making a plurality of complete consecutive revolutions to drive the piston through a second plurality of consecutive pumping strokes, each pumping stroke comprising the fluid intake phase and the fluid output phase.

The present summary is provided only by way of example, and not limitation. Other aspects of the present disclosure will be appreciated in view of the entirety of the present disclosure, including the entire text, claims, and accompanying figures.

Figure 1B:
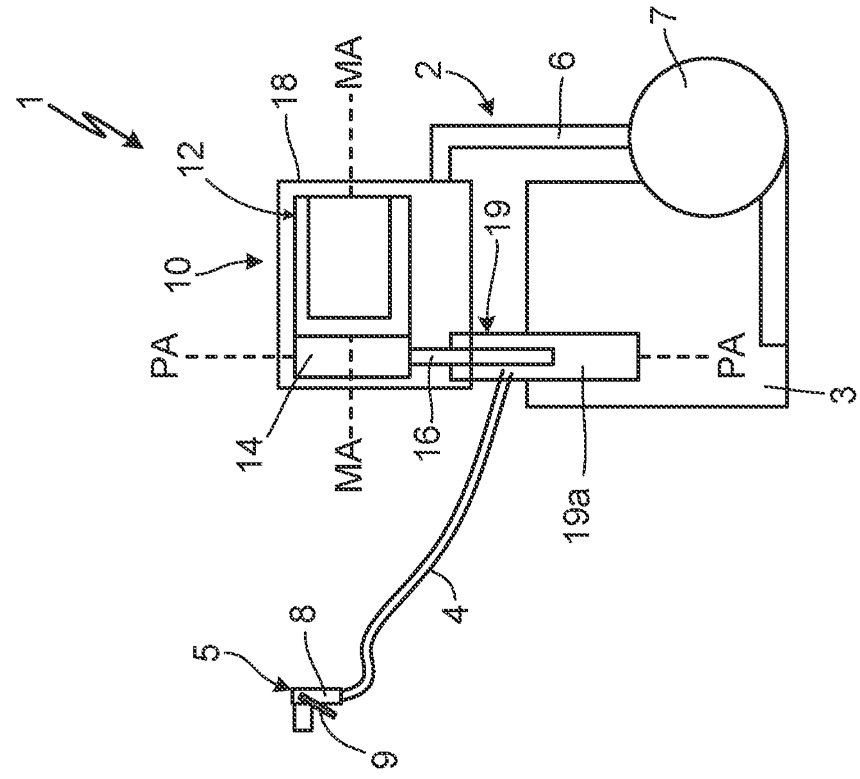
FIG. 1B is a side elevational schematic block diagram of the spray system of FIG. 1A.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

The present disclosure is directed to a drive system for a reciprocating fluid displacement pump. The drive system of the present disclosure has an electric motor with an eccentric driver. The drive member converts rotational output of the rotor to linear, reciprocating input to the fluid displacement member. The rotor can be disposed outside of the stator to rotate about the stator such that the motor is an outer rotator motor.

Figure 1A:
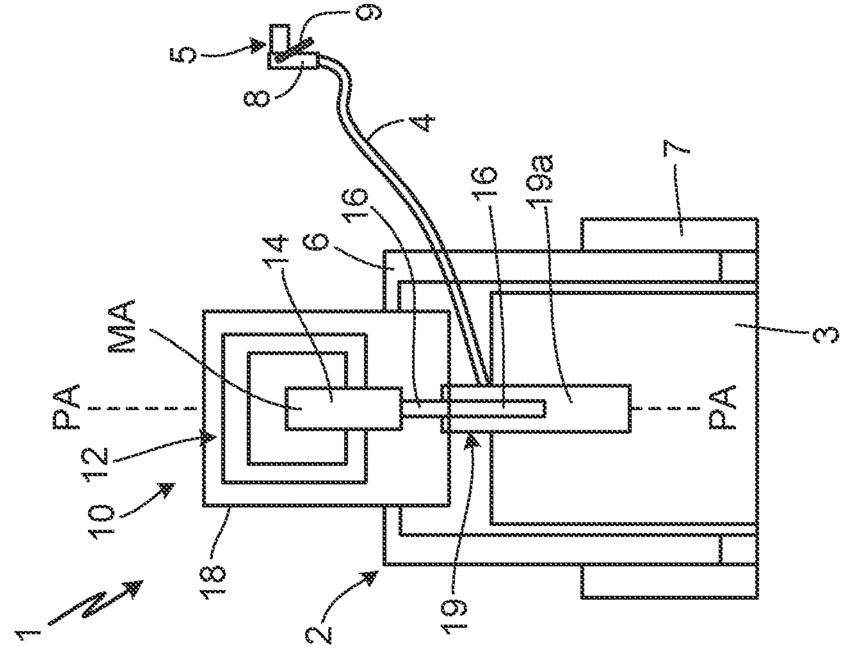
FIG. 1A is a front elevational schematic block diagram of a spray system.

FIG. 1A is a front elevational schematic block diagram of spray system 1. FIG. 1B is a side elevational schematic block diagram of spray system 1. FIGS. 1A and 1B are discussed together. Support 2, reservoir 3, supply line 4, spray gun 5, and drive system 10 are shown. Drive system 10 includes electric motor 12, drive mechanism 14, pump frame 18, and displacement pump 19. Support 2 includes support frame 6 and wheels 7. Fluid displacement member 16 and pump body 19*a* of displacement pump 19 are shown. Spray gun 5 includes a handle 8 and trigger 9.

Spray system 1 is a system for applying sprays of various fluids, examples of which include paint, water, oil, stains, finishes, aggregate, coatings, and solvents, amongst other options, onto a substrate. Drive system 10, which can also be referred to as a pump assembly, can generate high fluid pumping pressures, such as about 3.4-69 megapascal (MPa) (about 500-10,000 pounds per square inch (psi)) or even higher. In some examples, the pumping pressures are in the range of about 20.7-34.5 MPa (about 3,000-5,000 psi). High fluid pumping pressure is useful for atomizing the fluid into a spray for applying the fluid to a surface.

Drive system 10 is configured to draw spray fluid from reservoir 3 and pump the fluid downstream to spray gun 5 for application on the substrate. Support 2 is connected to drive system 10 and supports drive system 10 relative reservoir 3. Support 2 can receive and react loads from drive system 10. For example, support frame 6 can be connected to pump frame 18 to react the loads generated during pumping. Support frame 6 is connected to pump frame 18. Wheels 7 are connected to support frame 6 to facilitate movement between job sites and within a job site.

Pump frame 18 supports other components of drive system 10. Motor 12 and displacement pump 19 are connected to pump frame 18. Motor 12 is an electric motor having a stator and a rotor. Motor 12 can be configured to be powered by any desired power type, such as direct current (DC), alternating current (AC), and/or a combination of direct current and alternating current. The rotor is configured to rotate about a motor axis MA in response to current, such as direct current or alternating current signals, through the stator. In some examples, the rotor can rotate about the stator such that motor 12 is an outer rotator motor. Drive mechanism 14 is connected to motor 12 to be driven by motor 12. Drive mechanism 14 receives a rotational output from motor 12 and converts that rotational output into a linear input along pump axis PA. Drive mechanism 14 is connected to fluid displacement member 16 to drive reciprocation of fluid displacement member 16 along pump axis PA. As illustrated in FIG. 1B, motor axis MA is disposed transverse to pump axis PA. More specifically, motor axis MA can be orthogonal to pump axis PA. In other embodiments, motor 12, drive mechanism 14, and fluid displacement member 16 can be disposed coaxially such that motor axis MA and pump axis PA are coaxial. Fluid displacement member 16 reciprocates within a pump body 19*a*, such as cylinder 94 discussed below, to pump spray fluid from reservoir 3 to spray gun 5 through supply line 4.

During operation, the user can maneuver drive system 10 to a desired position relative the target substrate by moving support 2. For example, the user can maneuver drive system 10 by tilting support frame 6 on wheels 7 and rolling drive system 10 to a desired location. Displacement pump 19 can extend into reservoir 3. Motor 12 provides the rotational input to drive mechanism 14 and drive mechanism 14 provides the linear input to fluid displacement member 16 to cause reciprocation of fluid displacement member 16. Fluid displacement member 16 draws the spray fluid from reservoir 3 and drives the spray fluid downstream through supply line 4 to spray gun 5. The user can manipulate spray gun 5 by grasping the handle 8 of the spray gun 5, such as with a single hand of the user. The user causes spraying by actuating trigger 9. In some examples, the pressure generated by drive system 10 atomizes the spray fluid exiting spray gun 5 to generate the fluid spray. In some examples, spray gun 5 is an airless sprayer. In some examples, a handle can extend from drive system 10 and the user can maneuver drive system 10 within a job site or between job sites by grasping the handle and carrying drive system 10.

Figure 2:
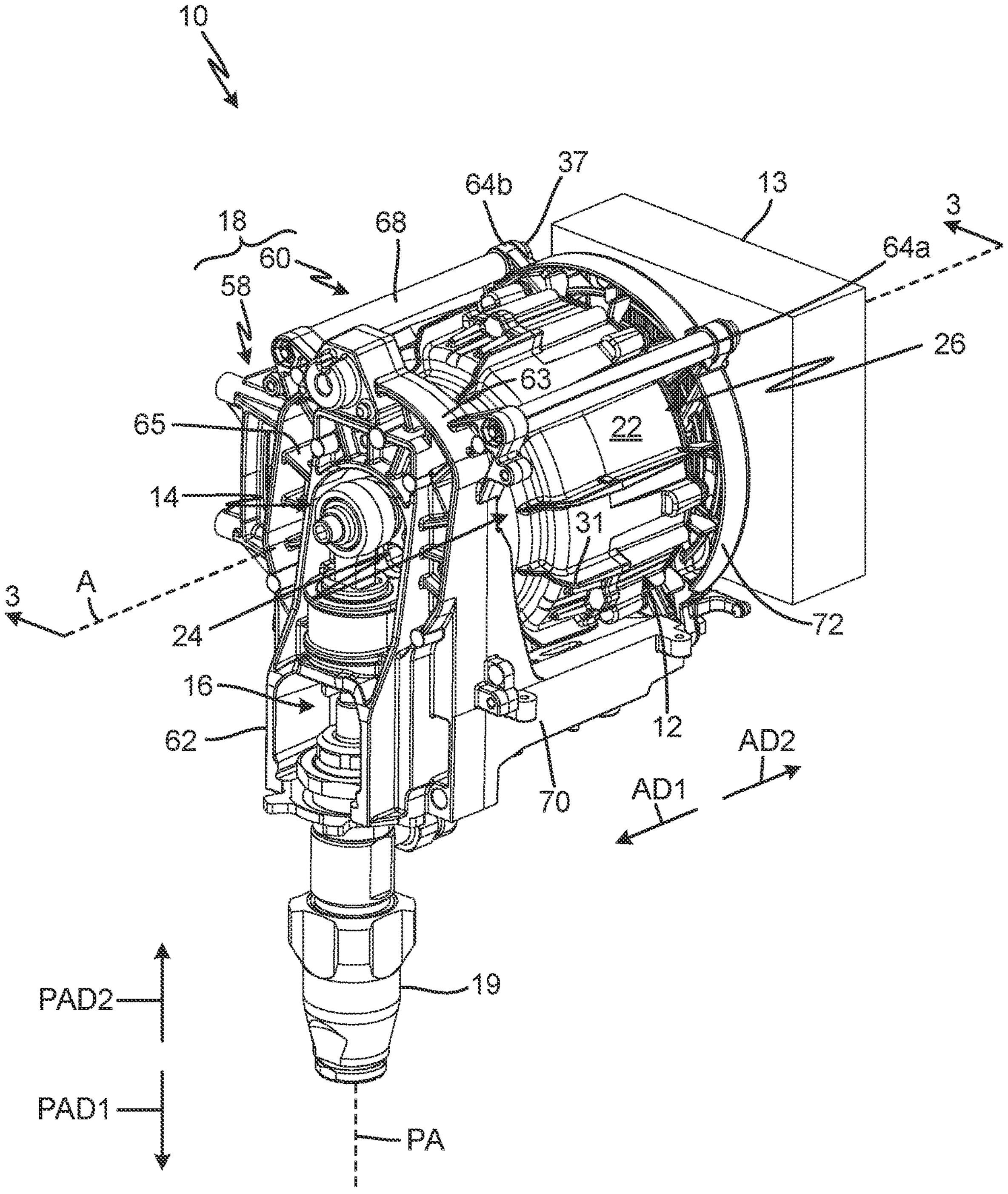
FIG. 2 is an isometric front side view of a drive system and displacement pump.
Figure 3:
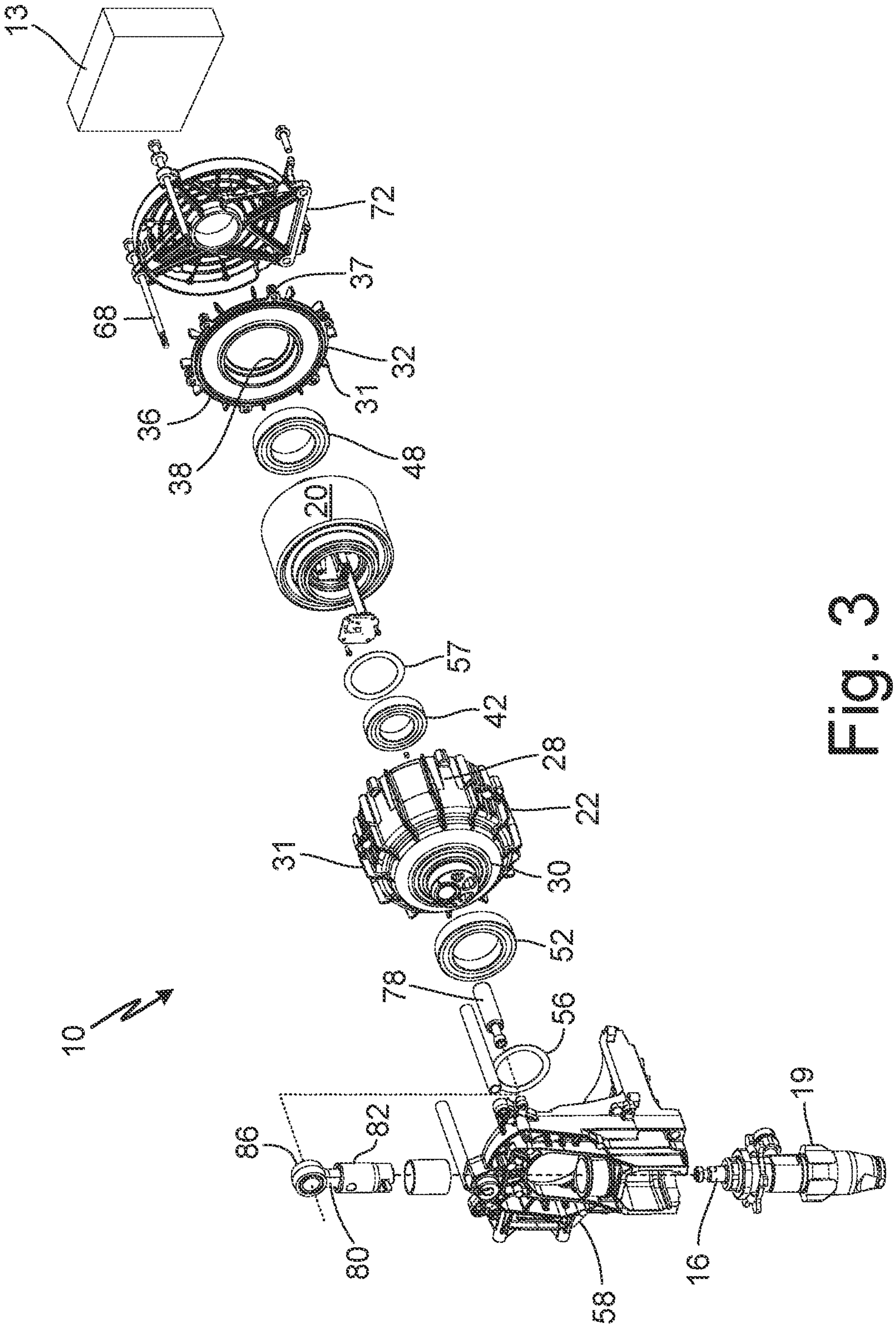
FIG. 3 is an exploded view of the drive system and displacement pump of FIG. 2.
Figure 4:
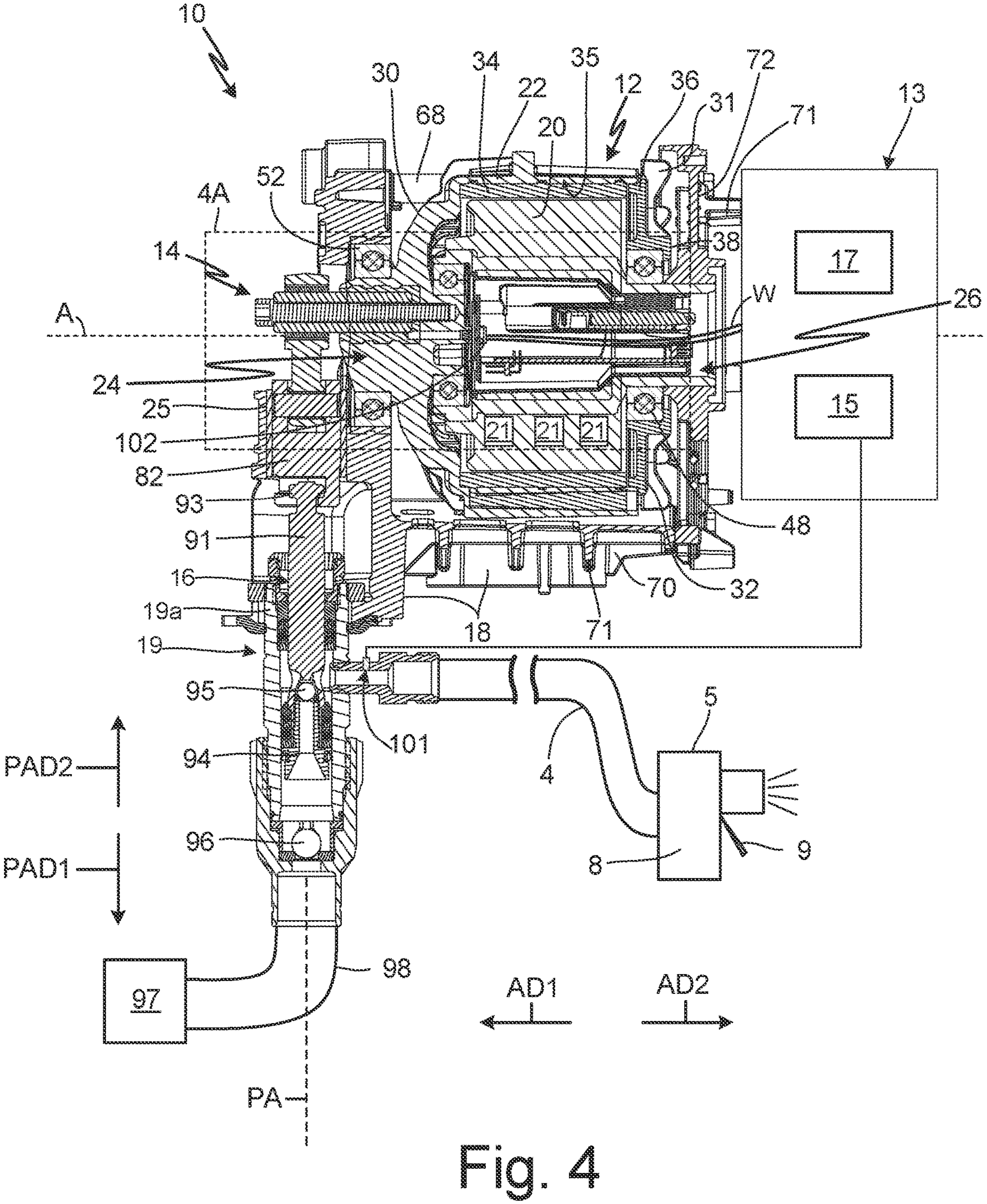
FIG. 4 is cross-sectional view of the drive system and displacement pump taken along the line 4-4 of FIG. 2.
Figure 4A:
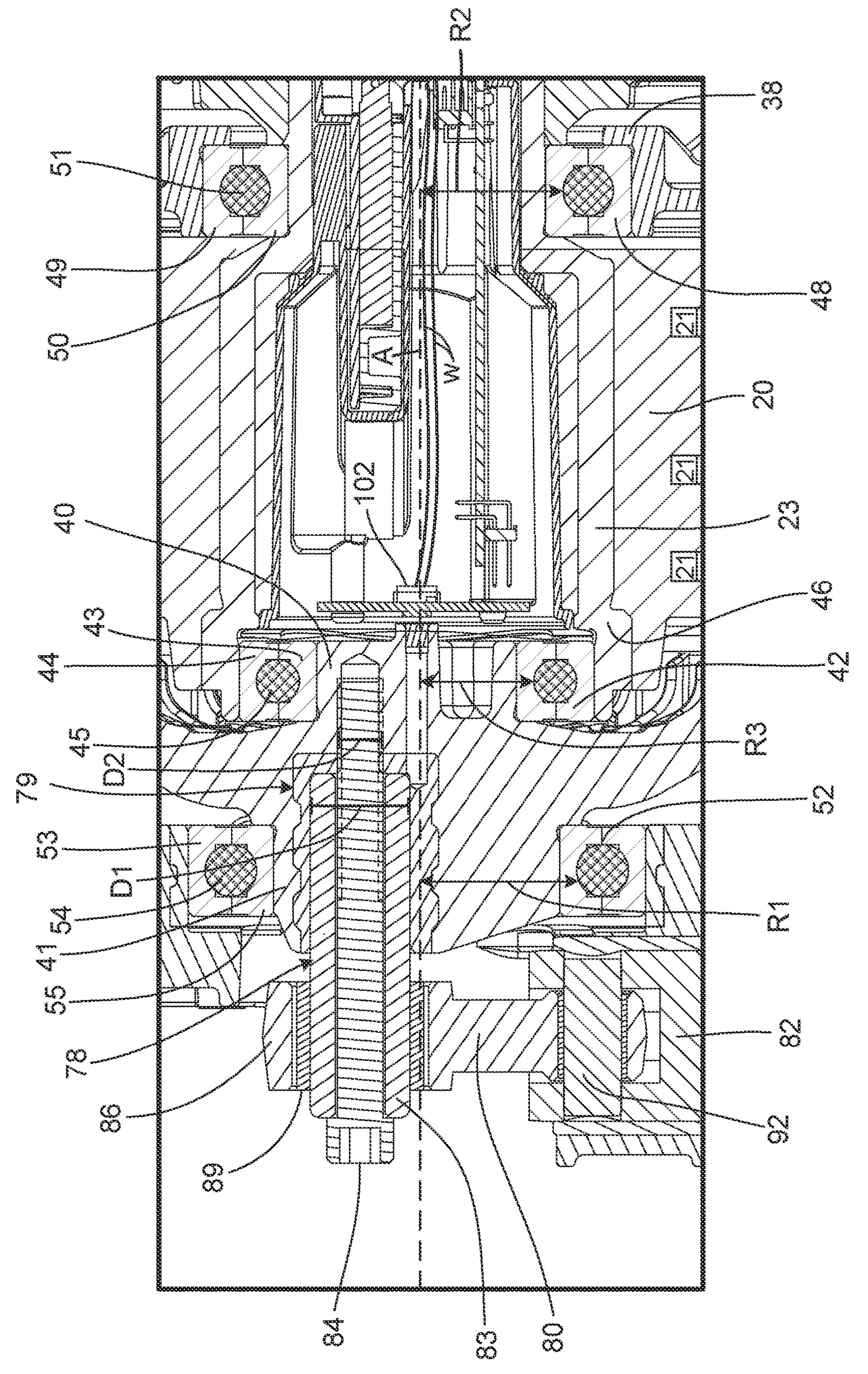
FIG. 4A is an enlarged view of portion 4A of FIG. 4.
Figure 5:
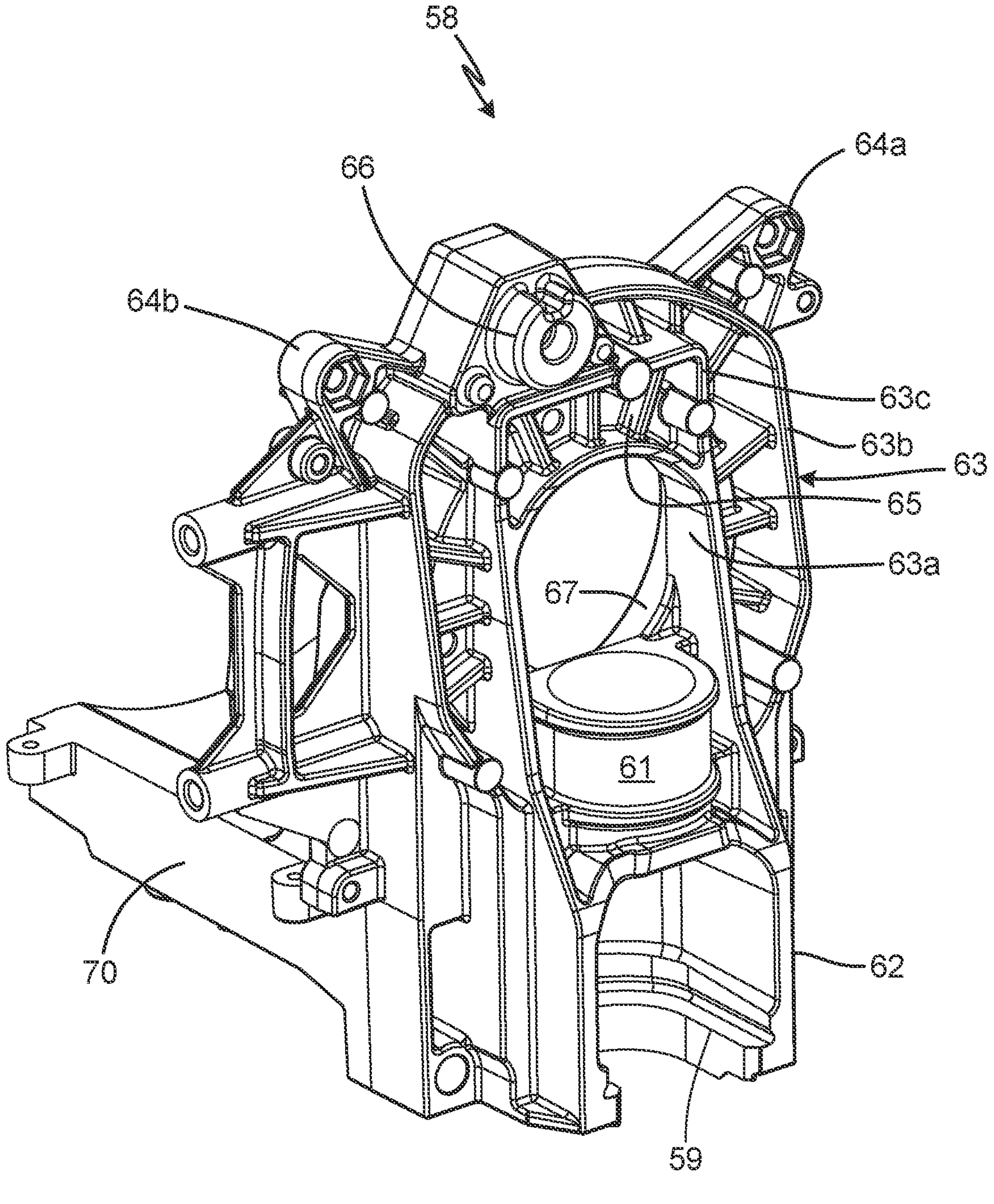
FIG. 5 is an isometric front side view of a support frame for the drive system and displacement pump of FIG. 2.
Figure 6:
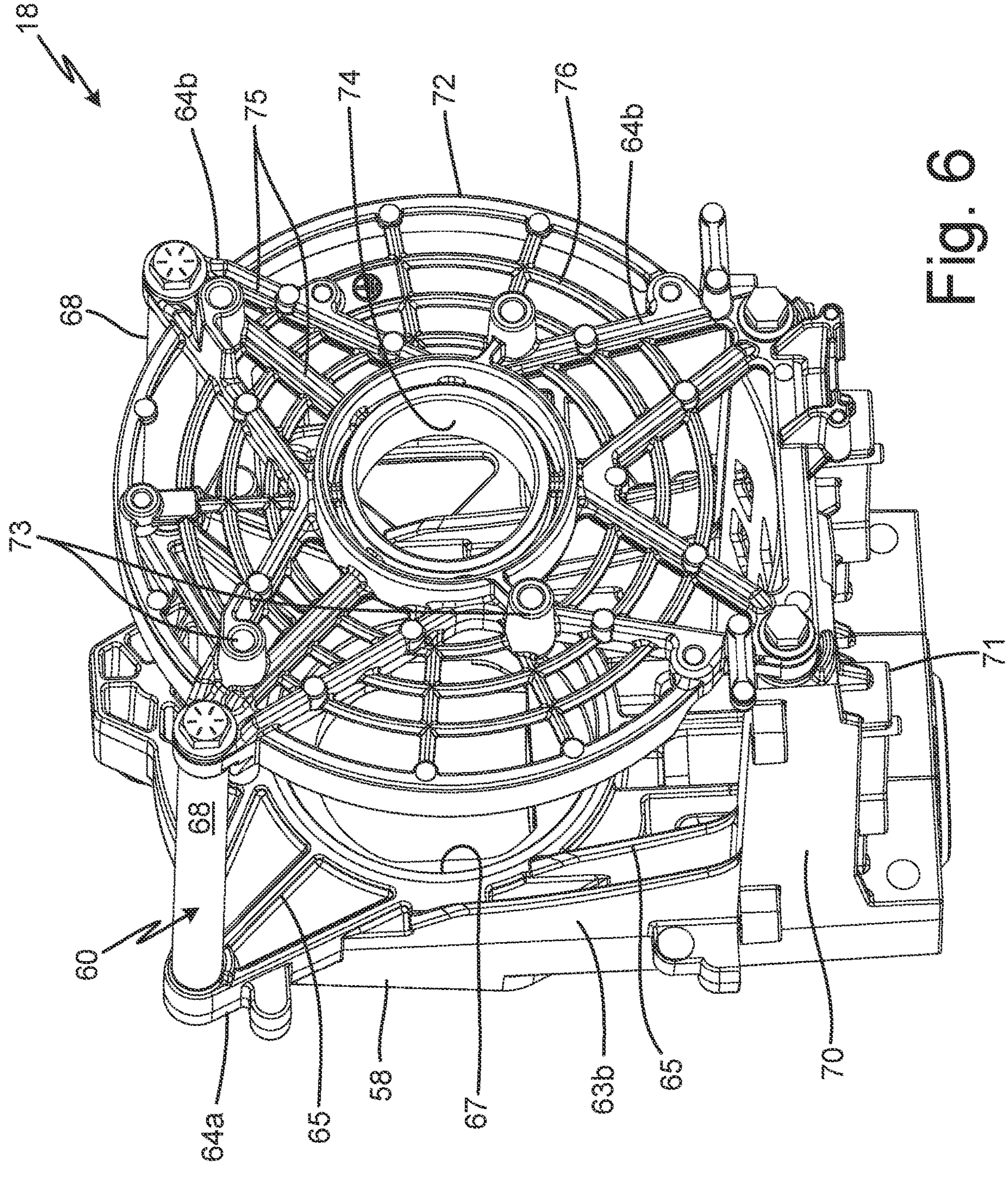
FIG. 6 is an isometric rear side view of the support frame for the drive system and displacement pump of FIG. 2.
Figure 7:
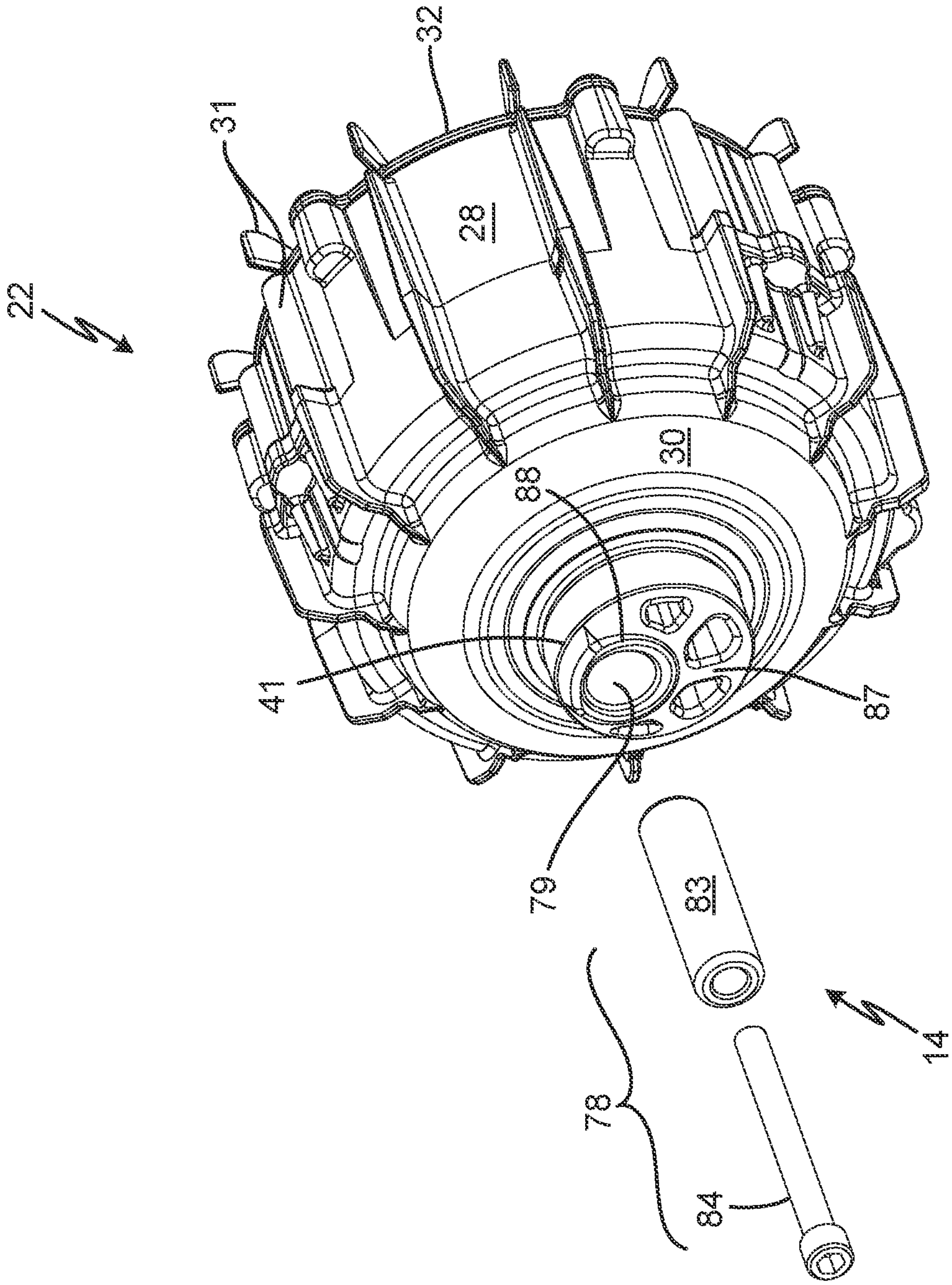
FIG. 7 is an exploded view of eccentric driver of the drive system of FIG. 2.

FIG. 2 is an isometric view of a front side of drive system 10. FIG. 3 is an exploded view of drive system 10. FIG. 4 is a cross-sectional view of drive system 10. FIG. 4A is an enlarged view of portion 3A of FIG. 4. FIG. 5 is an isometric front side view of a support frame for the drive system and displacement pump of FIG. 2. FIG. 6 is an isometric rear side view of the support frame for the drive system and displacement pump of FIG. 2. FIG. 7 is an exploded view of an eccentric driver of FIG. 2. FIGS. 2-7 are discussed together. Electric motor 12, control panel 13, drive mechanism 14, fluid displacement member 16, support frame 18, and displacement pump 19 are shown. FIGS. 2-4 and 7 illustrate one embodiment of drive mechanism 14 coupled to an outer rotor electric motor 12 and configured to power reciprocation of a fluid displacement member of pump 19. FIGS. 5 and 6 illustrate one embodiment of support frame 18 configured to mechanically support electric motor 12 and pump 19.

Electric motor 12 includes stator 20, rotor 22, and axle 23. In the example shown, electric motor 12 can be a reversible motor in that stator 20 can cause rotation of rotor 22 in either of two rotational directions about motor axis A (e.g., clockwise or counterclockwise), which can be the same as motor axis MA shown in FIGS. 1A and 1B. Electric motor 12 is disposed on axis A and extends from first end 24 to second end 26. First end 24 can be an output end configured to provide a rotational output from motor 12. Second end 26 can be an electrical input end configured to receive electrical power to provide to stator 20 to power operation of motor 12. For example, one or more wires w can extend into electrical input end 26 and to stator 20 to provide electrical power to operate stator 20. Rotor 22 can be formed of a housing, having cylindrical body 28 disposed between first wall 30 and second wall 32. Cylindrical body extends axially relative to motor axis A between first and second walls 30, 32. First and second walls 30, 32 extend substantially radially inward from cylindrical body 28 and towards motor axis A. Cylindrical body 28 and/or first and/or second walls 30, 32 can have fins 31 projecting radially and/or axially from body 28 and/or walls 30, 32. Rotor 22 includes permanent magnet array 34 disposed on inner circumferential face 35. Inner circumferential face 35 can be the radially inner side of cylindrical body 28. Second wall 32 can have axially extending flange 36 configured to be received in an inner diameter of cylindrical body 28. Second wall 32 can be fastened to cylindrical body 28 by fasteners, adhesive, welding, press-fit, interference fit, or other desired manners of connection. For example, bolts 37 or another fastener can connect wall 32 and cylindrical body 28. Second wall 32 can have radially extending annular flange 38 at an inner diameter opening. Annular flange 38 can be rotationally coupled to axle 23, such as by bearing 48. Annular flange 38 can at least partially define a receiving shoulder for receiving the outer race 49 of bearing 48 and preloading bearing 48. Rotor 22 can include a plurality of cylindrical projections 40, 41 extending axially from first wall 30. Cylindrical projections 40, 41 can rotationally couple rotor 22 to stator 20 and support frame 18.

Bearing 42, having inner race 43, outer race 44, and rolling elements 45, rotationally couples rotor 22 to stator 20 at axle end 46 opposite second end 26. Bearing 48, having outer race 49, inner race 50, and rolling elements 51, rotationally couples rotor 22 to stator 20 at second end 26.

Support frame 18 is mechanically coupled to rotor 22 at output end 24 via bearing 52, having outer race 53, inner race 54, and rolling elements 55. Rotor 22 can be received in support frame 18, such that a portion of rotor 22 extends into support frame 18 and is radially surrounded by a portion of support frame 18. Bearing 52 can be disposed between rotor 22 and support frame 18 such that both bearing 52 and support frame 18 are positioned radially outward from the portion of rotor 22 at output end 24. Wave spring washer 56 can be disposed between bearing 52 and support frame 18. An additional wave spring washer 57 can be disposed between bearing 42 and axle 23.

Support frame 18 includes pump frame 58 (best seen in FIG. 5) and support member 60 (best seen in FIG. 6). It is understood that the term member can refer to a single piece or multiple pieces fixed together. Pump frame 58 mechanically supports pump 19 and electric motor 12. Pump frame 58 is mechanically coupled to rotor 22 at output end 24 via bearing 52. Pump frame 58 can include pump housing portion 62, outer frame body 63, projections 64*a*, support ribs 65, handle attachment 66, and hub 67. Support member 60 provides a frame for motor 12. Support member 60 is mechanically coupled pump frame 58 and motor 12 and supports both pump and electric motor reaction forces. Support member 60 extends from pump frame 58 at output end 24 to axle 23 at electrical input end 26. Support member 60 can include connecting members 68, base plate 70, and frame member 72. Frame member 72 can include projections 64*b*, support posts 73, hub 74, ribs 75, and support rings 76. Base plate 70 can include support posts 71. Pump frame 58 and frame member 72 are disposed on opposite axial ends of motor 12 relative to axis A. A first plane that motor axis A is normal to at output end 24 can extend through pump frame 58. A second plane that motor axis A is normal to at input end 26 can extend through frame member 72. The two planes are spaced axially apart along motor axis A and do not intersect.

Control panel 13 can be mounted to and supported by support frame 18. Specifically, control panel 13 can be mounted to frame member 72 on an opposite axial side of frame member 72 from motor 12 relative to axis A, such that frame member 72 separates control panel 13 from motor 12 and is disposed directly between control panel 13 and motor 12 along axis A. Control panel 13 can be cantilevered from motor 12 via frame member 72. Control panel 13 can be cantilevered from support frame 18. In the example shown, control panel 13 is mounted to frame member at control support posts 73. Control support posts 73 extend axially from frame member 72 and away from motor 12. Control support posts 73 can provide directly contact between thermally conductive elements of frame member 72 and control panel 13, such as a metal-to-metal contact, to facilitate heat transfer, as discussed in more detail below.

Control panel 13 can include and/or support controller 15 and various other control and/or electrical elements of drive system 10. Controller 15 is operably connected to motor 12, electrically and/or communicatively, to control operation of motor 12 thereby controlling pumping by displacement pump 19. Controller 15 can be of any desired configuration for controlling pumping by displacement pump 19 and can include control circuitry and memory. Controller 15 is configured to store software, store executable code, implement functionality, and/or process instructions. Controller 15 is configured to perform any of the functions discussed herein, including receiving an output from any sensor referenced herein, detecting any condition or event referenced herein, and controlling operation of any components referenced herein. Controller 15 can be of any suitable configuration for controlling operation of drive system 10, controlling operation of motor 12, gathering data, processing data, etc. Controller 15 can include hardware, firmware, and/or stored software, and controller 15 can be entirely or partially mounted on one or more boards. Controller 15 can be of any type suitable for operating in accordance with the techniques described herein. While controller 15 is illustrated as a single unit, it is understood that controller 15 can be disposed across one or more boards. In some examples, controller 15 can be implemented as a plurality of discrete circuitry subassemblies. In some examples, controller 15 can be implemented across one or more locations such that one or more, but less than all, components forming controller 15 are disposed in and/or supported by control panel 13.

Controller 15 can include any one or more of a microprocessor, a digital signal processor (DSP), an application specific integrated circuit (ASIC), a field-programmable gate array (FPGA), or other equivalent discrete or integrated logic circuitry. Computer-readable memory can be configured to store information during operation. The computer-readable memory can be described, in some examples, as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). Computer-readable memory of controller 15 and/or motor controller 22 can include volatile and non-volatile memories. Examples of volatile memories can include random access memories (RAM), dynamic random access memories (DRAM), static random access memories (SRAM), and other forms of volatile memories. Examples of non-volatile memories can include magnetic hard discs, optical discs, flash memories, or forms of electrically programmable memories (EPROM) or electrically erasable and programmable (EEPROM) memories. In some examples, the memory is used to store program instructions for execution by the control circuitry. The memory, in one example, is used by software or applications running on the controller 15 or motor controller 22 to temporarily store information during program execution.

Control panel 13 is further shown as including user interface 17. User interface 17 can be configured as an input and/or output device. For example, user interface 17 can be configured to receive inputs from a data source and/or provide outputs regarding the bounded area and pathways therein. Examples of user interface 17 can include one or more of a sound card, a video graphics card, a speaker, a display device (such as a liquid crystal display (LCD), a light emitting diode (LED) display, an organic light emitting diode (OLED) display, etc.), a touchscreen, a keyboard, a mouse, a joystick, or other type of device for facilitating input and/or output of information in a form understandable to users or machines. While user interface 17 is shown as being formed as a portion of control panel 13, it is understood that user interface 17 can, in some examples, be disposed remote from control panel 13 and communicatively connected to other components, such as controller 15.

Drive mechanism 14 is connected to motor 12 and pump 19. Drive mechanism 14 is configured to receive the rotational output from rotor 22 and convert that rotational output into a linear reciprocating input to fluid displacement member 16. In the example shown, drive mechanism 14 includes eccentric driver 78, drive member 80, and drive link 82. Eccentric driver 78 can include sleeve 83 and fastener 84.

Drive member 80 can include follower 86 and bearing member 89. Drive link 82 can include connecting slot 90 and pin 92.

Pump 19 includes fluid displacement member 16 configured to reciprocate within cylinder 94 to pump fluid. In the example shown, fluid displacement member 16 is a piston configured to reciprocate on pump axis PA to pump fluid. It is understood, however, that fluid displacement member 16 can be of other desired configurations, such as a diaphragm, plunger, etc. among other options. In the example shown, fluid displacement member 16 includes shaft 91 and connector 93. Pump 19 includes cylinder 94 that is connected to support frame 18. Check valves 95, 96 are disposed within cylinder 94 and regulated flow through pump 19. In the example shown, check valve 95 is mounted to the piston forming fluid displacement member 16 to travel with the piston.

Support frame 18 supports motor 22 and pump 19. As discussed in further detail below, support frame 18 is dynamically connected to rotor 22 by a bearing interface and statically connected to stator 20. Support frame 18 is statically connected to pump 19. Electric motor 12 is dynamically connected to support frame 18 via rotor 22 and statically connected to support frame 18 via stator 20. Electric motor 12 is dynamically connected to pump 19 via fluid displacement member 16. Pump 19 is statically connected to support frame 18 and dynamically connected to electric motor 12.

In the example shown, motor 12 is an electric motor having inner stator 20 and outer rotor 22. Motor 12 can be configured to be powered by any desired power type, such as direct current (DC), alternating current (AC), and/or a combination of direct current and alternating current. Stator 20 includes armature windings 21 and rotor 22 includes permanent magnets 34. Rotor 22 is configured to rotate about motor axis A in response to current signals through stator 20. Rotor 22 is connected to the fluid displacement member 16 at an output end 24 of rotor 22 via drive mechanism 14. Drive mechanism 14 receives a rotary output from rotor 22 and provides a linear, reciprocating input to fluid displacement member 16. Support frame 18 mechanically supports electric motor 12 at the output end 24 and mechanically supports reciprocating fluid displacement pump 19 by the connection between cylinder 94 and pump 19. Support frame 18 at least partially houses fluid displacement member 16 of reciprocating pump 19. In the example shown, cylinder 94 is mounted to pump frame 58 by clamp 25 receiving a portion of the support frame between a first member of the clamp 25 and a second member of the clamp 25. For example, flange 59 can be received between the two members of clamp 25.

Stator 20 defines axis A of electric motor 12. Stator 20 is disposed around and supported by axle 23. Axle 23 is mounted to be stationary relative to motor axis A during operation. Stator 20 is fixed to axle 23 to maintain a position of stator 20 relative to motor axis A. Power can be supplied to armature windings 21 by electrical connection made at or through electrical input end 26 of electric motor 12. Each winding 21 can be a part of a phase of the motor 15. In some examples, motor 15 can include three phases. The power can be provided to each phase according to electrically offset sinusoidal waveforms. For example, a motor with three phases can have each phase receive a power signal 120-degrees electrically offset from the other phases. Axle 23 can be a hollow shaft open to electrical input end 26 for receiving electrical wiring from outside of motor 12. In alternative embodiments, axle 23 can be solid, can have a key, can be D-shaped, or other similar design. In some embodiments, axle 23 can be defined by a plurality of cylindrical cross-sections taken perpendicular to axis A that are of varying diameters to accommodate mechanical coupling with support frame 18 at electrical input end 26 of axle 23 and coupling with rotor 22 at an axially opposite end 46 of axle 23. For example, a first end of axle 23 can be disposed radially between stator 20 and rotor 22 and have a larger diameter than the axially opposite end 46 for receiving electrical inputs.

Rotor 22 is disposed coaxially with stator 20 and around stator 20 and is configured to rotate about axis A. Rotor 22 can be formed from a housing having cylindrical body 28 extending between first wall 30 and second wall 32, such that rotor 22 is positioned to extend around three sides of stator 20. Rotor 22 includes a permanent magnet array 34. Permanent magnet array 34 can be disposed on an inner circumferential face 35 of cylindrical body 28. An air gap separates permanent magnet array 34 from stator 20 to allow for rotation of rotor 22 with respect to stator 20. Rotor 22 can overlap stator 20 and axle 23 over a full radial extent of stator 20 and axle 23 at output end 24 of electric motor 12. In some examples, rotor 22 can fully enclose stator 20 and axle 23 at output end 24 of electric motor 12. Rotor 22 can partially or fully overlap stator 20 over a radial extent of stator 20 at electrical input end 26 of electric motor 12. Second wall 32 extends from cylindrical body 28 radially inward toward axle 23. Axle 23 can extend through an opening in second wall 32 concentric with axle 23 and can extend axially outward of second wall 32 in axial direction AD2. Second wall 32 is radially separated from axle 23, by bearing 48 in the example shown, at electrical input end 26 of electric motor 12 to allow rotation of rotor 22 with respect to axle 23.

Generally, stator 20 generates electromagnetic fields that interact with a plurality of magnetic elements of rotor 22 to rotate rotor 22 about stator 20. More specifically, stator 20 includes a plurality of windings 21 that generate electromagnetic fields. The electromagnetic fields generated by windings 21 are radially outward facing, toward rotor 22. Rotor 22 includes either a plurality of permanent magnets 34 circumferentially arrayed within rotor 22, or a plurality of windings that temporarily magnetize metallic material both of which are circumferentially arrayed within rotor 22. In either configuration of rotor 22, the electromagnetic fields generated by the plurality of solenoids 21 of stator 20 attract and/or repel the magnetic elements of rotor 22 to rotate rotor 22 about stator 20.

First and/or second walls 30, 32 of rotor 22 can be formed integrally with cylindrical body 28 or can be mechanically fastened to cylindrical body 28. The mechanical connection to cylindrical body 28 can be formed in any desired manner, such as by fasteners, interference fitting, welding, adhesive, etc. Rotor 22 is formed such that a closed end of rotor 22 is oriented towards the axis PA of reciprocation of pump 19 and such that an open end of rotor 22 in oriented towards control panel 13. The closed end of rotor 22 (formed by wall 30) faces the pump 19 and the open end (formed by wall 32, that is open to facilitate electrical connections) is oriented away from pump 19 along the motor axis A. The open end of rotor 22 is oriented towards control panel 13. In the example shown, the opening through wall 32 is open to the space directly between control panel 13 and motor 22.

First wall 30 can have a tapered thickness and/or can be angled between axle 23 and cylindrical body 28. First wall 30 can have a tapered thickness with thickness increasing in a radial direction from cylindrical body 28 toward axis A. In the example shown, the axially-oriented face of first wall 30 is contoured such that first wall 30 is domed outwards in first axial direction. In the example shown, first wall 30 is integrally formed with cylindrical body 28.

In the example shown, second wall 32 is formed separately from cylindrical body 28 and connected to cylindrical body 28. In the example shown, second wall 32 is fastened to an outer diameter portion of cylindrical body 28 with a plurality of fasteners, more specifically by bolts 37. Second wall 32 can include axially extending flange 36 at a radially outer end, which can form a sliding fit with an inner diameter of cylindrical body 28. Axially extending flange 36 aligns second wall 32 with cylindrical body 28 to provide proper alignment during assembly and to prevent rotor 22 from being unbalanced due to misalignment. Axially extending flange 36 facilitates concentricity between cylindrical body 28 and second wall 32. Axially extending flange 36 can be annular. Cylindrical body 28 and/or one or both of first and second walls 30, 32 can include one or more of fins 31 that extend outward (axially and/or radially) to push air as rotor 22 rotates. Fins 31 can be used, for example, to direct cooling air toward control panel 13. Fins 31 can be formed from thermally conductive material to act as heat sinks to conduct heat away from motor 12.

Bearings 42, 48, and 52 are disposed coaxially on rotational axis A, such that rotating members of bearings 42, 48, and 52 rotate on rotational axis A. Bearings 42, 48, and 52 can be substantially similar in size or can vary in size to support differing loads and to accommodate space constraints. Bearings 42 and 48 can be substantially similar in size, while bearing 52 at output end 24 can be larger to accommodate reciprocating load received by rotor 22 at output end 24. In some examples, all three bearings 42, 48, 52 can have different sizes. In the example shown, the end bearing 52 is larger than the end bearing 48, and the end bearing 48 is larger than the intermediate bearing 42. Rolling elements of bearings 42, 48, and 52 can vary in radial position from axis A. Rolling elements 55 of bearing 52 can be disposed at a first radius R1 from rotational axis A of electric motor 12, rolling elements 51 of bearing 48 can be disposed at a second radius R2 from rotational axis A, and rolling elements 45 of bearing 42 can be disposed at a third radius R3 from rotational axis A. As illustrated in FIG. 4A, first radius R1 can be greater that a second radius R2 and third radius R3 can be greater the second radius R2 and less than the first radius R1. In some examples, second radius R2 is one of greater than and equal to third radius R3. First wall 30 can be rotationally coupled to a radially inner side of axle 23 via bearing 42 at axle end 46. Bearing 42 includes inner race 43, outer race 44, and rolling elements 45. In some examples, bearing 42 can be a roller or ball bearing in which rolling elements 45 are formed by cylindrical members or balls. First wall 30 can be coupled to inner race 43. Stator 20 can be coupled to outer race 44, such as by axle 23 interfacing with outer race 44. Rolling elements 45 allow rotation of rotor 22 with respect to stator 20. Bearing 42 supports rotor 22 rotationally relative to stator 20 and maintains the air gap between permanent magnet array 34 and stator 20, thereby balancing motor 12. Bearing 42 can be provided to ensure that stator 20 and rotor 22 deflect the same amount through each pump cycle, such that with each up-down pump load, the air gap between stator 20 and rotor 22 is maintained and rotor 22 does not contact stator 20. Bearing 42 minimizes the unsupported length of rotor 22 and provides an intermediate support between bearing 52 and bearing 48. In some examples, bearing 42 can support torque load generated by electric motor 12. Bearing 42 can primarily align stator 20 and rotor 22 while experiencing minimal pump reaction loads. The radius R3 of bearing 42 can be determined by the size of axle 23 at axle end 46 as bearing 42 is positioned inside axle 23.

Components can be considered to axially overlap when the components are disposed at a common position along an axis (e.g., along the motor axis A for axle 23 and wall 30) such that a radial line projecting that axis extends through each of those axially-overlapped components. Similarly, components can be considered to radially overlap when the components are disposed at common positions spaced radially from the axis (e.g., relative to motor axis A for axle 23 and wall 30) such that an axial line parallel to the axis extends through each of those radially-overlapped components.

First wall 30 of rotor 22 can extend into axle 23 at output end 24 such that a portion of axle 23 and a portion of first wall 30 radially overlap. As such, an axial line parallel to axis A can extend through each of first wall 30 and axle 23. Cylindrical projection 40 of rotor 22 can extend in axial direction AD2 from output end 24 of motor 12 and into axle 23 at axle end 46. As such, cylindrical projection 40 extends from a front end of the housing of rotor 22 and axially away from pump frame 58. Cylindrical projection 40 is coaxial with rotor 22 and stator 20 on rotational axis A and rotates about rotational axis A. Cylindrical projection 40 can extend into axle 23 such that cylindrical projection 40 axially overlaps with axle 23. As such, a radial line extending from axis A can pass through each of cylindrical projection 40 and axle 23. Cylindrical projection 40 is rotationally coupled to axle 23 by bearing 42. An outer diameter surface of cylindrical projection 40 can be coupled to inner race 43, such that rotor 22 rides inside of bearing 42. Axle 23 can be coupled to outer race 44. In some embodiments, at least a portion of each of cylindrical projection 40 and bearing 42 can axially overlap a portion of permanent magnet array 34 and, in some examples, stator 20. In an alternative embodiment, first wall 30 can be rotationally coupled to an outer diameter of axle 23 such that rotor 22 is coupled to an outer race 44 and axle 23 is coupled to an inner race 43.

Rotor 22 can be rotationally coupled to stator 20 at electrical input end 26 via bearing 48. Bearing 48 includes outer race 49, inner race 50, and rolling elements 51. Rotor 22 can be coupled to outer race 49 and axle 23 can be coupled to inner race 50. Rolling elements 51 allow rotation of rotor 22 with respect to stator 20 such that rotor 22 rides outside of bearing 48. In some examples, bearing 48 can be a roller or ball bearing in which rolling elements 51 are cylindrical members or balls. Second wall 32 can be coupled to an outer diameter surface of outer race 49 and can extend around an axially outer end face of outer race 49. Second wall 32 can include annular flange 38, which projects radially inward from rotor 22 towards axis A. Annular flange 38 can extend radially inward relative to the outer diameter surface of outer race 49. Flange 38 can radially overlap and abut the axially outer end face of outer race 49. Flange 38 can extend to radially overlap and abut a full circumferential axially outer end face of outer race 49. Axle 23 can extend through rotor 22 at electrical input end 26 and can project axially outward of bearing 48 in axial direction AD2 to allow for coupling of axle 23 with support frame 18, such as via support member 60. The radius R2 of bearing 48 can be determined by the size of axle 23 at input end 26 and to react the pump loads generated during operation.

Bearing 52 can support both dynamic motor loads and the pump reaction forces generated by reciprocation of fluid displacement member 16 during pumping. Bearing 48 can support both dynamic motor loads and the pump reaction loads generated by reciprocation of fluid displacement member 16 during pumping.

The pump reaction forces experienced by bearing 48 are in a generally opposite axial direction (PAD1, PAD2) as compared to the pump reaction forces simultaneously experienced by bearing 52. For example, bearing 52 experiences an upward pump reaction force caused by fluid displacement member 16 being driven through a downstroke, while bearing 48 experiences a downward pump reaction force during to the downstroke. Similarly, bearing 52 experiences a downward pump reaction force caused by fluid displacement member 16 being driven through an upstroke, while bearing 54 experiences an upward pump reaction force during the upstroke. The pump reaction loads are transmitted through bearing 52 to support frame 18.

One or both of bearings 42 and 48 can be omitted from drive system 10 in some embodiments. In such embodiments, rotor 22 can be fully separated from and free of mechanical coupling with stator 20 and axle 23 on all three sides. First wall 30 on output end 24 can extend across axis A to fully cover a radial extent of stator 20 and axle 23 at output end 24, while maintaining axial and radial separation from stator 20 and axle 23. Axle 23 can extend through second wall 32 and can be radially separated therefrom by a gap to allow rotation of rotor 22 with respect to axle 23 in the absence of bearing 48. In such configurations, rotation of rotor 22 can be supported by a bearing coupling between rotor 22 and pump frame 58 (discussed further herein), alone or in combination with one of bearings 42 and 48.

Rotor 22 is mechanically coupled to support frame 18 at output end 24 via bearing 52. Bearing 52 includes inner race 54, outer race 53, and rolling elements 55. Bearing 52 can be a roller or ball bearing, in which rolling elements 55 are cylindrical members or balls. Rotor 22 can be received in pump frame 58, such that a portion of rotor 22 extends into pump frame 58 and is radially surrounded by a portion of pump frame 58. Bearing 52 can be disposed between rotor 22 and pump frame 58 such that both bearing 52 and pump frame 58 are positioned radially outward from rotor 22 at output end 24. Rotor 22 can be coupled to inner race 54 and pump frame 58 can be coupled to outer race 53, such that rotor 22 rides inside of bearing 52. Rolling elements 55 allow rotational motion of rotor 22 relative to pump frame 58.

Bearing 52 is positioned proximate drive mechanism 14 and most directly experiences the pump load generated by reciprocation of fluid displacement member 16 and transmitted via rotor 22 and, more specifically, cylindrical projection 41 to which drive mechanism 14 is coupled. Bearing 52 can have a relatively large radius R1 as compared to other motor support bearings (e.g., bearings 42, 48) to accommodate both pump load generated by reciprocation of fluid displacement member 16 and torque load generated by electric motor 12. Bearing 52 can support both dynamic motor load including torque load generated by electric motor 12 and an up-down pump load generated substantially along pump axis PA by reciprocation of fluid displacement member 16 during pumping. Such pump reaction loads can be experienced by electric motor 12 and are particularly noticeable in direct drive configurations, which exclude intermediate gearing between rotor 22 and drive mechanism 14. For example, the drive system 10 shown in FIGS. 2-4 has a direct drive configuration.

Rotor 22 can include cylindrical projection 41 extending in axial direction AD1 from wall 30 of rotor 22. Cylindrical projection 41 can extend axially outward in direction AD1 from the output end 24 or front end of electric motor 12 and can extend into an opening in pump frame 58. Cylindrical projection 41 is centered on rotational axis A and rotates about rotational axis A with rotor 22. Bearing 52 can be disposed on an outer diameter portion of cylindrical projection 41 to couple rotor 22 to pump frame 58 by the cylindrical projection 41. Cylindrical projection 41 can be coupled to inner race 54 and pump frame 58 can be coupled to outer race 53. Inner race 54 can be disposed on an outer diameter surface of cylindrical projection 41. Rolling elements 55 allow rotational motion of rotor 22 relative to pump frame 58. Cylindrical projection 41 can extend at least partially into pump frame 58 along axis A. In some examples, cylindrical projection 41 does not extend fully through pump frame 58 such that cylindrical projection 41 does not project in the first axial direction AD1 beyond the structure of pump frame 58. In some examples, cylindrical projection 41 does extend fully through pump frame 58 such that a portion of cylindrical projection 41 projects in axial direction AD1 beyond the structure of pump frame 58.

As used herein, the term "axially outer" refers to a surface facing outward of electric motor 12 (i.e., away from stator 20 along axis A) and the term "axially inner" refers to a surface facing an inner portion (i.e., towards stator 20 along axis A) of electric motor 12. A portion of an axially outer end face of wall 30 can radially overlap with and abut an axially oriented end face of inner race 54 (oriented in axial direction AD2 in the example shown). Wall 30 can thereby form a support for bearing 52. The portion of the axially outer end face of wall 30 can extend radially outward from cylindrical projection 41 and fully annularly around cylindrical projection 41 to radially overlap and abut a full circumferential axially inner end face of inner race 54. For example, wall 30 can include an annular axially extending projection circumscribing cylindrical projection 41 and extending approximately equal to or less than a height of inner race 54 to interface with inner race 54. The projection is configured to fix an axially inner location of bearing 52 and to axially separate wall 30, which rotates, from outer race 53, which is stationary.

Bearings 42, 48, and 52 can be preloaded by pump frame 58 and support member 60. Pump frame 58 can radially overlap an axial end face of bearing 52. Frame member 72 of support member 60 can radially overlap an axial end face of bearing 48. An axial inward force is applied to axial end faces of bearings 52 and 48 as bearings 52, 42, and 48 are compressed between pump frame 58 and frame member 72 when support member 60 is secured to connect frame members 58, 72 together. An axial inward force in the direction AD2 is applied to the radially extending axial end face of bearing 52, and specifically, to the outer axial end face of outer race 53. An axial inward force in the direction AD1 is applied to the radially extending axial end face of bearing 48, and specifically, to the outer axial end face of inner race 50. The axial forces preload bearings 42, 48, and 52 to remove play from bearings 42, 48, and 52 during operation of drive system 10. Wave spring washers can be used to reduce bearing noise. In some embodiments, a first wave spring washer 56 can be disposed between pump frame 58 and the axial end face of outer race 53 of bearing 52 at output end 24. A second wave spring washer 57 can be disposed between a portion of axle 23 and an axial end face of outer race 44 of bearing 42. Alternatively, or additionally, a wave spring washer can be disposed between a portion of axle 23 and an axial end face of inner race 50 of bearing 48.

The bearing arrangement of drive system 10 provides significant advantages.

Bearings 52 and 48 react to pump reaction loads generated during pumping. Bearings 52, 48 facilitate a direct drive configuration of drive system 10. Bearings 52 and 48 stabilize rotor 22 to facilitate the direct drive connection to fluid displacement member 16. The pump reaction forces experienced at output end 24 and input end 26 by bearings 52, 48 are transmitted to the portion of support frame 18 connected to a stand or otherwise supporting drive system 10 on a support surface. In the example shown, the pump reaction forces are transmitted to base plate 70 via pump frame 58, frame member 72, and connecting members 68, balancing the forces across support frame 18. Base plate 70 reacts the forces, such as to a stand connected to mounts 71, and the forces are thereby transmitted away from motor 12. All pump and motor forces are reacted through base plate 70, which can be integrally formed with or directly connected to pump frame 58 and is mechanically coupled to motor axle 23 via frame member 72. The connection balances motor 12, providing longer life, less wear, less downtime, more efficient operation, and cost savings. Bearing 42 further aligns rotor 22 on pump axis A. Bearing 42 minimizes the unsupported span of rotor 22, aligning rotor 22 and preventing undesired contact between rotor 22 and stator 20. Bearing 42 thereby increases the operational life of motor 12.

Support frame 18 mechanically supports electric motor 12 at output end 24 and at least partially houses fluid displacement member 16. Support frame 18 can be mechanically coupled to both rotor 22 and stator 20. Support frame 18 can be mechanically coupled to rotor 22 at output end 24 and mechanically coupled to axle 23 at electrical input end 26. As such, support frame 18 can extend fully around motor 12 and be coupled to axially opposite ends of motor 12 to support motor 12. Axle 23 is mechanically coupled to support frame 18 to fix stator 20 relative to support frame 18. Axle 23 is fixed with respect to support frame 18 such that stator 20, which is fixed to axle 23, does not rotate relative to support frame 18 or motor rotational axis A.

Support member 60 can extend around an exterior of rotor 22 from pump frame 58 to axle 23 to connect pump frame 58 to axle 23 such that stator 20, via support member 60, is fixed relative to support frame 18. Support member 60 can be removably fastened to axle 23. Support member 60 fixes axle 23 to pump frame 58 to prevent relative movement between stator 20 and support frame 18. Neither axle 23 nor stator 20 are fixed to support frame 18 at output end 24. Instead, a portion of rotor 22 is disposed axially between and separates axle 23 and stator 20 from support frame 18. As such, motor 12 is dynamically supported by support frame 18 at the output end 24 and statically supported by support frame 18 at the input end 26.

Support member 60 can extend from a location radially inward of an exterior of cylindrical body 28 of rotor 22 to a location radially outward of cylindrical body 28. Support member 60 can extend circumferentially around rotor 22 with sufficient radial spacing therefrom to allow unobstructed rotation of rotor 22 inside of support member 60. In the example shown, support frame 18 does not completely enclose rotor 22. It is understood that not all examples are so limited. In the example shown, no parts exist between support frame 18 and the exterior of rotor 22. Thus, support frame 18 allows airflow through itself and over rotor 22.

Support member 60 includes one or more connecting members 68, base plate 70, and frame member 72. It is understood that each connecting member 68 can be formed by a single component or multiple components fixed together. Each connecting member 68 can also be referred to as a connector. Base plate 70 can also be referred to as a connector. Connecting members 68 and base plate 70 extend across cylindrical body 28 and are spaced therefrom. Frame member 72 is disposed at electrical input end 26 and coupled to axle 23. Frame member 72 can also be referred to as a frame end. Frame member 72 extends radially with respect to motor axis A and is mechanically coupled to connecting members 68 and base plate 70. Connecting members 68 and base plate 70 can extend axially outward from pump frame 58 in axial direction AD2. Connecting members 68, 70 are spaced radially from cylindrical body 28. Connecting members 68 of support member 60 can extend parallel to motor axis A or can be angled such that an end of the connecting member 68 at output end 24 can be circumferentially offset about axis A from an end of the connecting member at electrical input end 26.

Frame member 72 of support member 60 can extend substantially parallel to second wall 32 of rotor 22 and can be axially spaced therefrom. Frame member 72 can be disposed substantially parallel to pump frame 58. Frame member 72 extends from axle 23 to a location radially outward of cylindrical body 28 where frame member 72 joins with connecting members 68 and base plate 70. Frame member 72 is fixed to axle 23.

Support member 60 connects to pump frame 58 at output end 24. Support member 60 can connect to pump frame 58 at one or more locations radially outward of cylindrical body 28 or at one or more locations radially inward of cylindrical body 28 and then extend radially to a location radially outward of cylindrical body 28. Support member 60 fixes an axial location of stator 20 with respect to rotor 22 and pump axis PA and axially secures components of electric motor 12 together along the motor axis A. Support member 60 can be a unitary body or can include multiple components fastened together and capable of connecting stator 20 to pump frame 58 to maintain stator 20 in a fixed axial location relative to rotor 22 and pump frame 58 on axis A.

In a non-limiting embodiment, connecting members 68 can be tie rods, which can be circumferentially spaced around a top portion of motor 12. The tie rods can be removably mounted to one or both of pump frame 58 and frame member 72. Base plate 70 can be a substantially solid base plate or bracket disposed under a bottom portion of motor 12. Base plate 70 can have a width substantially equal to a width of pump housing portion 62. In some embodiments, base plate 70 can have a width substantially equal to or greater than a diameter of cylindrical body 28 of rotor 22.

Frame member 72 can include hub 74. Frame member 72 can be removably coupled to axle 23. For example, frame member 72 can be slidingly engaged with axle 23. In some examples, frame member 72 can be fixed to axle 23. For example, hub 74 of frame member 72 can be bolted to axle 23 or secured to axle 23 with a retaining nut (not shown). Connecting members 68 and base plate 70 can be secured to frame member 72 and can fix hub 74 to axle 23.

In addition to providing mechanical support to motor 12, support member 60 can conduct heat away from motor 12 during operation. Axle 23 extends through rotor 22 and axially outward from rotor at electrical input end 26 and can project in axial direction AD2 outward of bearing 48. The portion extending axially beyond bearing 48 can connect with support member 60 and provide a route for conductive heat transfer from stator 20 to support member 60 and away from electric motor 12. More specifically, frame member 72 is fixed to axle and in a direct heat exchange relationship therewith. As discussed in more detail below, frame member 72 is configured to conduct heat both from motor 12 and control panel 13, which are the main heat generating components of drive system 10.

Both axle 23 and support member 60 can be formed of a thermally conductive material (e.g., metal). Axle 23 can be placed in direct contact with support member 60 (e.g., with frame member 72) to provide a direct conductive heat path to route heat away from motor 12. As illustrated in FIG. 4, axle 23 axially overlaps stator 20 along a full axial length of stator 20. Axle 23 is capable of drawing heat from stator 20 and conducting heat toward electrical input end 26 and axially outward of stator 20. Axle 23 transfers heat to frame member 72 via conduction at locations where frame member 72 is in contact with axle 23. As such, the conductive pathway for heat transfer from stator 20 extends through axle 23 to frame member 72. In some embodiments, frame member 72 can be in fixed contact with both an axially extending surface of axle 23 and a radially extending end face of axle 23. For example, a portion of frame member 72, such as a lip extending from hub 74, can extend radially over an end of axle 23 to increase the surface area of the direct contact and transfer heat away from axle 23 and away from electric motor 12. A shape and surface area of frame member 72 can be selected to facilitate heat transfer away from electric motor 12.

FIG. 5 shows a front isometric view of one embodiment of pump frame 58 with base plate 70. Pump frame 58 and base plate 70 can be integrally formed, such as by, for example, casting as a unitary component, or can be formed from multiple components mechanically fixed together. For example, pump frame 58 and base plate 70 can be removably connected together, such as by bolts or other fasteners. Pump frame 58 can include drive link housing 61, pump housing portion 62, inner frame body 63*a*, outer frame body 63*b*, mid-frame body 63*c*, projections 64*a* with distal ends disposed radially outward of electric motor 12, support ribs 65, handle attachment 66, and hub 67. Pump frame 58 provides mechanical support and housing for pump 19.

Pump frame 58 provides mechanical support for motor 22. Pump frame 58 can extend radially outward from bearing 52. Bearing 52 can be received in hub 67. Rotor 22 can be received through an opening in inner frame body 63*a*. Outer frame body 63*b* is positioned radially outward of inner frame body relative to motor axis A. Mid-frame body 63*c* is positioned between inner frame body 63*a* and outer frame body 63*b*. Ribs 65 can extend between inner frame body 63*a* and mid-frame body 63*c*, between inner frame body 63*a* and outer frame body 63*b*, and between mid-frame body 63*c* and outer frame body 63*b*. Ribs 65 can be used to reduce a weight of pump frame 58 while providing structural support. In some embodiments, a plurality of ribs 65 can extend between hub 67 and outer frame body 63*b* (best shown in FIG. 6). Ribs 65 can support load from bearing 52 and can reduce weight of pump frame 58. Ribs 65 can be spaced substantially circumferentially around a portion of hub 67. Ribs 65 can vary in length depending on a shape of outer frame body 63*b* or positioning relative to bearing 52, inner frame body 63*a*, or mid-frame body 63*c*. As illustrated in FIG. 5, outer frame body 63*b* can have a different shape than bearing 52*b*, which is cylindrical. As such, a perimeter of outer frame body 63 is not evenly spaced from a perimeter of bearing 52 or hub 67 and ribs 65 connecting hub 67 to outer frame body 63*b* vary in length accordingly. A size and shape of outer frame body 63*b* and quantity, thickness, and positioning of ribs 65 can be selected to support bearing 52 and electric motor 12 while reducing weight of pump frame 58. Projections 64*a* can be substantially solid triangular projections extending from hub 67. Projections 64*a* can form attachment points for members 68 to secure frame member 72 to pump frame 58.

Drive link housing 61 can positioned in the opening in inner frame body 63*a*. As illustrated in the example in FIG. 5, drive link housing 62 is a cylindrical body positioned below the opening (in the axial direction PAD1 (shown in FIG. 4) and above pump housing portion 62. An opening of drive link housing 61 is orthogonal to the opening through inner frame body 62*a*. Drive link housing 61 limits movement of drive link 82 to up and down motion along pump axis PA.

Pump housing portion 62 of pump frame 58 at least partially houses fluid displacement member 16 and supports displacement pump 19. Pump 19 is disposed at output end 24 on pump axis PA orthogonal to motor axis A and axially aligned with drive mechanism 14 along axis A. Pump housing portion 62 of pump frame 58 can extend in an axial direction AD1 outward of drive mechanism 14 to house fluid displacement member 16. As illustrated in the example in FIG. 5, pump housing portion 62 is formed by U-shaped walls opening to a front end of pump frame 58 away from motor 12 in axial direction AD1 and toward pump 19 in axial direction PAD2. A portion of pump 19 is disposed in the chamber of pump housing portion 62 during operation.

FIG. 6 shows a rear isometric view of one embodiment of support frame 18 including pump frame 58 and support member 60 assembled together. Electric motor 12 has been removed from the view shown for clarity. FIG. 6 shows support frame 18, including pump frame 58 and support member 60. Support member 60 includes connecting members 68, base plate 70, and frame member 72. Frame member 72 includes hub 74 configured to receive a portion of axle 23 such that axle 23 is supported by frame member 72 and frame member 72 is in contact with axle 23. Frame member 72 is positioned in contact with an outer surface of axle 23. By maintaining contact with axle 23, frame member 72 can draw heat away from stator 20 via thermal conduction. Both axle 23 and frame member 72 can be formed from a thermally conductive material (e.g., aluminum) capable of conducting heat from inside stator 20 to input end 26 and frame member 72. As discussed with respect to FIG. 4, axle 23 axially overlaps stator 20 along a full axial length of stator 20 and is capable of drawing heat from stator 20 and conducting heat toward electrical input end 26 and axially outward of stator 20. Axle 23 transfers heat to frame member 72 via conduction at locations where frame member 72 is in contact with axle 23. As such, the conductive pathway for heat transfer from stator 20 extends through axle 23 to frame member 72.

Hub 74 of frame member 72 is configured to be in fixed contact with an axially extending surface of axle 23. Frame member 72 extends radially from axle 23 to transfer heat radially away from axle 23 and away from electric motor 12. A shape and surface area of frame member 72 can be selected to facilitate heat transfer away from electric motor 12. Projecting members 64*b* on frame member 72 can extend from hub 74 radially outward to direct heat radially outward from axle 23. Projections 64*b* provide increased surface area relative a plate 72 to further facilitate heat transfer and cooling of motor 12. A quantity, shape, and positional arrangement of projections 64*b* on frame member 72 can be selected to provide effective heat transfer away from stator 20 via axle 23 and away from control panel 13. As illustrated in the example in FIG. 6, projections 64*b* can be substantially open bodies formed by a plurality of ribs 75 extending from hub 74 to distal ends or projections 64*b* in a converging shape. In the example shown, the plurality of ribs 75 form triangular projections that narrow as the projections extend radially away from axis A. Projections 64*b* provide structural rigidity to support frame 18 and surface area for conductive heat transfer from stator 20 while allowing airflow between motor 12 and control panel 13. Projections 64*b* can be arranged in a star-like shape around hub 74 with bases at hub 74 extending to pointed distal ends. As illustrated in FIG. 6, two lower projections 64*b* are connected to base plate 70 and are each formed by two ribs 75, and two upper projections 64*b* are connected to connecting members 68 and are each formed by three ribs.

Frame member 72 can additionally include a plurality of concentric support rings 76 formed around hub 74 and connecting projections 64*b*. Support rings 76 can provide increased rigidity to frame member 72 while allowing airflow between motor 12 and control panel 13. Support rings 76 also increase the surface area of frame member 72, providing for heat transfer. Openings are formed through frame member 72 that further increase the surface area and allow for air flow through frame member 72 to further facilitate heat transfer. Alternative designs to increase surface area of frame member 72 are contemplated and can be used without departing from the scope of the invention.

Frame member 72 can be connected to axle 23 in any desired manner that prevents axial displacement and rotation of frame member 72 relative to axle 23 and fixes an axial position of stator 20 relative to rotor 22. In some embodiments, frame member 72 can be slip fit onto the outer surface of axle 23. The compressive connection between pump frame 58 and frame member 72 can secure axle 23 and stator 20 to prevent movement relative to pump axis A. The connection between frame member 72 and pump frame 58 by way of members 68, 70 prevents relative movement of frame member 72 about axis A and can clamp stator 20 and axle 23.

In some examples, frame member 72 can be fastened to the outer surface of axle 23 with one or more fasteners, such that axle 23 is fixed relative to frame member 72, which is fixed to pump frame 58 by base plate 70 and members 68. Axle 23 is thereby fixed relative to pump axis A. Frame member 72 is in contact with axle 23 along the outer surface of axle 23. Frame member 72 can be secured to axle 23 such that contact is maintained between frame member 72 and axle 23 during operation to provide a conductive pathway for heat transfer from stator 20 to frame member 72.

An axial length of frame member 72 in an axial direction at hub 74 can be selected to increase a contact surface area between frame member 72 and axle 23 and thereby increase heat transfer capacity. Frame member 72 can be connected to interface with axle 23 in any desired manner. For example, as shown in FIG. 4, hub 74 can be slip fit onto an outer diameter surface of axle 23. The opening through hub 74 can be sized to allow an inner diameter surface of hub 74 to maintain contact with axle 23 to provide a conductive heat path from axle 23 to frame member 72.

Frame member 72 can support control panel 13. As illustrated in FIGS. 2 and 4, control panel 13 can be mounted to an aft side of frame member 72 opposite motor 12. Control panel 13 can be fastened to mounting posts 73 of frame member 72 via bolts or other retention mechanisms as known in the art. A conductive material on control panel 13 can interface with frame member 72 via mounting posts 73 to provide a conductive heat path from control panel 13 to frame member 72. As such, frame member 72 can draw heat away from both motor 12 and control panel 13 and transfer heat to the environment. In the example shown, control panel 13 is mounted to frame member 72 at mounting posts 73. Mounting posts 73 space control panel 13 from frame member 72 along axis A. A cooling plenum is thereby formed between frame member 72 and control panel 13 to facilitate airflow therebetween. Mounting posts 73 and portion of control panel 13 and/or fasteners connecting control panel 13 to frame member 72 can be formed from thermally conductive material. Direct thermal pathways are thereby formed between control panel 13 and frame member 72. Control panel 13 is mounted such that control panel 13 is cantilevered off of the heat sink formed by frame member 72. In other embodiments, control panel 13 can be mounted on a side of motor 12 disposed axially between pump frame 58 and frame member 72 along axis A.

Frame member 72 is disposed axially between motor 12 and control panel 13, which are the main heat generating components of drive system 10. Frame member 72 conducts heat away from components disposed on both axial sides of frame member 72. Frame member 72 is configured to provide a large surface area and extends radially away from axis A to facilitate heat transfer. Both the motor 12 and control panel 13 can have direct thermal pathways to frame member 72 (e.g., by direct metal-to-metal contact). Frame member 72 thereby structurally supports both of motor 12 and control panel 13 and provides heat dissipation for motor 12 and control panel 13.

Pump frame 58 and frame member 72 can each include at least two projections 64*a*, 64*b*, respectively. Projections 64*a*, 64*b* can extend radially outward from axis A such that a distal end of each projecting member 64*a*, 64*b* is disposed radially outward of rotor 22. Connecting members 68 can be fastened to distal ends of the projections 64*a*, 64*b*. Base plate 70 can be fastened to distal ends of the projections 64*b* disposed on a bottom side of frame member 72. Connecting members 68 can be fastened to distal ends of projections 64*a*, 64*b* disposed on a top side of motor 12 to connect pump frame 58 with frame member 72 across a top exterior surface of rotor 22. Base plate 70 can be fastened to distal ends of lower projections 64*b* to connect pump frame 58 with frame member 72 across a bottom exterior surface of rotor 22. Projections 64*a* and 64*b* can be shaped to provide structural integrity to support frame 18 during operation, while limiting an amount of weight added to drive system 10. As illustrated in the example in FIG. 6, projections 64*a* are substantially solid triangular bodies with ribs 65 provided to increase rigidity while reducing weight.

Projections 64*a*, 64*b* on each of pump frame 58 and frame member 72 can be arranged symmetrically or asymmetrically and with equal or unequal spacing relative to each other. As illustrated in FIGS. 2, 3, and 5, pump frame 58 can have two projections 64*a*, which are axially aligned with projections 64*b* on frame member 72 (shown in FIG. 6). Frame member 72 can have four projections 64*b* arranged in an X-configuration unequally spaced about axis A.

Connecting members 68 and base plate 70 connect pump frame 58 to frame member 72. Connecting members 68 and base plate 70 are rigid and capable of maintaining a fixed relationship between pump frame 58 and frame member 72 during operation of drive system 10. Additionally, connecting members 68 and base plate 70 are configured to support torque loads generated by electric motor 12 and transmitted through pump frame 58 and frame member 72 and to further support pump reaction loads generated by reciprocation of fluid displacement member 16 and also transmitted through pump frame 58 and frame member 72. Connecting members 68 can be tie rods, which can be fastened by bolts or other retention mechanisms to projections 64*a* and 64*b*, among other options. Base plate 70 can be a plate or bracket designed to provide additional structural rigidity to support frame 18.

Base plate 70 can be configured to mount to a cart or stationary assembly for ease of operation and transport. Base plate 70 can include a plurality of mounting posts 71 or bosses configured to receive fasteners to secure drive system 10 to a cart or stationary assembly. In other embodiments, pump frame 58 and/or base plate 70 can be configured to mount to a cart or stationary assembly for ease of operation and transport. In some embodiments, pump frame 58 can include attachment feature 66 for securing a handle for ease of carrying drive system 10.

Figure 12:
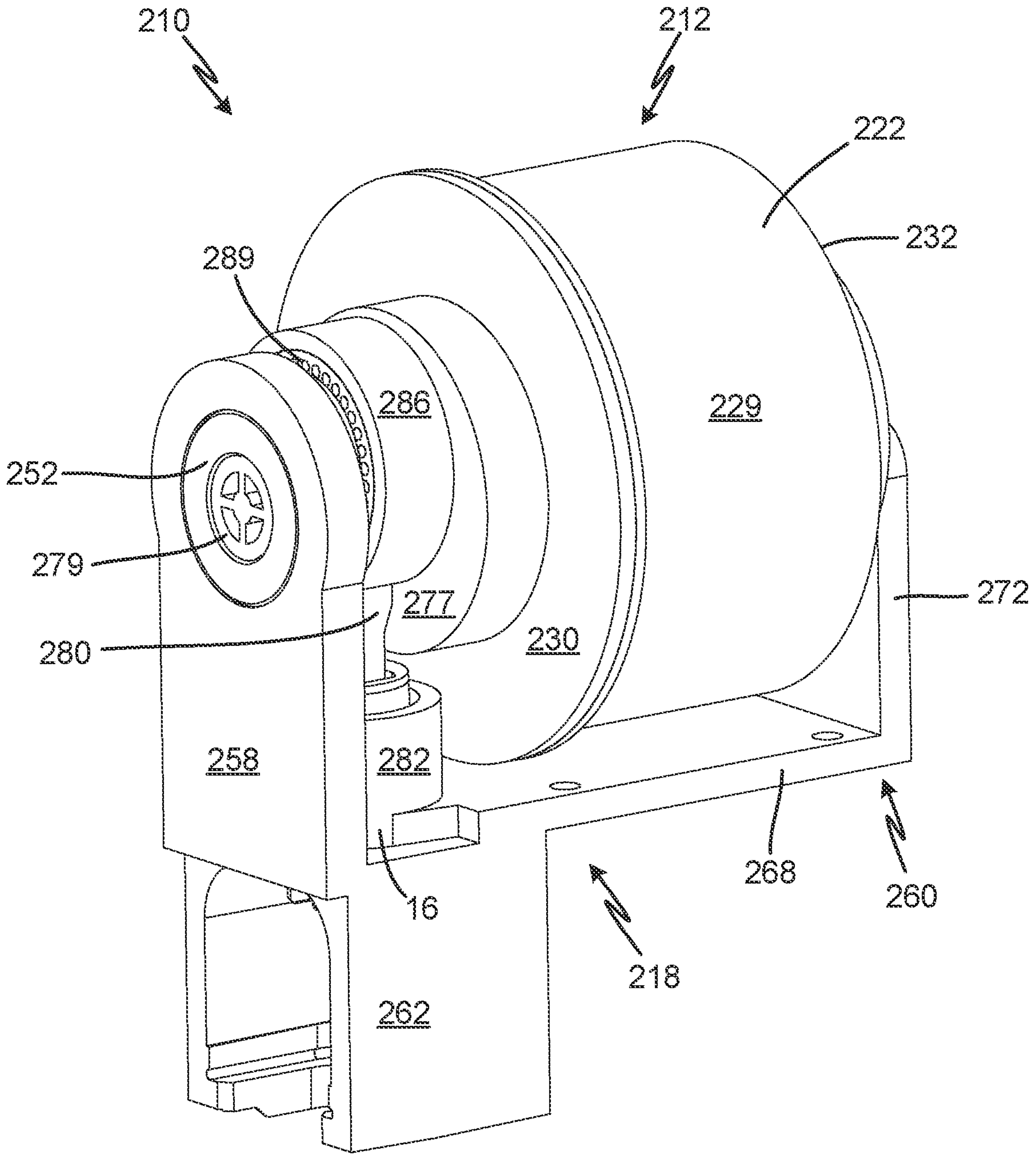
FIG. 12 is an isometric front side view of the drive system of FIG. 11.

As described further herein, support member 60 is not limited to the embodiments illustrated and can include any single component or combination of components capable of fixing stator 20 relative to pump frame 58 and relative to pump axis A. Support member 60 can fully or partially enclose rotor 22, as illustrated in FIG. 2, or can be disposed across a single side of rotor 22 extending from output end 24 to electrical input end 26, as illustrated in FIG. 12. In some embodiments, support member 60 can include a second frame member. The second radially extending member can be disposed between pump frame 58 and first wall 30 of rotor 22. The second frame member can be fixed to pump frame 58 and axially spaced from first wall 30 to allow unobstructed rotation of rotor 22. Support member 60 can include a single connecting member 68 and/or base plate 70 or multiple connecting members 68 and/or base plate 70 or any desired combination thereof, as described in further detail below. A size, shape, quantity, and location of connecting members 68 and base plate 70 can be selected to reduce weight while providing structural integrity to drive system 10. Likewise, a size, shape, and quantity of frame member 72 can be selected to reduce weight while providing structural integrity to drive system 10.

Rotor 22 can extend through pump frame 58 and axially outward of bearing 52 in axial direction AD1. In the example shown, drive mechanism 14 is directly connected to rotor 22 at output end 24 at a location axially outward of bearing 52 in axial direction AD1. Drive mechanism 14 is configured to receive a rotational output from rotor 22 and to translate the rotational output to a linear, reciprocating input to fluid displacement member 16. In the example shown, drive system 10 does not include intermediate gearing between motor 12 and drive mechanism 14. It is understood, however, that some examples of drive system 10 include intermediate gearing between motor 12 and drive mechanism 14. In such examples the axis of rotation of eccentric 78 can be radially offset from the axis of rotation of rotor 22.

Drive mechanism 14 includes eccentric driver 78, drive member 80, and drive link 82. Eccentric driver 78 is provided on rotor 22 of electric motor 12 and rotates with rotor 22. Eccentric driver 78 is offset radially from rotational axis A. As such, rotation of rotor 22 causes eccentric driver 78 to move in a circular path about rotational axis A. Eccentric driver 78 provides a eccentric crankshaft that powers drive mechanism 14 and can be referred to as such. Drive member 80 is mechanically coupled to eccentric driver 78 and is configured to drive reciprocation of fluid displacement member 16. Eccentric driver 78 is directly coupled to drive member 80 without intermediate gearing. The direct connection between rotor 22 and fluid displacement member 16 provides a 1:1 ratio of rotor rotation to pump cycle. As such, for each one rotation of rotor 22 about axis A, fluid displacement member 16 proceeds through one full pump cycle, which includes an upstroke and a downstroke.

Eccentric driver 78 projects axially outward from output end 24 of rotor 22 and is offset radially from rotational axis A. More specifically, eccentric driver 78 projects in the axial direction AD1 from cylindrical projection 41 of rotor 22. In some embodiments, eccentric driver 78 can be integrally formed with cylindrical projection 41. In alternative embodiments, eccentric driver 78 can be formed from one or more components and assembled with rotor 22. As illustrated in FIGS. 2-4 and 7, eccentric drive crankshaft 78 can be a cylindrical body, which extends into a bore 79 of rotor 22. In some examples, bore 79 can extend through cylindrical projection 41 and into cylindrical projection 40. In such an example, the bore 79 can axially overlap with both bearing 52 and bearing 42. Bore 79 is offset from a rotational axis of the rotational input to eccentric driver 78 (e.g., axis A in the direct drive arrangement shown) and, therefore, has a center offset from a center of cylindrical projection 41. As illustrated in FIG. 7, bore 79 can be positioned adjacent to an outer diameter of cylindrical projection 41. Bore 79 can be substantially located between the center of cylindrical projection 41 and the outer diameter of cylindrical projection 41. Bore 79 can be configured to receive at least a portion of eccentric driver 78 with a slip fit. Cylindrical projections 40 and 41 can be configured to support eccentric driver 78 as pump reaction forces are applied to eccentric driver 78 via drive member 80.

Cylindrical projection 41 can include boss 88. Boss 88 can define an opening of bore 79, can be used to locate eccentric driver 78, and can support eccentric driver 78 as reciprocating loads are applied to eccentric driver 78 via drive member 80. Boss 88 projects axially outward in the first axial direction AD1 from cylindrical projection 41 toward drive member 80. Boss 88 can be a cylindrical projection extending from cylindrical projection 41. Boss 88 supports eccentric driver 78 by reducing a length of eccentric driver 78 cantilevered from rotor 22. Boss 88 can have a smaller outer diameter than cylindrical projection 41. A centerline through boss 88 is radially offset from axis A.

In some embodiments, cylindrical projection 41 can have a substantially hollow body with cavities defined by a plurality of ribs 87. Ribs 87 can extend radially outward from eccentric driver 78 to an outer cylindrical wall of cylindrical projection 41. More specifically, ribs 87 can extend radially outward of bore 79 and boss 88. Ribs 87 can be configured to support a load of bearing 52 and eccentric driver 78. Additionally, use of ribs 87 can reduce a weight of rotor 22, particularly at output end 24 where rotor 22 is coupled to support frame 18. Ribs 87 can be spaced circumferentially around eccentric driver 78. Ribs 87 can extend around a portion of eccentric driver 78 that is less than a full circumference of eccentric driver 78. Ribs 87 can vary in a radial length between eccentric driver 78 and the wall of cylindrical projection 41 depending on the location of ribs 87. Ribs 87 extending from a position around eccentric driver 78 adjacent to the center of cylindrical projection 41 can be longer than ribs 87 extending from a position around eccentric driver 78 nearer the outer wall of cylindrical projection 41. Eccentric driver 78 projects further in axial direction AD1 than cylindrical projection 41. As such, eccentric driver 78 can represent the most-axially-forward part of rotor 22. In some examples, crankshaft 78 at least partially axially overlaps with support frame 18.

Eccentric driver 78 can include a sleeve 83 and bolt 84 (shown in FIGS. 4, 4A, and 7). Sleeve 83 can be received in bore 79 with a press fit or transitional slip fit. Bolt 84 can be slidingly received in sleeve 83. Bolt 84 can be threadedly fastened to bore 79 at an axially inner end of bore 79. The axial inner end of bore 79 can be positioned in cylindrical projection 40. Bore 79 can have multiple inner diameters. In the example shown, bore 79 includes two inner diameters D1, D2 (shown in FIG. 4A) to accommodate a larger diameter of sleeve 83 and a smaller diameter of bolt 84. Inner diameter D1 can be larger than inner diameter D2 to accommodate sleeve 83. Inner diameter D2 can be smaller than inner diameter D1 to accommodate bolt 84. A portion of bore 79 having inner diameter D1 can extend in axial direction AD2 from boss 88 a first axial length L1. A portion of bore 79 having inner diameter D2 can extend in axial direction AD2 from an end of L1 to a second axial length L2. The portion of bore 79 having inner diameter D1 can have a substantially smooth surface to provide a sliding fit with sleeve 83. The portion of bore 79 having inner diameter D2 can be threaded to fix bolt 84. Bolt 84 can retain sleeve 83 in rotor 22. Bolt 84 can extend into cylindrical projection 40 and can be positioned radially within stator 20. Bolt 84 is provided in rotor 22, which holds permanent magnet array 34. Bolt 84 can be formed of a non-ferrous material to prevent interference with electric motor 12.

Eccentric driver 78 extends from rotor 22 in axial direction AD1 and is offset from rotational axis A. Drive member 80 can be rotationally coupled to crankshaft 78. Drive member 80 can be a connecting rod. Drive member includes follower 86 at a first end configured to receive sleeve 83 of eccentric driver 78. Follower 86 can include a bearing member 89 disposed between follower 86 and sleeve 83 to allow drive member 80 to move in a rocking motion about eccentric driver 78 as eccentric driver 78 moves with rotor 22. Drive member 80 can be coupled to fluid displacement member 16 via drive link 82. Drive link 82 can be a cylindrical shaft and can include connecting slot 90 at a first end configured to receive a second end of drive member 80 opposite follower 86. Pin 92 can extend through connecting slot 90 and an aperture in the second end of drive member 80 in a manner that allows drive member 80 to pivot about pin 92 within drive link 82 and allows drive member 80 to follow eccentric driver 78. Drive member 80 translates rotational motion of crankshaft 78 into reciprocating motion of drive link 82, which drives fluid displacement member 16 in a reciprocating manner. Drive member 80 can be axially spaced from boss 88 such that boss 88 does not interface or interfere with the movement of drive member 80 relative to eccentric driver 78.

Fluid displacement member 16 is mechanically coupled to drive mechanism 14 at output end 24. Connector 93 of fluid displacement member 16 can be secured to drive link 82 at a second end opposite the first end through which pin 92 extends. Fluid displacement member 16 can be connected to drive link 63 in any desired manner, such as by a slotted connection like that shown or a pinned connection, among other options. Fluid displacement member 16 can be a piston, which moves fluid in and out of a pump cylinder 94 as rotor 22 drives fluid displacement member 16 down through a downstroke and pulls fluid displacement member 16 up through an upstroke via drive mechanism 14. In some examples, fluid displacement member 16 can be a piston for a double displacement pump such that the pump 19 outputs fluid both as rotor 22 drives fluid displacement member 16 down through a downstroke and pulls fluid displacement member 16 up through an upstroke via drive mechanism 14. Fluid displacement member 16 can be cylindrical, elongated along, and coaxial with pump axis PA. Fluid displacement member 16 can be a piston, which can be elongate along and coaxial with pump axis PA.

Pump 19 can include cylinder 94 and check valves 95, 96. Pump 19 is statically connected to support frame 18 via cylinder 94 and dynamically connected to electric motor 12 by the connection between fluid displacement member 16 and drive mechanism 14. More specifically, pump 19 is statically connected to support frame by clamp 25. Check valve 95 is a one-way valve disposed in cylinder 94. Check valve 96 is a one-way valve disposed in fluid displacement member 16 to reciprocate with fluid displacement member 16. Pump 19 is disposed on pump axis PA, which is orthogonal to motor axis A. Pump 19 is a double displacement pump, such that pump 19 outputs fluid during both the upstroke of fluid displacement member 16 in axial direction PAD2 and the downstroke of fluid displacement member 16 in axial direction PAD1. Pump 19 can include both dynamic seals between cylinder 94 and fluid displacement member 16. In the example shown, the first dynamic seal is mounted to fluid displacement member 16 and travels with fluid displacement member 16 while the second dynamic seal remains static relative to cylinder 94 and pump axis PA. As such, the first dynamic seal reciprocates relative to cylinder 94 and pump axis PA while fluid displacement member 16 reciprocates relative to the second dynamic seal. In some examples, the first dynamic seal can be mounted to cylinder 94 to remain stationary as fluid displacement member 16 reciprocates. The piston forming fluid displacement member 16 can extend out of cylinder 94 through the second dynamic seal.

During operation of drive system 10, power is supplied to electric motor 12 causing rotor 22 to rotate about rotational axis A and causing eccentric driver 78 to move with rotor 22. Eccentric driver 78 moves along a circular path radially offset from rotational axis A. Eccentric driver 78 completes a single circular path with each revolution of rotor 22. Follower 86, which receives eccentric driver 78 moves with eccentric driver 78. As such, with each revolution of rotor 22, follower 86 also completes a full circular path. As follower 86 moves along the circular path, follower 86 changes a position with respect to rotational axis A. With each revolution of rotor 22, eccentric driver 78 pulls drive member 80 via follower 86 in the circular path. The end of drive member 80 opposite follower 86 is secured to drive link 82 via pin 92. Drive link 82 is secured in support frame 18. As eccentric driver 78 moves through an upward arc from a bottom dead center position to a top dead center position, eccentric driver 78 pulls drive member 80 away from drive link 82 such that drive link 82 is pulled in a linear upward direction toward rotational axis A of electric motor 12. As eccentric driver 78 moves through a downward arc from a top dead center position to a bottom dead center position, eccentric driver 78 pushes drive member 80 toward drive link 82 such that drive link 82 is forced in a linear downward direction away from rotational axis A. With each revolution of rotor 22, drive link 82 is forced both upward and downward once each. In this manner, drive mechanism 14 translates each revolution of rotor 22 into a linear up and down motion of fluid displacement member 16. Drive link 82 is coupled to fluid displacement member 16 and accordingly pulls fluid displacement member 16 through an upstroke and pushes fluid displacement member 16 through a downstroke. As such, for each revolution of rotor 22, pump 19 proceeds through a full pump cycle, including an upstroke and a downstroke.

During operation, the pump reaction forces generated by fluid displacement member 16 during pumping are transmitted to support frame 18 and away from motor 12 via drive mechanism 14, rotor 22, bearing 52, bearing 48, axle 23, pump frame 58, and support member 60. Fluid displacement member 16 receives a downward reaction force when moving through the upstroke and an upward reaction force when moving through the downstroke. Both the upward reaction force and the downward reaction force travel through drive mechanism 14, rotor 22, and then to bearings 52, 48, 42. Bearings 52, 48, 42 transfer rotational forces associated with rotation of rotor 22 and both the upward and downward reaction forces to support frame 18. With each stroke, pump reaction forces are generated and a load is applied to rotor 22 via drive mechanism 14. The pump reaction forces are axial loads generally along pump axis PA.

This axial pump reaction load is transverse to rotational axis A of electric motor 12 and is experienced at both output and input ends 24 and 26 of electric motor 12. The load is transmitted to pump frame 58 via bearing 52 and to support member 60 via bearing 48 such that pump reaction forces on bearing 42 are minimized, maintaining proper air gap. At output end 24, the load is transmitted from rotor 22 to pump frame 58 through bearing 52. At electrical input end 26, the load is transmitted from rotor 22 through bearing 48 and axle 23 to frame member 72. The forces are transmitted from pump frame 58 and frame member 72 to base plate 70. The forces can be transferred from base plate 70 to a stand or other structure coupled to base plate 70. Bearings 52 and 48 experience opposite reactionary forces with each pump stroke to provide a force balance across rotor 22, maintaining the air gap and preventing undesired contact between rotor 22 and stator 20. In examples where pump frame 58 is directly connected to a stand or other support, the forces are transmitted to frame member 58 via support member 60 and then to the stand or other support. The forces can be transmitted to frame member 58 from frame member 72 via members 68 and base plate 70.

As illustrated in FIG. 4, drive system 10 can be used to deliver fluid such as paint, among other spray fluids, to a spray apparatus. Fluid can be drawn from a supply container 97 via hose 98 and pump 19 and delivered to spray apparatus 5, such as a handheld spray gun, via hose 4 for application. An operator can grasp a handle of apparatus 5 and cause spraying by actuating a trigger 9 of apparatus 5.

The direct drive configuration of drive system 10 can eliminate intermediate gearing (e.g., reduction gears) between electric motor 12 and fluid displacement member 16. The elimination of intermediate gearing provides a more compact, lower weight, reliable, and simpler pump by reducing the part count and number of moving parts. The direct drive configuration can provide more efficient pumping due to the 1:1 ratio of rotor rotation to pump cycle. Additionally, the elimination of gearing can provide for quieter pump operation.

The outer rotator drive system 10 can provide significant advantages over inner rotator motors. Rotor 22 being an outer rotator disposed at least partially radially outside of stator 20 provides increased inertia and torque relative an inner rotator motor. The increased torque facilitates rotor 22 generating sufficiently high pumping pressures with displacement pump 19 to generate an atomized spray at an applicator such as a spray apparatus 5. For example, drive system 10 can be utilized to pump paint or other fluids to an airless spray gun, whereby the fluid pressure generates the atomized spray. In some examples, rotor 22 can cause pump 19 to generate pumping pressures of about 3.4-69 megapascal (MPa) (about 500-10,000 pounds per square inch (psi)) or even higher. In some examples, the pumping pressures are in the range of about 20.7-34.5 MPa (about 3,000-5,000 psi). High fluid pumping pressure is useful for atomizing the fluid into a spray for applying the fluid to a surface.

Figure 8:
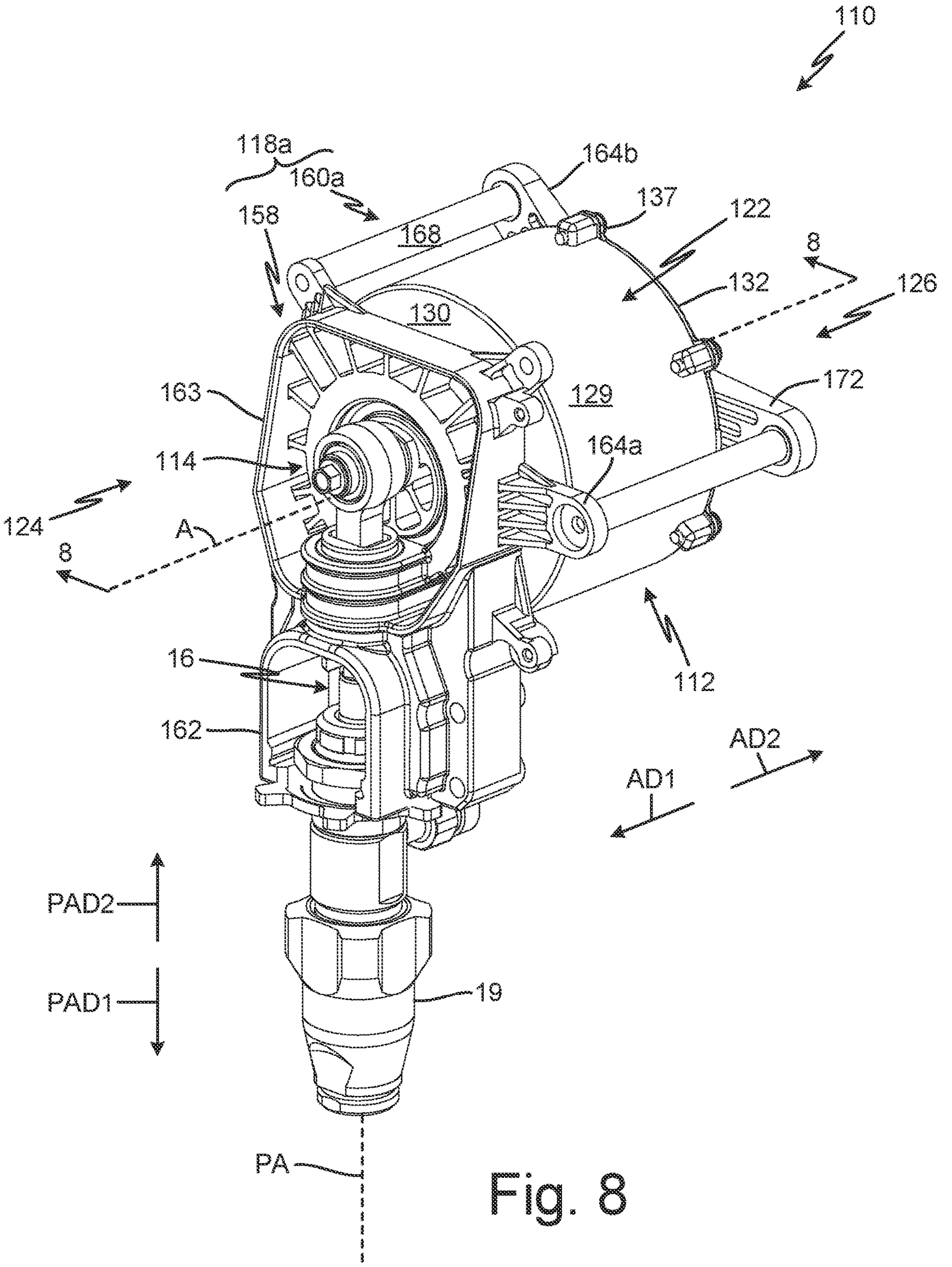
FIG. 8 is an isometric front side view of another embodiment of a drive system and displacement pump.
Figure 9:
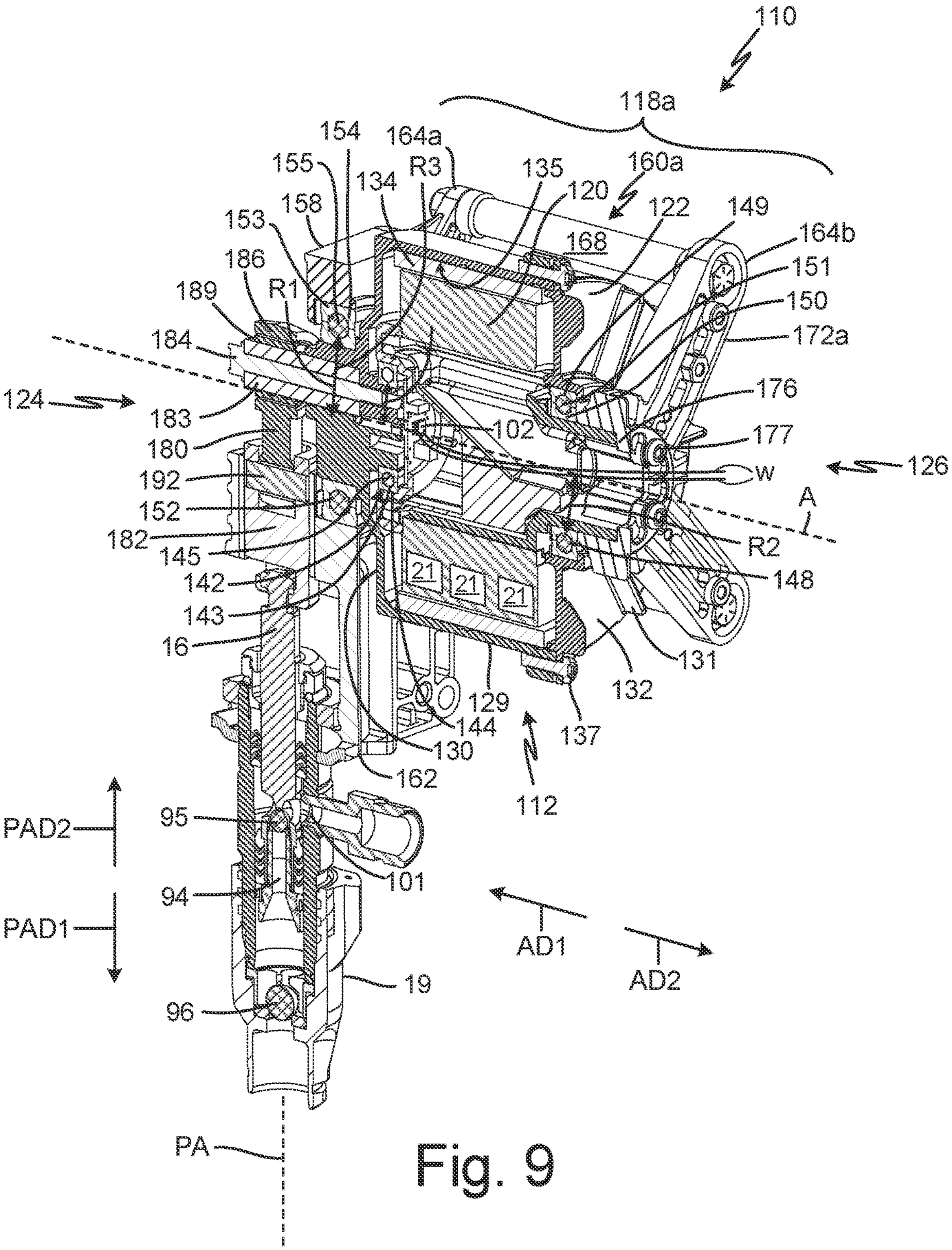
FIG. 9 is an isometric cross-sectional view of the drive system and displacement pump of FIG. 8.
Figure 10A:
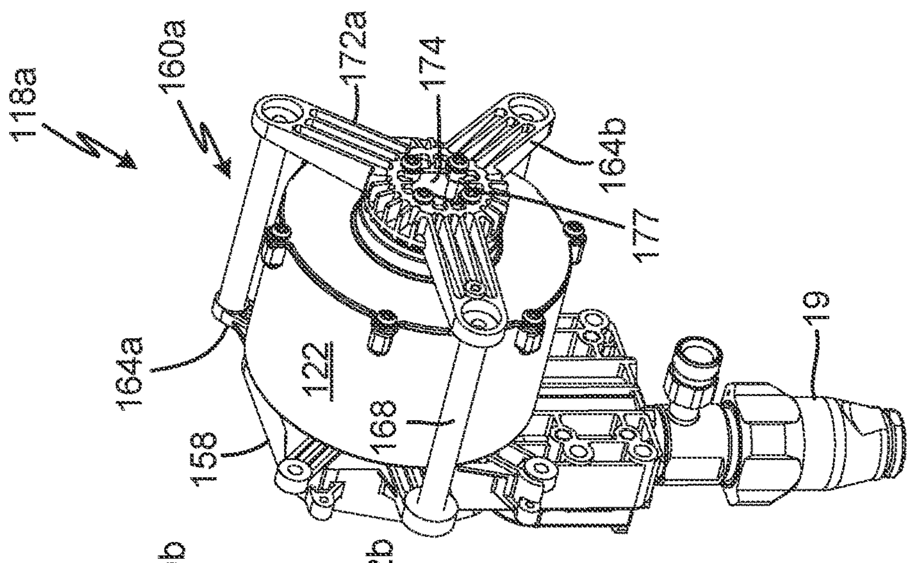
FIG. 10A is an isometric rear side view of a support frame for the drive system and displacement pump of FIG. 8.
Figure 10B:
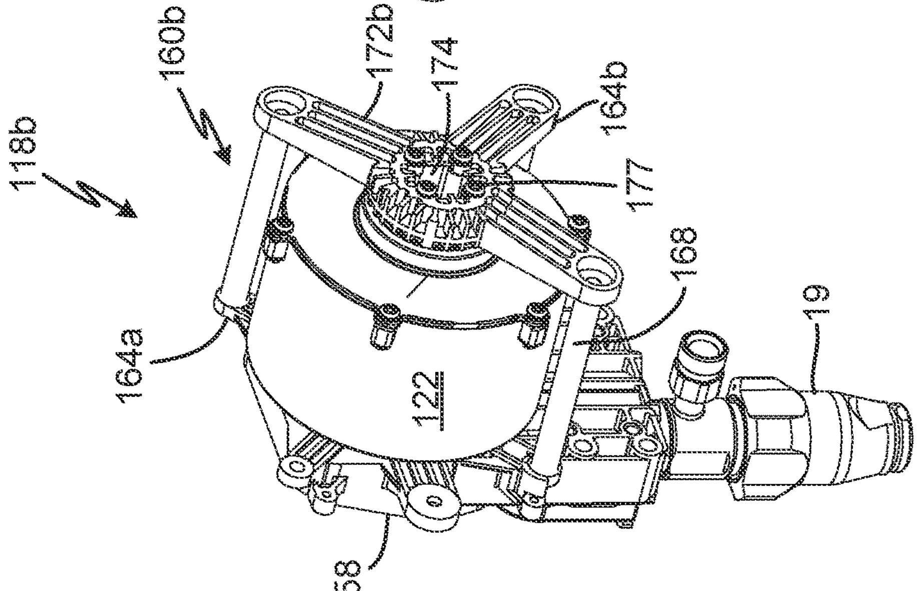
FIG. 10B is an isometric rear side view of another embodiment of a support frame.
Figure 10C:
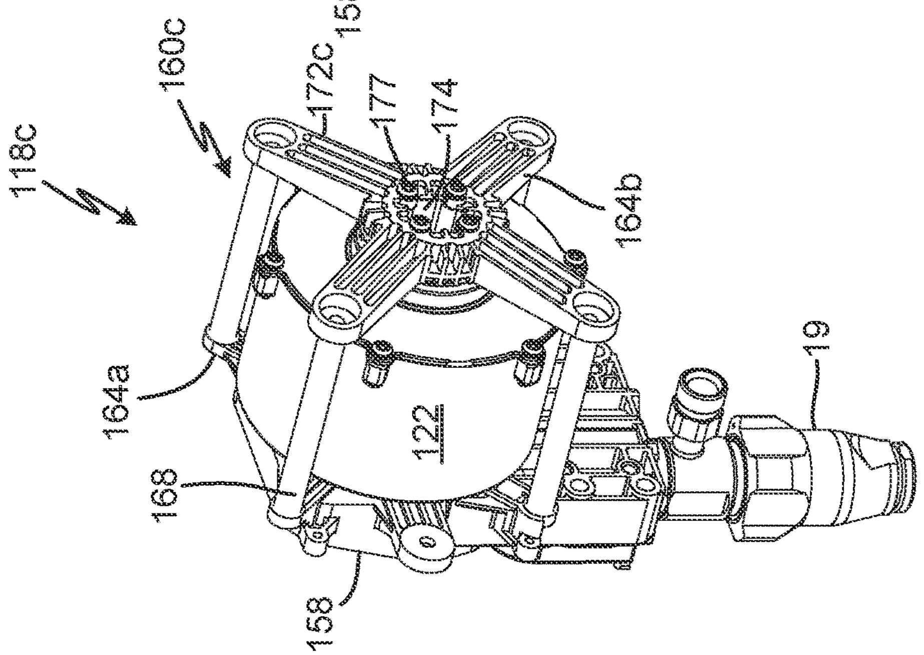
FIG. 10C is an isometric rear side view of yet another embodiment of a support frame.

FIG. 8 is an isometric front side view of drive system 110 and displacement pump 19. FIG. 9 is an isometric cross-sectional view of drive system 110 and displacement pump 19 taken along the line 9-9 of FIG. 8. FIGS. 10A-10C are isometric rear side views of alternative support frames 118A-118C for drive system 110 and displacement pump 19 of FIG. 8. FIGS. 8, 9, and 10A-10C are discussed together. Drive system 110 is an alternative embodiment of an outer rotator drive system, such as drive system 10 (best seen in FIGS. 2-4). Drive system 110 is substantially similar to drive system 10.

Drive system 110 is configured for operation with pump 19 and fluid displacement member 16 of FIGS. 2-4. FIGS. 8 and 9 show drive system 110, electric motor 112, drive mechanism 114, fluid displacement member 16, support frame 118*a*, and displacement pump 19. FIG. 10A shows drive system 110 with support frame 118*a*. FIG. 10B shows drive system 110 with support frame 118*b*. FIG. 10C shows drive system 110 with support frame 118*c*.

Drive mechanism 114 and electric motor 112 are substantially similar to drive mechanism 14 and electric motor 12 of drive system 10. Electric motor 112 can be a reversible motor in that stator 120 can cause rotation of rotor 122 in either of two rotational directions about motor axis A (e.g., clockwise or counterclockwise). Support frames 118*a*-118*c* are similar to support frame 18 but do not include axially extending base plate 70 of drive system 10.

As described with respect to electric motor 12, electric motor 112 includes stator 120, rotor 122, and axle 123. Electric motor 112 is disposed on axis A and extends from a first end (output end) 124 to an opposite second end (electrical input end) 126. Rotor 122 can be a housing having cylindrical body 128, first wall 130, and second wall 132. Rotor 122 includes permanent magnet array 134 disposed on inner circumferential face 135. Bearing 148, having outer race 149, inner race 150, and rolling elements 151, rotationally couples rotor 122 to stator 120 at electrical input end 126 of electric motor 112. Bearing 142, including inner race 143, outer race 144, and rolling elements 145, rotationally couples rotor 122 to stator 120 at axle end 146. Bearing 152, including outer race 153, inner race 154, and rolling elements 155, rotationally couples rotor 122 to support frame 118A at output end 124. Bearings 142, 148, and 152 can be preloaded by support frame 118A between output end 124 and input end 126. Wave spring washer 156 can be disposed between support frame 118A and bearing 152 at output end 124. Wave spring washer 157 can be disposed between support frame 118A and bearing 148 at input end 126. Bearing configurations of drive system 110 can be substantially the same as those disclosed with respect to drive system 10, including the bearing configurations shown and disclosed as alternatives.

Rotor 122 can be substantially similar to rotor 22 but can have some structural distinctions as provided below. These structural distinctions are non-limiting. Rotor 122 can be formed from a housing having cylindrical body 128, first wall 130, and second wall 132. Cylindrical body 128 and second wall 132 can be substantially the same as cylindrical body 28 and wall 32 of rotor 22. As illustrated in FIG. 9, first wall 130 can be disposed substantially perpendicular to motor axis A and can have a substantially uniform axial thickness as wall 130 extends in a radial direction. First wall 130 thereby lacks the thickened region present in the corresponding first wall 30 of rotor 22. Rotor 122 includes cylindrical projections 140 and 141 to support bearing 52 and 42, respectively. Cylindrical projections 140 and 141 are substantially similar to the corresponding cylindrical projections 40 and 41 on rotor 22.

Electric motor 112 can be cantilevered from support frame 118*a*-118*c* such that electrical input end 126 disposed opposite output end 124 is a free end of the cantilevered electric motor 112. Support frame 118*a*-118*c* extends from bearing 152 at output end 124 to axle 123 at electrical input end 126. Support frame 118*a*-118*c* extends around an exterior surface of rotor 122 and is spaced therefrom to allow unobstructed rotation of rotor 122 inside support frame 118*a*-118*c*. Support frame 118*a*-118*c* does not completely enclose rotor 122 and no parts exist between support frame 118*a*-118*c* and the exterior of rotor 122. Thus, support frame 118*a*-118*c* allows airflow through itself and over rotor 122. Support frame 118*a*-118*c* connects to axle 123 to fix stator 120 in an axial position relative to rotor 122. Support frame 118*a*-118*c* can be removably fastened to axle 123. Support frame 118*a*-118*c* fixes axle 123 to prevent relative movement between stator 120 and support frame 118*a*-118*c*. Neither axle 123 nor stator 120 are fixed to support frame 118*a*-118*c* at output end 124. Instead, a portion of rotor 122 is disposed axially between and separates axle 123 and stator 120 from support frame 118*a*-118*c* at output end 124.

As described with respect to support frame 18 of drive system 10, support frame 118*a*-118*c* is dynamically connected to rotor 122 by a bearing interface and statically connected to stator 120. Support frame 118*a*-118*c* is statically connected to pump 19. Electric motor 112 is dynamically connected to support frame 118*a*-118*c* via rotor 122 and statically connected to support frame 118*a*-118*c* via stator 120. Electric motor 112 is dynamically connected to pump 19 via fluid displacement member 16. Pump 19 is statically connected to support frame 118*a*-118*c* and dynamically connected to electric motor 112.

Each of support frames 118*a*-118*c* include pump frame 158. Support frame 118*a* includes support member 160*a*. Support frame 118*b* includes support member 160*b*. Support frame 118*c* includes support member 160*c*. Each of support members 160*a*-160*c* include a plurality of connecting members 168. Support member 160*a* includes frame member 172*a*. Support member 160*b* includes frame member 172*b*. Support member 160*c* includes frame member 172*c*.

As disclosed with respect to drive system 10, pump frame 158 can be disposed in a first plane normal to motor axis A at output end 124. Frame member 172*a*-172*c* can be disposed in a second plane normal to motor axis A at input end 126. The first and second planes are spaced along axis A and do not intersect. Pump frame 158 is separated from frame member 172*a*-172*c* by stator 120 such that pump frame 158 is disposed on one end of stator 120 and frame member 172*a*-172*c* is disposed on an axially opposite end of stator 120. A portion of rotor 122 is disposed between pump frame 158 and frame member 172*a*-172*c*. A portion of rotor 122 extends in axial direction AD1 through pump frame 158. A plurality of connecting members 168 can extend across and be spaced radially from an exterior surface of rotor 122 to connect pump frame 158 to frame member 172*a*-172*c*. Connecting members 168 are spaced radially from the exterior surface of rotor 122 to allow rotation of rotor 122 within support frame 118*a*-118*c*. It is understood that support frame 118*a*-118*c* can include any desired number of connecting members 168 between first pump frame 158 and frame member 172*a*-172*c*, such as two, three, four, or more connecting members 168 as needed to support motor 112 and pump 19 and is not limited to the embodiments illustrated in FIGS. 10A-10C.

Pump frame 158 is substantially similar to pump frame 58 of drive system 10, having pump housing portion 162, outer frame body 163, projections 164*a*, support ribs 165, and hub 167. Bearing 152 is received in hub 167 of pump frame 158 and pump frame 158 extends radially outward from bearing 152. A plurality of ribs 165 can extend between bearing 152 and outer frame body 163 to support load from bearing 152, while reducing a weight of pump frame 158. Ribs 165 can be spaced circumferentially around hub 167 and can vary in length depending on a shape of outer frame body 163. Pump frame 158 is axially spaced from wall 130 of rotor 122 and radially separated from the portion of rotor 122 extending through pump frame 158 by bearing 152.

Frame members 172*a*-172*c* are substantially similar to frame member 72 of drive system 10. Each frame member 172*a*-172*c* includes hub 174, projections 164*b*, and ribs 175. An opening through hub 174 can receive a portion of axle 123 such that frame member 172*a*-172*c* is in direct contact with axle 123. Frame member 172*a*-172*c* is disposed at the cantilevered, free electrical input end 126 of motor 112. Frame member 172*a*-172*c* is disposed in contact with an outer surface of axle 123. By maintaining contact with axle 123, frame member 172*a*-172*c* can draw heat away from stator 120 via thermal conduction. Both axle 123 and support frame 118*a*-118*c* can be formed from a thermally conductive material (e.g., aluminum) capable of conducting heat from inside stator 120 to electrical input end 126 and frame member 172*a*-172*c*. Axle 123 axially overlaps stator 120 along a full axial length of stator 120. Axle 123 is capable of drawing heat from stator 120 and conducting heat toward electrical input end 126 and axially outward of stator 120. Axle 123 transfers heat to frame member 172*a*-172*c* via conduction at locations where frame member 172*a*-172*c* is in contact with axle 123. As such, the conductive pathway for heat transfer from stator 120 extends through axle 123 to frame member 172*a*-172*c*. Frame member 172*a*-172*c* can be in fixed contact with both an axially extending surface of axle 123 and a radially extending end face of axle 123. Frame member 172*a*-172*c* can extend radially from axle 123 to transfer heat radially away from axle 123 and away from electric motor 112. The heat conduction path can extend radially outward of stator 20 and, in some examples, of motor 12 due to frame members 172*a*-172*c* extending radially outward relative to axis A. A shape and surface area of frame member 172*a*-172*c* can be selected to facilitate heat transfer away from electric motor 112.

Frame member 172*a*-172*c* can be fastened to axle 123 in any desired manner that prevents axial displacement and rotation of frame member 172*a*-172*c* relative to axle 123 and fixes an axial position of stator 120 relative to rotor 122. In some embodiments, frame member 172*a*-172*c* can be slip fit onto the outer surface of axle 123 and fastened to the outer surface of axle 123 with one or more fasteners 177, such that frame member 172*a*-172*c* is fixed relative to axle 123 and in contact with axle 123 along the outer surface of axle 123. Frame member 172*a*-172*c* can be secured to axle 123 such that contact is maintained between frame member 172*a*-172*c* and axle 123 during operation to provide a conductive pathway for heat transfer from stator 120 to frame member 172*a*-172*c*. A thickness of frame member 172*a*-172*c* in an axial direction along axis A at hub 174 can be increased to increase a contact surface area between frame member 172*a*-172*c* and axle 123 and thereby increase heat transfer capacity. Fasteners 177 can be bolts, rivets, screws, or other fastening mechanisms known in the art. Fasteners 177 can secure frame member 172*a*-172*c* to an axial end of axle 123 opposite end 146. Fasteners 177 can be axially extending and can be disposed through an end face of frame member 172*a*-172*c* into axle 123 in axial direction AD1. Fasteners 177 can secure frame member 172*a*-172*c* to retaining members disposed on a radially inner surface of axle 123. In some examples, fasteners 177 can be formed from thermally conductive materials to facilitate heat transfer from axle 123 to frame member 172*a*-172*c*.

In some embodiments, frame member 172*a*-172*c* can have a lip member 176 that extends radially inward from hub 174. Lip member 176 can abut and maintain contact with an end face of axle 123. Lip member 176 can set and maintain an axial position of frame member 172*a*-172*c* with respect to bearing 148. Fasteners 177 can extend through lip member 176. Lip member 176 further increases the contact area between axle 123 and frame member 172*a*-172*c* to further facilitate heat transfer.

Pump frame 158 and frame member 172*a*-172*c* have projections 164*a* and 164*b*, respectively. Projections 164*a*, 164*b* can extend radially outward from motor axis A such that a distal end of each projecting member 164*a*, 164*b* is disposed radially outward of rotor 122. Projections 164*a*, 164*b* can be shaped to provide structural integrity to support frame 118*a*-118*c*, while limiting an amount of weight added to drive system 110. Projecting member 164*b*, which can be referred to as an arm, on frame member 172*a*-172*c* can direct heat radially outward from axle 123. Projections 164*b* provide increased surface area relative a plate to further facilitate heat transfer and cooling of motor 112. Projections 164*a*, 164*b* are rigid. Projections 164*a*, 164*b* can be solid or can have openings allowing airflow therethrough and for further increasing surface area for heat transfer. As illustrated in FIGS. 10A-10C, projections 164*a*, 164*b* can be ribbed or have ridges and troughs, which can increase surface area for heat transfer and can reduce weight while providing structural integrity. Hub 174 can be similarly shaped with ridges and troughs circumferentially spaced to increase surface area for heat transfer. A quantity, shape, and positional arrangement of projections 164*b* on frame member 172*a*-172*c* can be selected to provide effective heat transfer away from stator 120 via axle 123 and away from electric motor 112. Some of the contemplated arrangements for projections 164*a* are illustrated in FIGS. 10A-10C.

Projections 164*a*, 164*b* on each of pump frame 158 and frame member 172*a*-172*c* can be arranged symmetrically or asymmetrically and with equal or unequal spacing relative each other and about axis A. As illustrated in FIG. 10A, pump frame 158 and frame member 172*a* can have three axially aligned projections 164*a*, 164*b*, arranged in a Y-configuration. Other configurations of projections 164*a*, 164*b* can also provide sufficient structural support and heat transfer capability. As illustrated in FIG. 10B, pump frame 158 and frame member 172*b* can have three axially aligned projections 164*b*, 164*a* asymmetrically arranged around motor axis A in a T-shape configuration and, in the example shown, predominantly positioned on a lower portion of electric motor 112. As illustrated in FIG. 10C, pump frame 158 and frame member 172*c* can have four axially aligned projections 164*b*, 164*a* arranged in an X-configuration, which provides increased surface area to provide for efficient heat transfer away from motor 112. In alternative embodiments, projections 164*b* on pump frame 158 can be offset from projections 164*a* on frame member 172*a*-172*c* such that connecting members 168 are angled with respect to axis A between pump frame 158 and frame member 172*a*-172*c*.

In some embodiments, additional projections 164*a* can be provided on pump frame 158 as illustrated in FIGS. 10A-10C to accommodate alternative frame members 172*a*-172*c* and connecting members, and to facilitate connection of other components thereto, such as a handle or control panel.

Connecting members 168 secure pump frame 158 to frame member 172*a*-172*c*. Connecting members 168 are rigid and capable of maintaining a fixed relationship between pump frame 158 to frame member 172*a*-172*c* during operation of drive system 110. Additionally, connecting members 168 are configured to support torque loads generated by electric motor 112 and transmitted through pump frame 158 to frame member 172*a*-172*c* and to further support pump reaction loads generated by reciprocation of fluid displacement member 16 and transferred through motor 12 and also transmitted through pump frame 158.

Connecting members 168 can be tie rods, which can be received at distal ends of projections 164*a*, 164*b*. Connecting members 168 can be fastened to distal ends with a threaded fastener, such as a screw or a bolt. Alternative fastening mechanisms as known in the art can be used to secure connecting members 168 to each of pump frame 158 to frame member 172*a*-172*c*. In some embodiments, at least one connecting member 168 can be configured as a handle for ease of carrying drive system 110.

In some embodiments, a single connecting member can connect multiple projections 164*a* on pump frame 158 with multiple projections 164*b* of frame member 172*a*-172*c*, as provided in drive system 10 by base plate 70. In some embodiments, projections 164*a*, 164*b* can support control panel 13 (not shown). As provided in drive system 10, control panel 13 can be mounted to a frame member 172*a*-172*c*. In other embodiments, control panel 13 can be mounted between projections 164*a*, 164*b*, such as at a location where control panel 13 axially overlaps with motor 12.

During operation of pump 19, the pump reaction forces generated by fluid displacement member 16 during pumping are transmitted to pump frame 158 via drive mechanism 114, rotor 122, bearing 152, bearing 148, axle 123, and support member 160. Fluid displacement member 16 receives a downward reaction force when moving through the upstroke and an upward reaction force when moving through the downstroke. Both the upward reaction force and the downward reaction force travel through drive mechanism 114, rotor 122, and then to bearings 152, 148, 142. Bearings 152, 148, 142 transfer rotational forces associated with rotation of rotor 122 and both of the upward and downward reaction forces to pump frame 158. With each stroke, pump reaction forces are generated and a load is applied to rotor 122 due to rotor 122 directly driving fluid displacement member 16 via drive mechanism 114. The pump reaction forces are axial loads generally along pump axis PA. The pump reaction forces transmitted through drive mechanism 114 to rotor 122 are generally downward during an upstroke and generally upward during a downstroke.

This axial pump reaction load is transverse to rotational axis A of electric motor 112 and is experienced at both output and input ends 124 and 126 of electric motor 112. The load is transmitted to pump frame 158 via bearings 152 and 148 and support member 160 such that pump reaction forces on bearing 142 are minimized, maintaining proper air gap. At output end 124, the load is transmitted from rotor 122 to pump frame 158 through bearing 152. At electrical input end 126, the load is transmitted from rotor 122 to pump frame 158 through bearing 148 and support member 160. Bearings 152 and 148 experience opposite reactionary forces with each pump stroke to provide a force balance at pump frame 158.

Pump reaction forces are thereby transmitted to rotor 122 from fluid displacement member 16. Bearings 152 and 148 balance the load across rotor 122 and transmit the load to pump frame 158. Bearing 152 is directly connected to pump frame 158. Bearing 148 is connected to pump frame 158 via support member 160, which transmits loads to pump frame 158 from bearing 148. Support member 160 thereby transmits pump loads from rotor 122 to pump frame 158. Pump frame 158 can be mounted to a stand or other support surface and can transmit reaction forces to the stand or other support surface.

Figure 11:
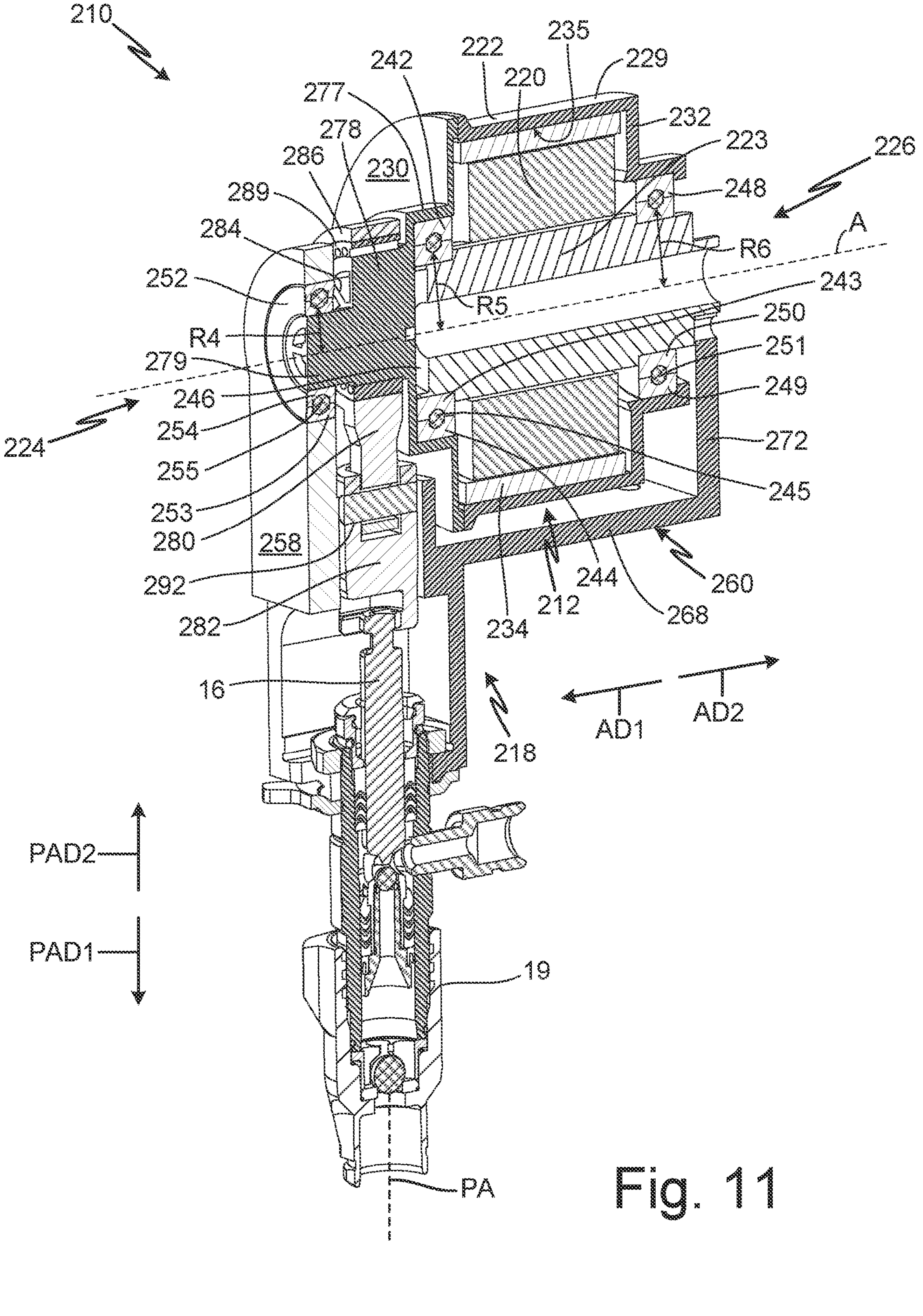
FIG. 11 is an isometric front side cross-sectional view of yet another embodiment of a drive system and displacement pump.

FIG. 11 is an isometric cross-sectional view of drive system 210 with fluid displacement pump 19 of FIG. 2. FIG. 12 is an isometric front and side view of drive system 210. Drive system 210 is an alternative embodiment of an outer rotator drive system. The operation of drive system 210 is substantially similar to drive systems 10 and 110. Drive system 210 utilizes a different eccentric driver, bearing structure, and pump frame configuration, as described herein. The eccentric driver of drive system 210 is integrally formed with the outer rotor and configured to provide a 1:1 ratio of rotor rotation to pump cycle. Drive system 210 is configured for operation with pump 19 and fluid displacement member 16 of FIGS. 2-4. Drive system 110 can accommodate fluid displacement member 16 and fluid displacement pump 19 of drive system 10.

Electric motor 212, drive mechanism 214, fluid displacement member 16, support frame 218, and displacement pump 19 are shown.

Electric motor 212 includes stator 220, rotor 222, and axle 223. Electric motor 212 is disposed on axis A and extends from a first end (output end) 224 to an opposite second end (electrical input end) 226. Electric motor 212 can be a reversible motor in that stator 220 can cause rotation of rotor 222 in either of two rotational directions about motor axis A (e.g., clockwise or counterclockwise). Rotor 222 can be formed of a housing having cylindrical body 229 disposed between first wall 230 and second wall 232. Rotor 222 includes permanent magnet array 234 disposed on inner circumferential face 235. Bearing 242, having inner race 243, outer race 244, and rolling elements 245, couples rotor 222 to stator 220 at axle end 246. Bearing 248, having outer race 249, inner race 250, and rolling elements 251, couples rotor 222 to stator 220 at electrical input end 226.

Support frame 218 includes pump frame 258 and support member 260. Support member 260 extends from pump frame 258 at output end 224 to axle 223 at electrical input end 226. Support member 260 can include connecting member 268 and frame member 272. Pump frame 258 is coupled to rotor 222 at output end 224 via bearing 252, having outer race 253, inner race 254, and rolling elements 255. Pump frame 258 and frame member 272 are disposed in planes tangential to motor axis A and at opposite ends of motor 212. Connecting member 268 connects pump frame 258 and frame member 272 across motor 212.

Bearings 242, 248, and 252 are disposed about rotational axis A, such that rotating members of bearings 242, 248, and 252 rotate on rotational axis A. Bearings 242, 248, and 252 can be substantially similar in size or can vary in size to support differing loads and to accommodate space constraints. As illustrated in FIG. 11, bearings 242 and 248 can be substantially similar in size, while bearing 252 at output end 224 can be smaller. Bearings 242, 248, and 252 can vary in size and the rolling elements of bearing 242, 248, and 252 can vary in radial position from axis A. Rolling elements 255 of bearing 252 can be disposed at a first radius R4 from rotational axis A of electric motor 112, rolling elements 245 of bearing 242 can be disposed at a second radius R5 from rotational axis A, and rolling elements 251 of bearing 248 can be disposed at a third radius R6 from rotational axis A. As illustrated in FIG. 11, first radius R4 can be smaller than both second and third radii R5 and R6.

Drive mechanism 214 includes cylindrical projection 278, drive member 280, drive link 282, follower 286, bearing surface 289, slot 290, and pin 292. Fluid displacement member 16 includes connector 93. Pump 19 includes cylinder 94 and check valves 95, 96.

As discussed in further detail below, support frame 218 is dynamically connected to rotor 222 by a bearing interface and statically connected to stator 220. Support frame 218 is statically connected to pump 19. Electric motor 212 is dynamically connected to support frame 218 via rotor 222 and statically connected to support frame 218 via stator 220. Electric motor 212 is dynamically connected to pump 19 via fluid displacement member 16. Pump 19 is statically connected to support frame 218 and dynamically connected to electric motor 212.

Electric motor 212 includes inner stator 220 and outer rotor 222. Motor 212 can be configured to be powered by any desired power type, such as direct current (DC), alternating current (AC), and/or a combination of direct current and alternating current. Stator 220 includes armature windings (not shown) and rotor 222 includes permanent magnets. Rotor 222 is configured to rotate about motor rotational axis A in response to direct current or alternating current signals through stator 220. Rotor 222 is connected to fluid displacement member 116 at output end 224 via drive mechanism 214. Drive mechanism 214 receives a rotary output directly from rotor 222 and provides a linear, reciprocating input to fluid displacement member 16 (best seen in FIG. 11). Pump frame 258 mechanically supports electric motor 212 at the output end 224 and mechanically supports fluid displacement pump 19. Pump frame 258 at least partially houses fluid displacement member 16 of fluid displacement pump 19.

Stator 220 defines axis A of electric motor 212. Stator 220 is disposed around and supported by axle 223. Stator 220 is fixed to axle 223. Electric current can be supplied to the armature windings through electrical input end 226 of electric motor 212. Axle 223 can be a hollow shaft open to input end 226 for receiving the electrical wiring. In alternative embodiments, axle 223 can be solid, can have a key, can be D-shaped, or other similar design. In some embodiments, axle 223 can be defined by a plurality of cylindrical cross-sections taken perpendicular to axis A that are of varying diameters to accommodate mechanical coupling with support frame 218 at electrical input end 226 and coupling with rotor 222 at axially opposite ends of axle 223.

Rotor 222 is disposed coaxially around stator 220 and is configured to rotate about axis A. Rotor 222 can be formed from a housing having cylindrical body 229, extending between first wall 230 and second wall 232, and positioned such that rotor 222 extends around three sides of stator 220 (e.g., a first axial end, second axial end, and the radial side). Rotor 222 includes a permanent magnet array 234. Permanent magnet array 234 can be disposed on an inner circumferential face 235 of cylindrical body 229. An air gap separates permanent magnet array 234 from stator 220 to allow for rotation of rotor 222 with respect to stator 220.

Rotor 222 can overlap stator 220 and axle 223 over a full radial extent of stator 220 and axle 223 at output end 224 of electric motor 212. Rotor 222 can fully enclose stator 220 and axle 223 at output end 224 of electric motor 212. Rotor 222 can, in some examples, overlap stator 220 over a full radial extent of stator 220 at electrical input end 226 of electric motor 212. Second wall 232 can extend from cylindrical body 229 radially inward toward axle 223. Axle 223 can extend through an opening in second wall 232 concentric with axle 223 and can extend axial outward of second wall 232 in axial direction AD2. First and/or second walls 230, 232 can be formed integrally with cylindrical body 229 or can be mechanically fastened to cylindrical body 229.

First wall 230 of rotor 222 can be rotationally coupled to an outer diameter of axle 223 via bearing 242 at axle end 246. Bearing 242 includes inner race 243, outer race 244, and rolling elements 245. In some examples, bearing 242 can be a roller or ball bearing in which rolling elements 245 are formed by cylindrical members or balls. Rotor 222 can be coupled to outer race 244. Axle 223 can be coupled to inner race 243. Rolling elements 245 allow rotation of rotor 222 with respect to stator 220. Bearing 242 support loads and maintain the air gap between permanent magnet array 234 and stator 220.

Second wall 232 of rotor 222 can be rotationally coupled to axle 223 at input end 226 via bearing 248. Bearing 248 includes outer race 249, inner race 250, and rolling elements 251. Rotor 222 can be coupled to outer race 249 and axle 223 can be coupled to inner race 250. Rolling elements 251 allow rotation of rotor 222 with respect to stator 220. In some examples, bearing 248 can be a roller or ball bearing in which rolling elements 251 are cylindrical members or balls. Axle 223 can extend through rotor 222 at electrical input end 226 and can project axially outward of bearing 248 in axial direction AD2 to allow for coupling of axle 223 with support frame 218. Bearing 248 can be provided to maintain the air gap between permanent magnet array 234 and stator 220.

In contrast to drive systems 10 and 110, rotor 222 rides outside of both bearings 242 and 248. As illustrated in FIG. 11, no portion of rotor 222 at end 246 of axle extends into axle 223.

Rotor 222 can include a cylindrical housing 277 that extends in an axial direction AD1 from wall 230. Cylindrical housing 277 can be coupled to outer race 244 of bearing 242, allowing rotor 222 to ride outside of bearing 242. Cylindrical housing 277 can extend around and end face of outer race 244 to axial retain bearing 242. Second wall 232 can have radially extending annular flange 238 at an inner diameter opening. Annular flange 238 can be rotationally coupled to axle 223, such as by bearing 248. Annular flange 238 can at least partially define a receiving shoulder for receiving the outer race 249 of bearing 248 and preloading bearing 248.

Rotor 222 can include a first cylindrical projection 278 that extends in axial direction AD1 outward from axle 223 at output end 224. Cylindrical projection 278 has a center offset from rotational axis A and forms an eccentric driver of drive mechanism 214.

Rotor 222 can further include a second cylindrical projection 279 that extends in axial direction AD1 outward from cylindrical projection 278. Cylindrical projection 279 can be rotationally coupled to pump frame 258 via bearing 252. Cylindrical projection 279 has a center aligned with rotational axis A such that cylindrical projection 279 rotates on rotational axis A. Cylindrical projection 279 can be received in pump frame 258 and separated from pump frame 258 by bearing 252. Bearing 252 can be of any desired configuration suitable for facilitating relative motion between pump frame 258 and cylindrical projection 279. For example, bearing 252 can be a roller or ball bearing allowing rotational motion of rotor 222 relative to pump frame 258. As illustrated in FIGS. 11 and 12, cylindrical projection 278, forming the eccentric driver, is disposed between first wall 230 of rotor 122 and an inner side of pump frame 258.

Pump frame 258 mechanically supports electric motor 212 at output end 224 and at least partially houses fluid displacement member 16. Pump frame 258 can be mechanically coupled to both rotor 222 and stator 220. Pump frame 258 can be mechanically coupled to rotor 222 at output end 224 and mechanically coupled to axle 223 at electrical input end. Axle 223 is mechanically coupled to pump frame 258 to fix stator 220 relative to pump frame 258. Axle 223 is fixed to pump frame 258 such that stator 220, which is fixed to axle 223, does not rotate relative to pump frame 258 or motor rotational axis A.

Electric motor 212 can be cantilevered from pump frame 258 such that input end 226 disposed opposite output end 224 is a free end of the cantilevered electric motor 212. Support member 260 can extend around an exterior of rotor 222 from pump frame 258 to axle 223 to connect pump frame 258 to axle 223 such that stator 220, via axle 223, is fixed relative to pump frame 258. Support member 260 can be removably fastened to axle 223. Support member 260 fixes axle 223 to pump frame 258 to prevent relative movement between stator 220 and pump frame 258. Neither axle 223 nor stator 220 are fixed to pump frame 258 at output end 224. Instead, a portion of rotor 222 is disposed axially between and separates axle 223 and stator 220 from pump frame 258.

Support member 260 can extend from a location radially inward of an exterior of cylindrical body 229 of rotor 222 to a location radially outward of cylindrical body 229. Support member 260 can extend around rotor 222 with sufficient spacing therefrom to allow unobstructed rotation of rotor 222 inside of support member 260. Support member 260 includes one or more connecting members 268 extending across cylindrical body 229 and at least one frame member 272 disposed on input end 226 and coupled to axle 223. Connecting member 268 can extend outward of first wall 230 in axial direction AD1 and can extend axially outward of second wall 232 in axial direction AD2. Connecting members 268 of support member 260 can extend parallel to axis A.

Frame member 272 of support member 260 can extend substantially parallel to second wall 232 and can be axially spaced therefrom. Frame member 272 extends from axle 223 to a location radially outward of cylindrical body 229 where frame member 272 joins with connecting member 268. Frame member 272 interfaces with and can be fixed to axle 223. Support member 260 connects to pump frame 258 at output end 224. Support member 260 fixes an axial location of stator 220 with respect to rotor 222 and holds electric motor 212 together. Support member 260 can be a unitary body or can include multiple components fastened together and capable of maintaining stator 220 via axle 223 in a fixed axial location relative to rotor 222 and pump frame 258.

Pump frame 258 is mechanically coupled to rotor 222 via bearing 252 at output end 224. Bearing 252 includes outer race 253, inner race 254, and rolling elements 255. Bearing 252 can be a roller or ball bearing in which rolling elements 255 are cylindrical members or balls. Rotor 222 can be received in pump frame 258, such that a portion of rotor 222 extends into pump frame 258 and is radially surrounded by a portion of pump frame 258. As such, rotor 222 is coupled to inner race 254 and pump frame is coupled to outer race 253. Rolling elements 255 allow rotational motion of rotor 222 relative to pump frame 258. Pump frame 258 mechanically supports electric motor 212 via bearing 258 and support member 260.

Additionally, pump frame 258 is configured to house a portion of pump 19 and secure pump 19 in fixed position relative to electric motor 212. Pump frame 258 can be configured to mount to a cart or stationary assembly for ease of operation and transport.

Drive mechanism 214 includes cylindrical projection 278, which forms the eccentric driver, drive member 280, and drive link 282. Cylindrical projection 278 is provided on rotor 222 of electric motor 212 and rotates with rotor 222. In the example shown, cylindrical projection 278 is integrally formed with first wall 230 of rotor 222. Because cylindrical projection 278 is offset from rotational axis A, rotation of rotor 222 causes cylindrical projection 278 to rotate about rotational axis A. Drive member 280 is mechanically coupled to cylindrical projection 278 and is configured to drive reciprocation of fluid displacement member 16. Cylindrical projection 278 is directly coupled to drive member 280 without intermediate gearing to provide a 1:1 ratio of rotor rotation to pump cycle.

In some embodiments, cylindrical projection 278 can have a substantially hollow body with cavities defined by a plurality of ribs 284. Ribs 284 can extend radially outward from cylindrical projection 278 to an outer cylindrical wall of cylindrical projection 278. Ribs 284 support drive member 280 and can reduce a weight of cylindrical projection 278. Ribs 284 can be spaced circumferentially around cylindrical projection 278. Ribs 284 can extend around a portion of cylindrical projection 278 that is less than a full circumference of cylindrical projection 278. Ribs 284 can vary in a radial length between cylindrical projection 278 and the outer wall of cylindrical projection 278 depending on the location of ribs 284. Cylindrical projection 279 can also have a substantially hollow body with cavities defined by a plurality of ribs as illustrated in FIGS. 11 and 12.

Drive member 280 can be a connecting rod with follower 286 at one end configured to receive cylindrical projection 278. Follower 286 can include a bearing member 289 to allow drive member 280 to move in a rocking motion about cylindrical projection 278 as cylindrical projection 278 rotates with rotor 222. Drive member 280 can be coupled to fluid displacement member 16 via drive link 282 in a manner consistent with that disclosed for drive system 10. Drive member 280 translates the rotational motion of cylindrical projection 278 into reciprocating motion and drives fluid displacement member 16 via drive link 282 in a reciprocating manner. The operation of drive mechanism 214 and pump 19 is consistent with that disclosed for drive system 10. With each revolution of rotor 222, drive link 282 is forced both upward and downward. In this manner, drive mechanism 214 translates each revolution of rotor 222 into a linear up and down motion. Drive link 282 is coupled to fluid displacement member 16 and accordingly pulls fluid displacement member 16 through an upstroke and pushes fluid displacement member 16 through a downstroke. As such, for each revolution of rotor 222, the pump proceeds through a full pump cycle, including an upstroke and a downstroke. The increased torque facilitates rotor 222 generating sufficiently high pumping pressures with displacement pump 19 to generate an atomized spray at spray apparatus 5 (FIG. 4). In some examples, rotor 22 can cause pump 19 to generate pumping pressures of about 3.4-69 megapascal (MPa) (about 500-10,000 pounds per square inch (psi)) or even higher. In some examples, the pumping pressures are in the range of about 20.7-34.5 MPa (about 3,000-5,000 psi). High fluid pumping pressure is useful for atomizing the fluid into a spray for applying the fluid to a surface.

During operation of pump 19, the pump reaction forces generated by fluid displacement member 16 during pumping are transmitted to pump frame 258 via drive mechanism 214, rotor 222, bearing 252, bearing 248, axle 223, and support member 260. Both the upward reaction force and the downward reaction force travel through drive mechanism 214, rotor 222, and then to bearings 252, 242, and 248. Bearings 252, 242, and 248 transfer rotational forces associated with rotation of rotor 222 and both of the upward and downward reaction forces to pump frame 258.

This axial pump reaction load is transverse to rotational axis A of electric motor 212 and is experienced at both output and electrical input ends 224, 226 of electric motor 212. The load is transmitted to pump frame 258 via bearings 252, 248 and support member 260 such that pump reaction forces on bearing 242 are minimized, maintaining proper air gap. At output end 224, the load is transmitted from rotor 222 to pump frame 258 through bearings 252 and 242. At electrical input end 246, the load is transmitted from rotor to pump frame 258 through bearing 248 and support member 260. Bearing 252 experiences opposite reactionary forces of bearing 248 with each pump stroke to provide a force balance at pump frame 258. It is understood that the loads can be reacted to support member 260, such as to member 268, in examples where member 268 is mounted to an object or surface to support drive system 210.

Pump reaction forces are thereby transmitted to rotor 222 from fluid displacement member 16 during pumping. Bearings 242 and 248 balance the load across rotor 222 and transmit the load to static frame members.

The bearing arrangement of system 210 provides significant advantages. Bearings 242, 248, and 252 react pump reaction loads generated during pumping. Bearings 242, 248, and 252 stabilize rotor 222 to facilitate a direct drive connection to fluid displacement member 16. The pump reaction forces experienced at output end 224 and electrical input end 226 are transmitted to pump frame 258 and connecting member 260, balancing the forces across pump frame 258. The connection balances motor 212, providing longer life, less wear, less downtime, more efficient operation, and cost savings. Bearing 242 further aligns rotor 222 on pump axis A. Bearing 242 minimizes the unsupported span of rotor 222, aligning rotor 222 and preventing undesired contact between rotor 222 and stator 220. Bearing 242 thereby increases the operational life of motor 212.

The direct drive configuration of drive system 210 eliminates intermediate gearing (e.g., reduction gears) between electric motor 212 and fluid displacement member 16. The elimination of intermediate gearing provides a more efficient, compact, lower weight, reliable, and simpler pump by reducing the part count and number of moving parts. Additionally, the elimination of gearing provides for quieter pump operation.

Figure 13:
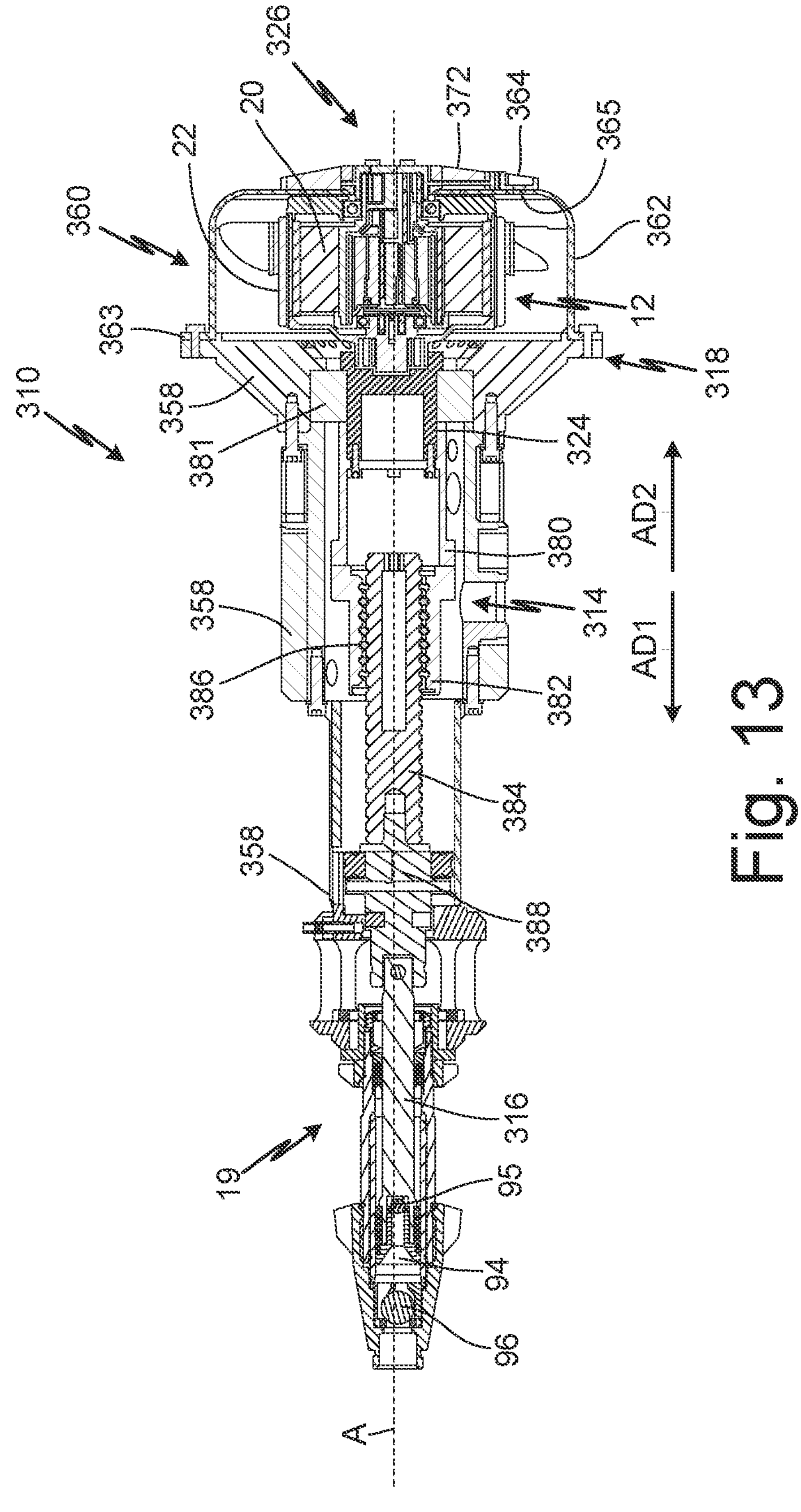
FIG. 13 is a cross-sectional side view of yet another embodiment of a drive system and displacement pump.
Figure 14:
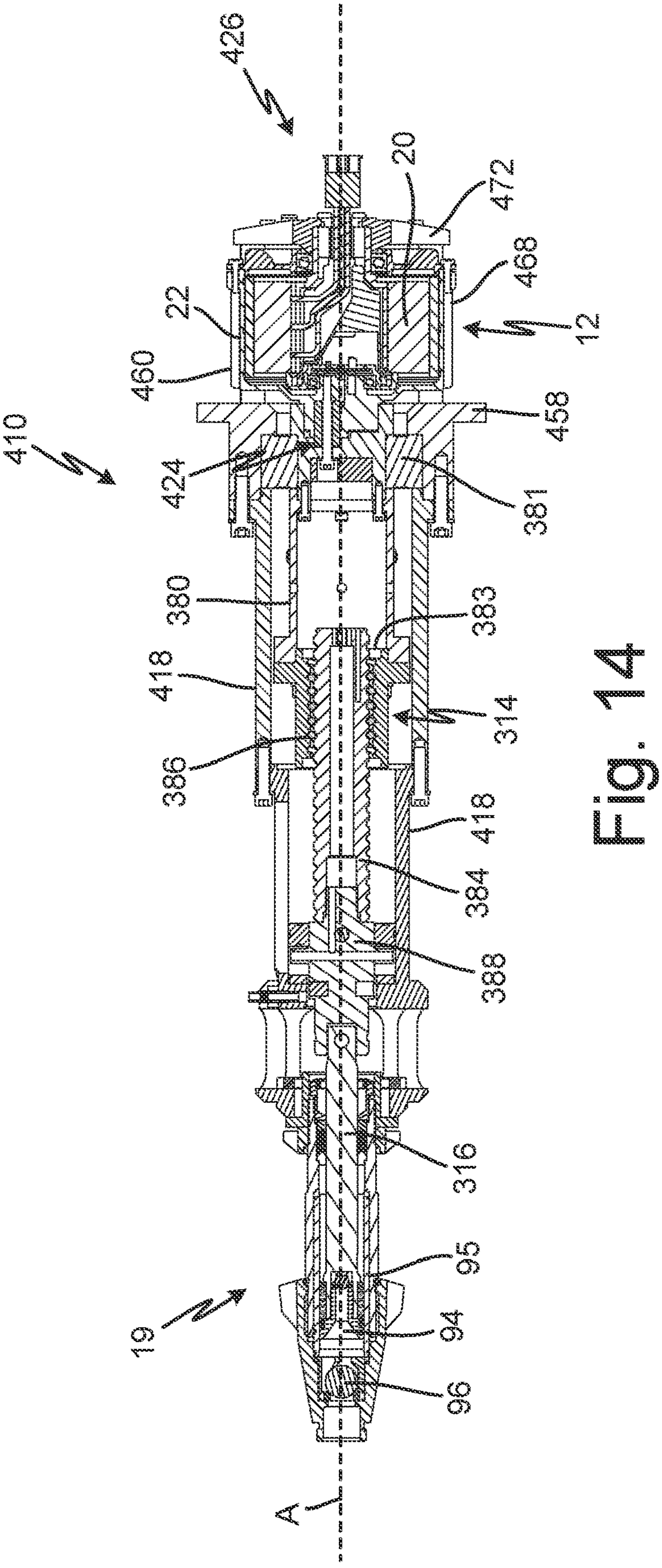
FIG. 14 is a cross-sectional side view of yet another embodiment of a drive system and displacement pump.

FIGS. 13 and 14 are isometric cross-sectional views of drive systems 310 and 410, respectively, assembled with pump 19 of FIG. 2. FIGS. 13 and 14 are discussed together. Drive systems 310 and 410 are substantially similar to drive system 10 with modifications configured to accommodate direct drive coupling with a coaxially disposed fluid displacement pump 19 and motor 12. Drive systems 310 and 410 each include electric motor 12 of drive system 10, including inner stator 20, outer rotor 22, and axle 23. Electric motor 12 and pump 19 are coaxially disposed about motor/pump axis A. In the embodiments illustrated in FIGS. 13 and 14, electric motor 312 can be a reversible motor in that stator 20 can cause rotation of rotor 22 in either of two rotational directions about motor/pump axis A (e.g., clockwise or counterclockwise). Drive systems 310 and 410 each include rotor shaft 380 and modified drive mechanism 314 and fluid displacement member 316. Drive systems 310 and 410 additionally have modified support frames 318, 418, which include pump frames 358 and 458 and support members 360 and 460, respectively, which differ from one another. Only modifications are discussed herein. All other aspects of electric motor 12 are provided in the description of drive system 10.

Pump frame 358, 458 is dynamically connected to rotor 22 by a bearing interface and statically connected to stator 20. Pump frame 358, 458 is statically connected to pump 19. Electric motor 12 is dynamically connected to pump frame 358, 458 via rotor 22 and statically connected to pump frame 358, 458 via stator 20. Electric motor 12 is dynamically connected to pump 19 via fluid displacement member 216. Pump 19 is statically connected to pump frame 358, 458 and dynamically connected to electric motor 12.

Pump frames 358, 458 mechanically support electric motor 12 at the output end 324 and mechanically supports fluid displacement pump 19. Pump frames 358, 458 at least partially house fluid displacement member 316 of pump 19. Pump frames 358, 458 are mechanically coupled to both rotor 22 and stator 20. Pump frames 358, 458 are mechanically coupled to rotor 22 at output end 224 via bearing 42 as described with respect to drive system 10 and illustrated in FIG. 2. Pump frames 358, 458 are mechanically fixed to stator 20 at input end 326 via support members 360, 460, respectively, and axle 23. Axle 23 is mechanically coupled to pump frames 358, 458 such that stator 20, which is fixed to axle 23, does not rotate relative to pump frames 358, 458 or motor rotational axis A. Pump frames 358, 458 are disposed coaxially with electric motor 12 and pump 19, extending outward from electric motor 12 in axial direction AD1. As illustrated in FIGS. 13 and 14, pump frames 358, 458 can be formed from multiple components assembled together to house and support rotor shaft 380 and drive mechanism 214. Pump frames 358, 458 can be dynamically coupled to rotor shaft 380 by bearing 381 to support and allow rotation of rotor shaft 380 within pump frame 358, 458.

As illustrated in FIG. 13, support member 360 can include cylindrical body 362, which can form a housing around rotor 22. Cylindrical body 262 can extend axially outward from pump frame 358 at output end 24 to input end 26. Cylindrical body 362 can include radially extending flange 363 at output end 24, which can be fastened to pump frame 358 with bolts or other fastening mechanisms. Cylindrical body 362 can radially overlap second wall 32 of rotor 22 at input end to substantially enclose rotor 22 at input end 26. Support member 360 can include frame member 372, which can fix support member 360 to axle 23. Frame member 372 can be substantially the same as frame member 72 of drive system 10 and can be secured to axle 23 in the same manner. Frame member 372 can be fastened to cylindrical body 362 by bolts 365 or similar fastening mechanisms. Bolts 365 can extend through one or more radially outer ends of projections of radially extending portion 364 (e.g., projections 64*a* as illustrated in FIGS. 6 and 10A-10C).

As illustrated in FIG. 14, support member 460 can be substantially the same as support member 160 of drive system 110. Support member 460 can include one or more connecting members 468 and a frame member 472. Connecting members can be substantially the similar to connecting members 68 and 168 and frame member 472 can be substantially similar to frame members 72, 172*a*, 172*b*, and 172*c* described with respect to drive system 110. Connecting members 68 can be mechanically fixed to pump frame 458 by bolts or other fastening mechanisms.

Drive mechanism 314 includes drive nut 382, screw 384, and rolling elements 386. Drive mechanism 314 is connected to rotor shaft 380. Drive mechanism 314 receives a rotational output from rotor 22 via rotor shaft 380. More specifically, drive nut 382 of drive mechanism 314 is connected to rotor shaft 380 to rotate about motor/pump axis A with rotor shaft 380. Drive nut 382 can be attached to rotor shaft 380 via fasteners (e.g., screws or bolts), adhesive, or press-fit, amongst other options. Screw 384 is disposed radially within drive nut 382. Rolling elements 386 are disposed between screw 384 and drive nut 382 and support screw 384 relative drive nut 382. Rolling elements 386 support screw 384 and drive nut 382 such that a gap is disposed radially between screw 384 and drive nut 382. Rolling elements 386 maintain the gap and prevent screw 384 and drive nut 382 from directly contacting one another.

Screw 384 is configured to reciprocate along motor/pump axis A during operation. As such, screw 384 provides the linear output from drive mechanism 314. Screw 384 can be coupled to fluid displacement member 316 via connector 388 to provide linear reciprocation of fluid displacement member 316 with reciprocation of screw 384. Stator 20 causes rotor 22 to rotate in a first rotational direction (e.g., clockwise or counterclockwise) about motor/pump axis A to cause drive nut 382 to rotate in the first rotational direction, causing rolling elements 386 to exert an axial driving force on screw 384 in axial direction AD1 and drive screw 384 and thereby fluid displacement member 316 linearly along motor/pump axis A in axial direction AD1 in a downstroke. Stator 20 causes rotor 22 to rotate in a second rotational direction (e.g., the other of clockwise or counterclockwise) about motor/pump axis A to cause drive nut 382 to rotate in the second rotational direction about motor/pump axis A causing rolling elements 386 to exert an axial driving force on screw 384 in axial direction AD2 and drive screw 384 and thereby fluid displacement member 316 linearly along motor/pump axis A in axial direction AD2 in an upstroke.

Outer rotator drive systems 310 and 410 provide significant advantages. Rotor 22 being an outer rotator disposed at least partially radially outside of stator 20 provides increased inertia and torque relative an inner rotator motor. The increased toque facilitates rotor 22 generating sufficiently high pumping pressures with displacement pump 19 to generate an atomized spray at an applicator such as a spray gun. For example, system 10 can be utilized to pump paint or other fluids to an airless spray gun, whereby the fluid pressure generates the atomized spray. In some examples, rotor 22 can cause pump 19 to generate pumping pressures of about 3.4-69 megapascal (MPa) (about 500-10,000 pounds per square inch (psi)) or even higher. In some examples, the pumping pressures are in the range of about 20.7-34.5 MPa (about 3,000-5,000 psi). High fluid pumping pressure is useful for atomizing the fluid into a spray for applying the fluid to a surface.

Figure 15:
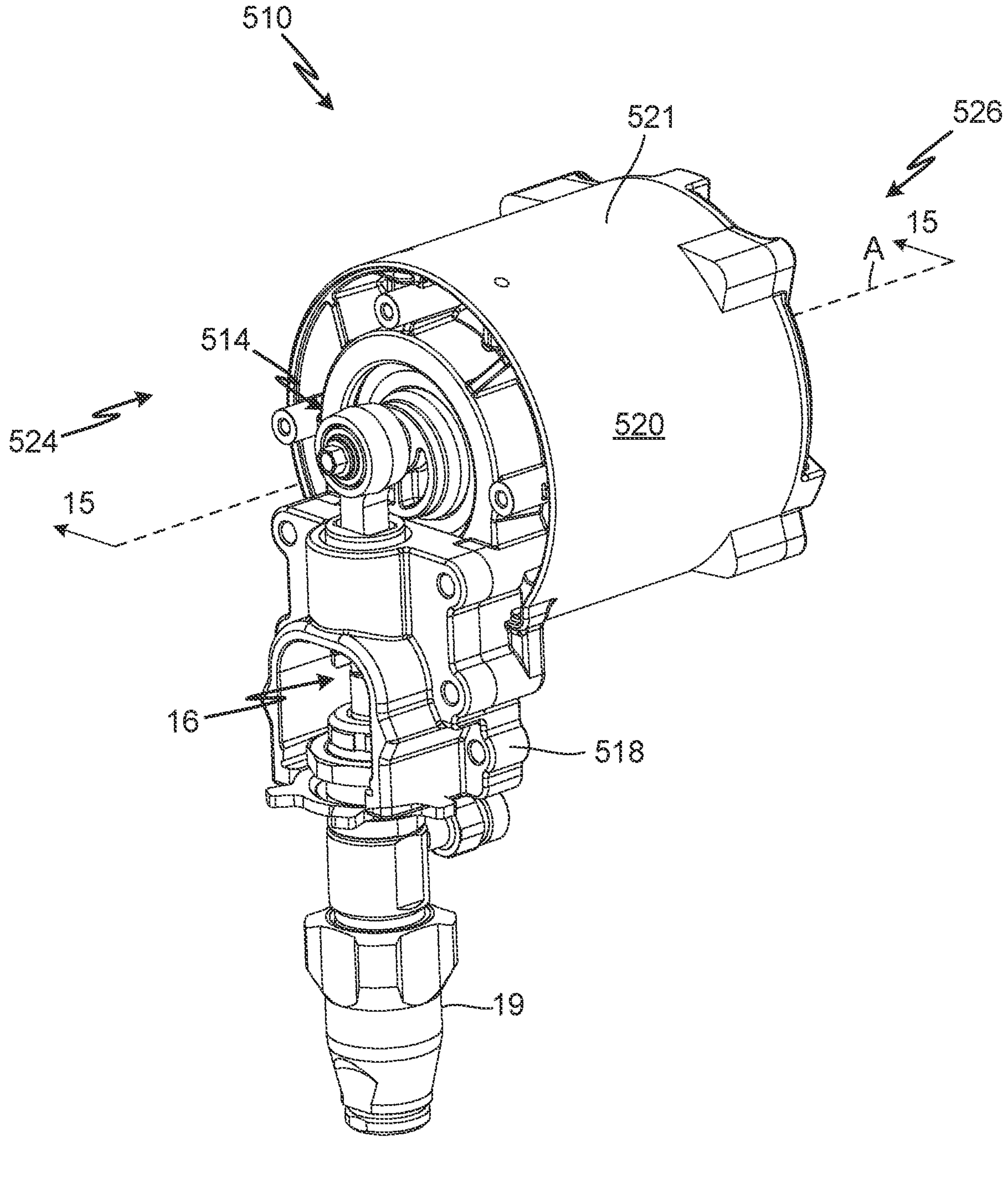
FIG. 15 is an isometric front side view of yet another embodiment of a drive system and displacement pump.
Figure 16:
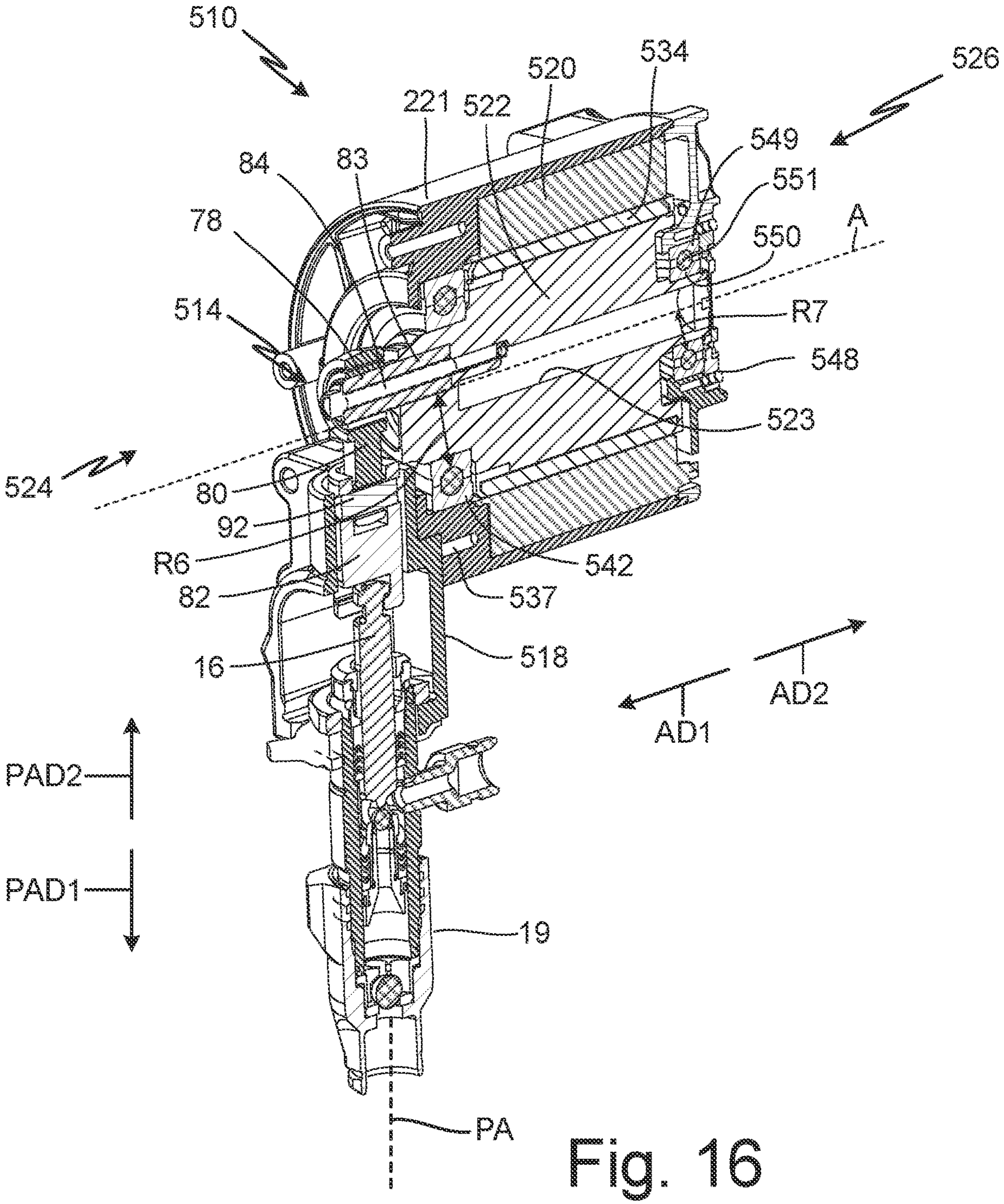
FIG. 16 is an isometric cross-sectional view of the drive system and displacement pump taken along the line 16-16 of FIG. 15.

FIGS. 15 and 16 illustrate drive system 510. FIG. 15 is an isometric front view of drive system 510. FIG. 16 is an isometric cross-sectional view of drive system 510 taken along the line 16-16 of FIG. 15. FIGS. 15 and 16 are discussed together. Drive system 510 is configured for use with drive mechanism 14, fluid displacement member 16, and fluid displacement pump 19 of drive system 10. Electric motor 512, drive mechanism 14, fluid displacement member 16, pump frame 518, and pump 19 are shown.

Electric motor 512 includes stator 520 and rotor 522. Electric motor 512 is disposed on axis A and extends from first end 524 to second end 526. Rotor 522 is supported by bearings 542 and 548. Bearing 242 has inner race 243, outer race 244, and rolling elements 245. Bearing 248 has outer race 249, inner race 250, and rolling elements 251. Rotor 522 includes bore 523 and permanent magnet array 534.

Motor 512 is an electric motor having outer stator 520 and inner rotor 522. Stator 520 includes armature windings (not shown) in stator housing 521. Rotor 522 includes a permanent magnet array 534. Rotor 522 is configured to rotate about pump axis A in response to current signals through stator 520. Rotor 522 is connected to the fluid displacement member 16 at first end 524 via drive mechanism 14. Drive mechanism 14 receives a rotary output from rotor 522 and provides a linear, reciprocating input to fluid displacement member 16. Pump frame 518 is configured to mechanically support electric motor 512 and a fluid displacement pump 19 (shown in FIG. 4). Electric motor 512 can be cantilevered from pump frame 518 such that second end 526 disposed opposite first end 524 is a free end of the cantilevered electric motor 512.

Rotor 522 defines rotational axis A. Stator 520 is disposed coaxially around rotor 522 and includes stator housing 521. Rotor 522 includes permanent magnet array 534 on an outer diameter surface. An air gap separates permanent magnet array 534 from stator 520 to allow for rotation of rotor 522 with respect to stator 520. Rotor 522 can be rotationally coupled to stator 520 at first end 524 second end 526 by bearings 542 and 548, respectively. Bearings 542 and 548 allow rotation of rotor 522 relative to stator 520.

Bearings 542 and 548 can be roller or ball bearings. Bearing 542 can be disposed at first end 524 and can include inner race 543, outer race 544, and rolling elements 545. Rotor 522 can be coupled to inner race 543 such that rotor 522 rides inside of bearing 542. Stator 520 can be coupled to outer race 544. Bearing 548 can be disposed at second end 546 and can include outer race 549, inner race 550, and rolling elements 551. Rotor 522 can be coupled to inner race 550 such that rotor 522 rides inside of bearing 548. Stator 520 can be coupled to outer race 549.

Bearings 542 and 548 are disposed about rotational axis A. Bearings 542 and 548 can vary in size and rolling elements 545 and 551 of bearings 542 and 548, respectively, can vary radial position from axis A. Rolling elements 545 of bearing 542 can be disposed at a radius R7 from rotational axis A of electric motor 12. Rolling elements 551 of bearing 548 can be disposed at a radius R8 from rotational axis A. Radius R7 of bearing 542 can be greater that radius R8 of bearing 548 to accommodate drive mechanism 14.

Bearing 542 can be larger in size than bearing 548 to support a pump load generated by reciprocation of fluid displacement member 16 during pumping and experienced by electric motor 512 as a result of the direct drive configuration.

Pump frame 518 mechanically supports electric motor 512 at first end 524 and at least partially houses fluid displacement member 16. Pump frame 518 can be mechanically coupled stator 520 at first end 524 via a plurality of mounting elements 537.

Eccentric driver 78 is axially offset from rotational axis A, such that rotation of rotor 522 causes eccentric driver 78 to move radially from rotational axis A along a circular path. Bolt 84 can be threadedly fastened to an inner end of bore 523 to secure sleeve 83 to rotor 522. Bolt 84 can extend axially into rotor 522 such that bolt 84 is disposed in an axial plane with permanent magnet array 534 of rotor 522 and armature windings of stator 520. Bolt 84 can be formed from a non-ferrous material to prevent interference with operation of electric motor 512.

As described with respect to drive system 10 and as illustrated in FIG. 4, drive member 80 can be configured to receive eccentric driver 78 in a manner that allows rotation of drive member 80 relative to eccentric driver 78 as eccentric driver 78 moves with rotor 522. Drive member 80 can be coupled to fluid displacement member 16 via drive link 82 and pin 92. Drive member 80 translates the rotational motion of eccentric driver 78 into reciprocating motion and drives fluid displacement member 16 via drive link 82 in a reciprocating manner.

As described with respect to drive system 10, with each revolution of rotor 522, drive link 82 is forced both upward and downward. In this manner, drive mechanism 14 translates each revolution of rotor 522 into a linear up and down motion. Drive link 82 is coupled to fluid displacement member 16 and accordingly pulls fluid displacement member 16 through an upstroke and pushes fluid displacement member 16 through a downstroke. As such, for each revolution of rotor 522, the pump proceeds through a full pump cycle, including an upstroke and a downstroke. The increased torque facilitates rotor 522 generating sufficiently high pumping pressures with displacement pump 19 to generate an atomized spray at spray apparatus 5. In some examples, rotor 522 can cause pump 19 to generate pumping pressures of about 3.4-69 megapascal (MPa) (about 500-10,000 pounds per square inch (psi)) or even higher. In some examples, the pumping pressures are in the range of about 20.7-34.5 MPa (about 3,000-5,000 psi). High fluid pumping pressure is useful for atomizing the fluid into a spray for applying the fluid to a surface.

During operation of pump 19, the pump reaction forces generated by fluid displacement member 16 during pumping are transmitted to pump frame 518 via drive mechanism 14, rotor 522, bearing 542, bearing 548, and stator housing 521. Both the upward reaction force and the downward reaction force travel through drive mechanism 14, rotor 522, and then to bearings 542 and 548. Bearings 542 and 548 transfer rotational forces associated with rotation of rotor 522 and both of the upward and downward reaction forces to pump frame 518. With each stroke, pump reaction forces are generated and a load is applied to rotor 522 due to rotor 522 directly driving fluid displacement member 16 via drive mechanism 14.

This axial pump reaction load is transverse to rotational axis A of electric motor 512 and is experienced at both output and input ends 524, 526 of electric motor 512. The load is transmitted to pump frame 518 via bearings 542, 548 and stator housing 521 such that electric motor 512 does not experience the pump reaction forces. At first end 524, the load is transmitted from rotor 522 to pump frame 518 through bearing 542 and stator housing 521. At electrical input end 548, the load is transmitted from rotor 522 to pump frame 518 through bearing 548 and stator housing 521. Bearings 542, 548 experience opposite reactionary forces with each pump stroke to provide a force balance at pump frame 518.

Pump reaction forces are thereby transmitted to rotor 522 from fluid displacement member 16 due to the direct drive connection between rotor 522 and fluid displacement member 16. Bearings 542, 548 balance the load across rotor 522 and transmit the load to pump frame 518. Bearing 542 is proximal to pump frame 518 and coupled to pump frame 518 via stator housing 521. Bearing 548 is distal to pump frame 518 but also coupled to pump frame 518 via stator housing 521, which transmits loads to pump frame 518 from bearing 548. Stator housing 521 thereby transmits pump loads from rotor 522 to pump frame 518.

The bearing arrangement of system 510 provides significant advantages. Bearings 542, 548 react pump reaction loads generated during pumping due to the direct drive arrangement. Bearings 542, 548 stabilize rotor 522 to facilitate the direct drive connection to fluid displacement member 16. The pump reaction forces experienced at first end 524 and electrical input end 528 are transmitted to pump frame 518, balancing the forces across pump frame 518. The connection balances motor 512, providing longer life, less wear, less downtime, more efficient operation, and cost savings.

The direct drive configuration of drive system 510 eliminates intermediate gearing (e.g., reduction gears) between electric motor 512 and fluid displacement member 16 that are used in conventional motor-driven pumps. The elimination of intermediate gearing provides a more efficient, compact, lower weight, reliable, and simpler pump by reducing the part count and number of moving parts. Additionally, the elimination of gearing provides for quieter pump operation.

Figure 17:
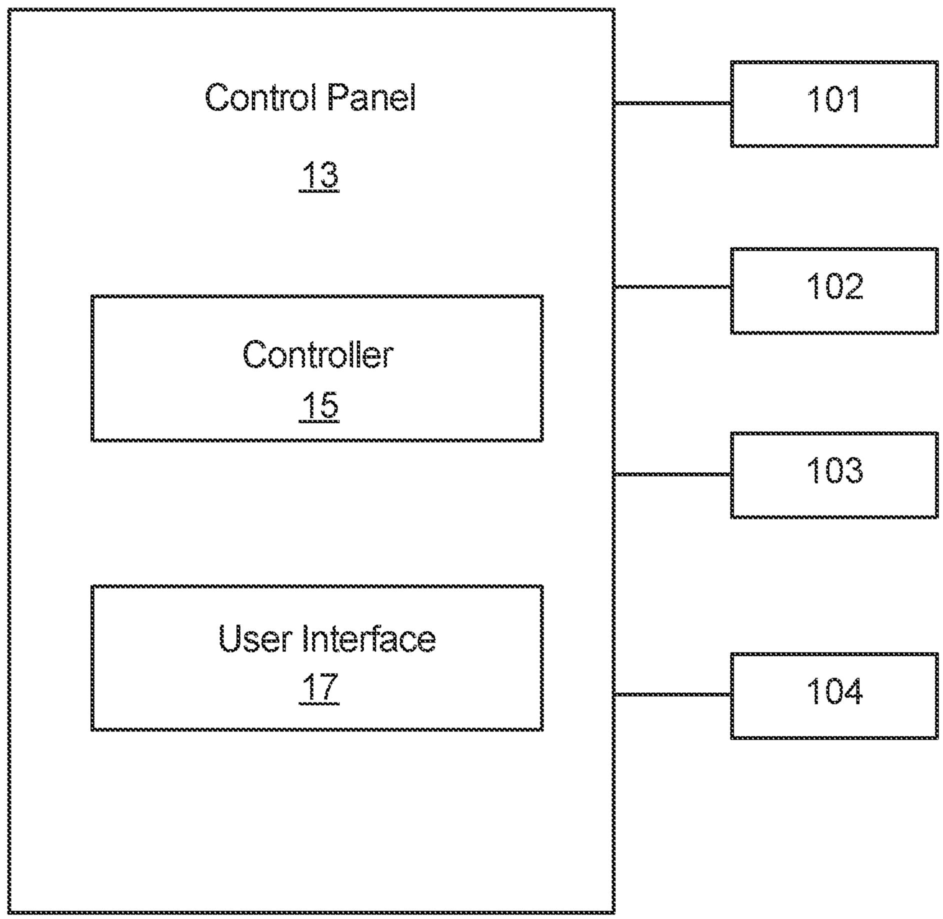
FIG. 17 is a block diagram of a control system.

FIG. 17 is a block diagram of a control system of any of the drive systems of FIGS. 1A-16. Control system 700, control panel 13, controller 15, user interface 17, fluid sensor 101, motor sensor 102, temperature sensor 103, and additional sensors 104 (e.g., current sensor) are shown. Controller 15 can be included in any of the drive systems disclosed herein and used according to the following disclosure. Controller 15 can be one or more logic circuits such as a chip or microprocessor. Code can be included in the controller 15 for execution by the logic circuitry to perform the functions referenced herein. Controller 15 can receive data, including in the form of analog signals, from any of the sensors or transducers or other components referenced herein.

Each of fluid sensor 101, motor sensor 102, temperature sensor 103, and additional sensors 104 provide electronic signals to controller 15. For example, controller 15 can receive a signal from fluid sensor 101 (shown in FIGS. 4 and 9). Fluid sensor 101 can be included in any of the disclosed drive systems. Fluid sensor 101 can be a pressure transducer which measures fluid pressure output by pump 19. Fluid sensor 101 can be, for example, a spring gauge sensor.

Controller 15 can also receive a signal from a motor sensor 102 (shown in FIGS. 4 and 9). Motor sensor 102 can be included in any of the disclosed drive systems. Motor sensor 102 measures, directly or indirectly, a parameter of the operational state of rotor 22. For example, motor sensor 102 can register and count revolutions of rotor 22. Motor sensor 102 can determine the orientation of rotor 22 so that the rotational position of rotor 22 is always known, which can be useful for reversing rotor 22. For example, motor sensor 102 can be a multi-axis magnetic sensor with multiple magnets on rotor 22 in different orientations and a magnetic field sensor on stator 20 that measures the changes to the magnetic fields to determine the instantaneous rotational position of rotor 22. In some cases, the position of rotor 22 may not be directly measured but can be inferred. For example, a cycle sensor can sense a cycle of rotor 22 and/or pump 19, such as by measuring displacement of fluid displacement member 16, from which the cycle position of rotor 22 can be inferred.

Controller 15 is configured to control operation of motor 12. Controller 15 controls power to stator 20 to control rotation of rotor 22 about the motor axis. Controller 15 can be configured to cause pump 19 to output spray fluid according to a target pressure. Controller 15 provides current to motor 12 to achieve the desired pressure. The current provided to motor 12 is proportional to the pressure output by pump 19. As such, controller 15 can be configured to control current to motor 12 based on the desired pressure.

Pump 19 can maintain constant spray fluid pressure throughout operation. In some examples, pump 19 is configured to output spray fluid at about 500-7500 pounds per square inch (psi), although typically in the range of 1500-3300 psi. Pump 19 can be operable in a pumping state and in a stalled state. In the pumping state, rotor 22 applies torque to drive mechanism 14, causing fluid displacement member 16 to apply force to the spray fluid. In the stalled state, rotor 22 applies torque to drive mechanism 14 but does not rotate, such that fluid displacement member 16 applies force to the spray fluid but does not displace axially. A stall can occur, for example, when pump 19 is deadheaded due to the closure of a downstream valve, such as when trigger 9 (shown in FIG. 4) is not actuated for spraying. Pump 19 continues to apply pressure to the spray fluid when pump 19 is stalled due to constant urging of rotor 22. Rotor 22 is urged forward while rotor 22 is stalled such that pressure continues to be applied to fluid displacement member 16 through rotor 22 and the drive mechanism 14. As such, when trigger 9 is actuated, the spray pressure is already present and instantly provided, minimizing any pressure drop that can occur on the initiation of spraying and adversely impact the spray qualities of the spray fan of the spray fluid. With constant urging of rotor 22, the spray fan can be consistent from trigger pull (actuation) to trigger release (stalled state).

During both the pumping state and the stalled state, controller 15 can be configured to supply current to stator 20 such that rotor 22 applies torque to drive mechanism 14, causing fluid displacement member 16 to continue to exert force on the spray fluid, urging rotor 22 to rotate even when rotor 22 is stalled due to a back pressure of the spray fluid downstream of the pump 19. The back pressure, caused, for example, by closure of a downstream valve, prevents axial displacement of fluid displacement member 16 and thereby rotation of rotor 22. In the stalled state, controller 15 causes a continuous flow of current to motor 12 causing rotor 22 to apply constant torque to drive mechanism 14. Drive mechanism 14 converts the torque to a linear driving force such that drive mechanism 14 applies constant force to fluid displacement member 16. Rotor 22 does not rotate during the stall. Rotor 22 applies torque with zero rotational speed when pump 19 is in the stalled state. Pump 19 is entirely mechanically driven in that rotor 22 mechanically causes fluid displacement member 16 to apply pressure to the spray fluid during the stalled state.

The amount of current delivered to the motor 12 can be determined based on a pressure setting. The user may set the pressure at which pump 19 is to output the spray fluid. Controller 15 can calculate a motor speed (e.g., via an index relating rotor speed to a set pressure) based on the desired pressure and then can calculate the amount of torque required to achieve the motor speed or pressure. Torque is directly proportional to current and controller 15 can determine the needed current based on the desired torque. Torque is directly proportional to the current and current is directly proportional to the pressure. As such, the pressure setting of drive system 10 can correspond with the amount of current (or other measure of power) supplied to motor 12, such that a higher pressure setting corresponds with greater current, and a lower pressure setting corresponds with lesser current. Controller 15 can adjust the voltage provided to motor 12 to change the speed of rotor 22.

Controller 15 commands a current corresponding to the set pressure in the urge mode. Controller 15 may not command a motor speed in the urge mode. The current provided to motor 12 causes pump to generate an output pressure, and the actual speed of the motor will be whatever speed is required to hold constant pressure. For example, motor speed is at a maximum if there is no restriction in the downstream flow such that the actual pressure cannot build to the target pressure. If the motor is overloaded (e.g., due to a stall condition), the actual speed of the motor is zero, but the pressure is maintained at the desired pressure. When the downstream pressure drops (e.g., when trigger 9 is actuated), the motor speed will increase to the speed needed to hold the set pressure, which is directly proportional to the current.

The disclosed drive systems have an offset crank pump load, which results in spikes in current twice per motor revolution. Controller 15 can be configured to determine the actual pressure based on pressure readings taken over a time period. The multiple pressure readings over a timescale provides a smoother pressure output signal, facilitating more accurate control and smoother pumping. The user can set a desired pressure via user interface 17. Controller 15 controls operation of motor 12 to cause pump 19 to output fluid based on the desired pressure. Current and motor speed are determined based on the pressure set point. Controller 15 determines target speed and torque to generate the target pressure and commands current to motor 12 based on that information. Current, pressure, and torque can remain the same during pumping state and during the stalled state, while motor speed changes.

During operation, the actual pressure is determined based on information generated by pressure transducer 101. Current can be increased if pressure is lower than the target or set pressure. If the motor speed is not capable of meeting the target pressure and current is at a maximum operating current, voltage can be increased to increase the speed of motor 12. The amount of current delivered to motor 12 to maintain a constant pressure at a set pressure is dependent on the material composition of the spray fluid. For example, the current required to generate 3000 psi will vary between systems depending on the viscosity of the pumped material, among other factors. Controller 15 can be configured to determine the needed current based on the pressure information provided by pressure transducer 101.

The amount of current delivered to motor 12 can be about the same whether rotor 22 is rotating or stalled, although in some embodiments, more current can be delivered to motor 12 when the rotor 22 is rotating and less current can be delivered to motor 12 when rotor 22 is stalled but urging. The continuous current flow regulated by controller 15 causes pump 19 to apply constant pressure to the spray fluid via fluid displacement member 16. Controller 15 can provide more power to motor 12 with motor 12 rotating than when the motor 12 is stalled. Current can remain constant both in the stall and when rotating, but voltage can change due to the speed changes. Voltage increases to increase the speed of motor 12, resulting in additional power during rotation. As such, voltage is at a minimum when at zero speed and with pressure at the desired level, because no additional speed is required to get to pressure. As the motor 12 is commutated, power is applied according to a sinusoidal waveform. For example, motor 12 can receive AC power. For example, the power can be provided to the phases of the motor 12 according to electrically offset sinusoidal waveform. With motor 12 stalled, the signals are maintained at the point of stall such that a constant signal is provided with motor 12 in the stalled state. As such, at least one phase of motor 12 can be considered to receive a DC signal with motor 12 in the stalled state. Motor 12 can thereby receive two types of electrical signals during operation, a first during rotation and a second during stall. The first can be sinusoidal and the second can be constant. The first can be AC and the second can be considered to be DC. The first power signal can be greater than the second power signal.

In some examples, a set current can be provided to motor 12 throughout the stall. For example, the maximum current can be provided to motor 12 throughout the stall. The maximum current can be a maximum operating current of motor 12, a maximum current as set by the user, or other form of maximum current. In some examples, controller 15 can vary the current provided to motor 12. For example, the current can be pulsed such that current is constantly supplied to stator 20, but at different levels. As such, pump 19 can apply continuous and variable force to the spray fluid with motor 12 in the stalled state. In some examples, the current can be pulsed between the maximum current and one or more currents lesser than the maximum current. Pump 19 returns to the pumping state when the back pressure of the spray fluid drops sufficiently such that the current provided to motor 12 can cause rotation of rotor 22 and axial displacement of fluid displacement member 16, such as when the user resumes spraying. Pump 19 thereby returns to the pumping state when the force exerted on the spray fluid overcomes the back pressure of the spray fluid. Controller 15 can be configured to resume current flow according to the pumping state based on the pressure dropping such that motor 12 can rotate.

A stall occurs when the driving force on the rotor equals the reaction force of the downstream fluid from one of the fluid displacement member 16 and the suction of fluid upstream of pump 19 when fluid displacement member 16 is in an upstroke. Pump 19 exits the stall when the downstream pressure decreases, such that the forces are no longer in balance and rotor 22 overcomes the forces acting on fluid displacement member 16. A continuous supply of current to motor 12 during stall provides constant urging of rotor 22. In some examples, the rotor 22 can be caused to exit the stalled state due to the constant current overcoming the downstream pressure, and not in response to any pressure signal from pressure transducer 101 indicating a drop in pressure. The continuous urging of the rotor 22 ensures that rotor 22 is continuously poised to resume rotating and moving fluid displacement member 16 at the very moment that the fluid starts flowing again, allowing the fluid displacement member 16 to move again.

Other spray systems may cease delivery of driving power to the motor when a pressure sensor indicates that the set pressure has been reached. The pressure must drop enough for the pressure sensor to register the drop before a controller resumes supplying current to the motor. This process can lead to a drop in spray pressure just as the user resumes spraying, which is known as deadband. This drop in spray pressure is typically unwanted as it can result in a reduction of the spray fan at the start of spraying and variation in the spray fan. For example, the spray fan varies from the time the trigger is actuated to the time the pressure set point has been reached. In contrast, with constant urging of rotor 22, the pressure set point is achieved instantly or nearly so upon actuation of the trigger. The motor 12 begins spinning and the pump 19 begins pumping as soon as the downstream flowpath opens, minimizing any potential deadband and providing desired spray pressure when spraying is initiated.

Stalling pump 19 in response to spray fluid back pressure provides significant advantages. The user can deadhead pump 19 without damaging the internal components of pump 19. Controller 15 regulates to the maximum current, causing pump 19 to output a constant pressure. Pump 19 continuously applies pressure to the spray fluid, allowing pump 19 to quickly resume operating and outputting constant pressure when the downstream pressure is relieved. Pulsing the current during a stall reduces heat generated by stator 20 and uses less energy.

Motor 12 can remain stalled, while still urging fluid displacement member 16, for an indefinite period of time. However, if the user fails to use pump 19 for an extended period of time, such as when the user goes to lunch, then power can be saved and less heat can be built up if controller 15 stops power delivery to motor 12. Controller 15 can sense a stall condition, for example, using motor sensor 102 to detect ceased rotation of rotor 22 and/or based on an amount of current spike experienced and sensed by current sensor 104 when the downstream flowpath initially closes. In some examples, controller 15 can start a timer based on motor 12 entering the stalled state. The timer can be stopped and, in some examples, reset if rotation of rotor 22 is sensed. But after a predetermined amount of time without rotation of the rotor 22, such as 30 seconds, 5 minutes, 10 minutes, or any other desired temporal threshold, controller 15 can cease delivery of operating power (electrical energy) to motor 12. Controller 15 can continue to monitor a fluid parameter such as pressure via the fluid sensor 101 while controller 15 has ceased delivery of operating power to the motor 12. If fluid sensor 101 senses a change in the fluid parameter, such as a pressure drop or flow of fluid, then controller 15 can resume delivery of energy to the motor 12 to rotate rotor 22 and operate as previously described, based on the assumption that the operator has resumed spraying operations.

Motor 12 continues to generate heat in a stall condition when current is supplied to provide constant urging of rotor 22. Heat generation is proportional to current supply over time. In some examples, a temperature sensor can be used to measure a motor temperature or atmospheric temperature adjacent to motor 12. If a threshold temperature is reached before rotation of rotor 22 has resumed and/or before a predetermined amount of time without rotation has occurred, controller 15 can cease delivery of operating power to motor 12. In this case, the predetermined period of continued urging is dynamic, based on temperature as opposed to a predetermined period of time. Controlling delivery of operating power to motor 12 during stall based on temperature can account for variations in the environment in which drive system 10 is operated. Both dynamic and static time outs for a stalled motor based on temperature and time, respectively, can prevent overheating and damage to drive system 10. Controller 15 can resume deliver of energy to motor 12 once fluid sensor 101 senses a change in the fluid parameter, indicating spraying operations have resumed.

Controller 15 can reverse the direction of rotation of rotor 22 based on the delivery of electrical energy to motor 12. For example, controller 15 can cause a rotor 22 to rotate clockwise for a plurality of complete revolutions and then counterclockwise for a plurality of complete revolutions. Regardless of whether the rotor 22 is rotating clockwise or counterclockwise, drive mechanism 14 will still reciprocate the fluid displacement member 16 in the same manner. For example, rotor 22 can rotate clockwise making a plurality of complete revolutions to drive the piston through a first plurality of pumping strokes and can then rotate counterclockwise making a plurality of complete revolutions to drive the piston through a second plurality of pumping strokes. Switching between clockwise and counterclockwise rotation of the rotor 22 can increase wear life on components by providing more uniform wear of parts (e.g., bearings) and can minimize sideloading of fluid displacement member 16. Reversing the direction of rotation can also be used to troubleshoot problems, such as a locked rotor condition. Reversing the direction of rotation can momentarily release pressure on fluid displacement member 16 to help unstick fluid displacement member 16. For example, it may be difficult to start motor 12 against pressure. Changing the direction of rotation provides changeover within 90 degrees, allowing for fluid displacement member to encounter the load while moving in an opposite direction and with some momentum to ramrod into the load on the other pump stroke. It is understood that controller 15 can be configured to reverse the direction of rotor 22 rotation based on various operating conditions.

Controller 15 can periodically reverse the direction of rotor 22, such as based on a schedule. For example, after a predetermined amount of time rotating in a first direction, controller 15 can cause the rotor 22 to rotate in a second direction opposite the first direction for the same or a different predetermined amount of time or given amount of time. At the expiration of the amount of time, controller 15 can wait until a stall moment to reverse the direction of rotor 22 so as to not have a reversal of rotor 22 during pumping. Alternatively, controller 15 can time the reversal of rotor 22 rotation based on reversal of the direction to the changeover of fluid displacement member 16 (e.g., fluid displacement member 16 is at the top or bottom of its stroke and reversing direction anyway).

Controller 15 can reverse the direction of rotor 22 based on the number of pump cycles. For example, rotor 22 can be reversed based on a predetermined number of complete revolutions of rotor 22 in one direction (e.g., 1000 revolutions) before switching to the other direction for rotating the or another predetermined number and before switching back again. Motor revolutions can be determined for example, by information generated by motor sensor 102. In some examples, a sensor can be associated with fluid displacement member 16 to sense displacement and count pump cycles. A predetermined number of pump strokes, two of which form a complete pump cycle, may be used instead of motor revolutions. In some examples, the pressure spikes experienced by pressure transducer 101 can be utilized to count pump cycles or strokes. As such, the periodic reversal of rotor 22 can be based on information from motor sensor 102, pressure transducer 101, or another sensor of the system.

Controller 15 can reverse the direction of rotor 22 based on power to the sprayer having been turned off, such as by actuating the power switch. For example, when the user turns on the sprayer, controller 15 can cause rotor 22 to rotate in a first direction, as needed, until the sprayer is turned off. When the user turns the sprayer on again, controller 15 causes rotor 22 to rotate in the second direction, as needed, until the sprayer is turned off again. This can be continued, switching the direction of rotation of rotor 22 based on turning on and turning off of the sprayer. In some examples, controller 15 can reverse the direction of rotation based on stand-by power being turned off, such as when the sprayer is unplugged. Rotor 22 can thus start up in a new rotational direction each time the sprayer is plugged back in and activated.

Controller 15 can monitor a fluid parameter with fluid sensor 101, and/or can monitor current to motor 12, and can switch direction of rotation of rotor 22 based on the monitored parameter. For example, if the current draw of the motor 12 exceeds a threshold, which may indicate increased resistance, controller 15 can cause rotor 22 to reverse direction. In some embodiments, controller 15 can cause rotor 22 to reverse direction if rotor 22 stalls while the set pressure has not been reached, indicating an inability to reach pressure. In some embodiments, controller 15 can cause rotor 22 to reverse to rotate in a second direction if rotor 22 is rotating in a first direction and yet is unable to reach the set pressure after a predetermined amount of time, indicating an inefficiency error.

Controller 15 can cause rotor 22 to switch direction of rotation if rotor 22 fails to make a complete revolution as indicated, for example, by motor sensor 102. For example, if rotor 22 completes a partial revolution in a first direction but is unable to complete the full revolution and the actual pressure is less than the target pressure, then this can indicate a locked rotor condition or a jam or other blockage. Controller 15 can cause rotor 22 to rotate in the second direction rotational direction based on such a condition. If rotor 22 is unable to complete a full revolution in the second direction, controller 15 can again cause rotor 22 to reverse direction. This can be repeated until rotor 22 is able to make a full revolution, or for a predetermined period of time, or for a predetermined number of switches, among other options. Controller 15 can be configured to generate an error code based on the rotor 22 failing to rotate when not at pressure and can provide that error information to the user, such as via user interface 17. In some examples, controller 15 can cause rotor 22 to continue switching between rotational directions, which can cause some pumping depending on the displacement provided by the pump 19, allowing the system to operate in a partial capacity.

During a locked condition where rotor 22 cannot complete a 360-degree rotation, controller 15 can cause rotor 22 to rotate until stopped (due to the blockage/lock) in the first rotational direction and then rotate until stopped (due to the blockage/lock) in the opposite second rotational direction. Controller 15 can continue to reverse rotation until the predetermined switching threshold (e.g., number of direction reversals) is reached, until the locked condition is broken. Controller 15 can be configured to generate an error code based on the rotor 22 failing to rotate when not at pressure and can provide that error information to the user, such as via user interface 17. If the rotor 22 is able to complete a 360-degree rotation, then controller 15 continues to drive rotation of the rotor 22 to build the actual pressure to the target pressure. The controller 15 thereby resumes operating rotor 22 in the pumping mode if the lock/blockage is overcome. In some examples, controller 15 can cause rotor 22 to continue switching between rotational directions, which can cause some pumping depending on the displacement provided by the pump 19, allowing the system to operate in a partial capacity.

Controller 15 can cause rotor 22 to reverse direction periodically based on a time-based or event-based schedule, for example, based on a calendar, usage time, each time sprayer is turned off or unplugged, number of revolutions, etc. Controller 15 can also cause rotor 22 to reverse direction in response to blockages or inefficiencies in motor operation. For example, controller 15 can cause rotor 22 to reverse direction if rotor 22 is unable to complete a full revolution or if rotor 22 is rotating but is unable to meet the set pressure.

During operation, control circuitry 13 can determine, for example, based on pressure sensor 101 or motor sensor 102, if motor 12 is rotating. If motor 12 is rotating, rotation can continue in the present direction of rotation. If motor 12 is not rotating, controller 15 can determine whether operating power to motor 12 has been ceased (e.g., sprayer has been turned off or unplugged). If operating power to motor 12 has been ceased, controller 15 can cause rotor 22 to change direction of rotation the next time motor 12 is operated.

During operation, control circuitry 15 can determine reversal of rotor 22 based on a temporal threshold and/or an event threshold. For example, control circuitry 15 can cause reversal if a predetermined time threshold since the last reversal has been reached (e.g., 15 minutes of operation, 1 hour of operation, 5 hours of operation, or other times)). The predetermined time threshold can be based on time that power is supplied to motor 12 or time that the rotor 22 is actually rotating, among other options. In another example, control circuitry 16 can cause reversal if a predetermined revolution threshold since the last reversal has been reached (e.g., 500 revolutions, 1000 revolutions, 10000 revolutions, or other revolution count. If the temporal and/or event threshold Control circuitry 15 can cause rotor 22 to reverse direction the next time rotor 22 stops and subsequently begins spinning or during spinning of rotor 22, such as where the revolutions per minute are below a threshold or based on the fluid displacement member 16 being at the end of a stroke.

In some examples, control circuitry 15 can stop supplying power to motor based on a predetermined urging time threshold (e.g., 5 seconds, 1 minutes, 5 minutes, or other times of non-use). For example, control circuitry 15 will continue to supply current even when motor 12 is stalled to provide urging on the fluid to maintain pressure and for quick response when spraying resumes. If the predetermined urging time has not been reached, control circuitry 15 can determine if a predetermined maximum temperature has been reached (e.g., temperature of motor or ambient air). If the predetermined maximum temperature has been reached, control circuitry 15 can cease delivery of operating power to motor 12. If the predetermined temperature has not been reached, control circuitry 15 can continue supplying power to motor 12 to continue the urging until the predetermined urging time or the predetermined temperature is reached.

Control circuitry 15 can determine whether the target pressure has been reached, such as based on data from pressure sensor 101. Control circuitry 15 can determine when rotor 22 is rotating based on data from motor sensor 102. If rotor 22 is able to rotate but the target pressure has not been reached, control circuitry 15 can cause rotor 22 to reverse rotational direction. If the pressure is lower than the target pressure but rotor is stopped or has low revolutions per minutes (such as below a minimum threshold), controller 15 can cause rotor 22 to reverse a direction of rotation. Controller 15 can cause rotor 22 to continue to reverse direction based on the low target pressure and the operating state of rotor 22 (e.g., speed) to try to overcome the inefficiency, locked rotor, or other blockage. In some examples, controller 15 can provide an error code to the user by user interface 17, such as based on rotor 22 reversing a set number of times and not breaking the lock/blockage.

The examples discussed regarding controller 15 controlling rotation of rotor 22 and current supply to motor 12 are non-limiting examples. Additional, fewer, and/or alternative steps can be taken. For example, drive system 10 can operate with or without constant rotor urging and motor rotation direction can be reversed based any one or more of scheduled (e.g., time-based or event-based) or operating conditions (e.g., blockage).

While the pumping assemblies of this disclosure and claims are discussed in the context of a spraying system, it is understood that the pumping assemblies and controls can be utilized in a variety of fluid handing contexts and systems and are not limited to those discussed. Any one or more of the pumping assemblies discussed can be utilized alone or in unison with one or more additional pumps to transfer fluid for any desired purpose, such as location transfer, spraying, metering, application, etc.

DISCUSSION OF NON-EXCLUSIVE EXAMPLES

The following are non-exclusive descriptions of possible examples of the present invention.

A drive system for a reciprocating fluid displacement pump includes an electric motor, a drive, and a fluid displacement member. The motor includes a stator defining an axis and a rotor disposed coaxially around the stator. The drive is directly connected to the rotor to receive a rotational output from the rotor. The fluid displacement member is mechanically coupled to the drive. The drive member converts the rotational output to a linear, reciprocating input to the fluid displacement member.

The drive system of the preceding paragraph can optionally include, additionally and/or alternatively, any one or more of the following features, configurations and/or additional components:

The fluid displacement member is mechanically coupled to the drive at an output end of the electric motor.

The electric motor further comprises an electrical input end configured to receive electrical power, the electrical input end disposed opposite the output end on the axis.

A pump frame mechanically supporting the electric motor.

The electric motor is cantilevered from the pump frame.

The output end of the electric motor is coupled to the pump frame such that an end of the electric motor disposed opposite the output end is a free end of the cantilevered electric motor.

The pump frame is mechanically coupled to each of the rotor and the stator.

A coupling member connects the pump frame to an axle of the stator such that the stator is fixed relative to the pump frame.

The coupling member is connected to the axle at the free end of the electric motor.

The coupling member extends around an exterior of the rotor from the pump frame to the axle.

The coupling member includes an axially extending portion that extends from the pump frame across the exterior of the rotor, wherein the axially extending portion is radially separated from the rotor, and a radially extending portion that extends from the axially extending portion to the axle, wherein the radially extending portion is axially separated from the rotor.

The rotor is formed from a housing and comprises a permanent magnet array on an inner circumferential face of the housing.

The housing extends around three sides of the stator and wherein the housing is rotationally coupled to a pump frame at an output end of the electric motor coupled to the drive.

The housing radially overlaps the stator at the output end and radially overlaps the stator at an input end of the electric motor disposed opposite the output end.

The stator is fixed to an axle, and wherein the axle extends axially outward from the housing at the input end.

A coupling member connects the pump frame to the axle such that the stator is fixed relative to the pump frame.

A pump frame supporting the electric motor, wherein the electric motor is supported by the pump frame at an output end of the electric motor coupled to the drive, and a first bearing disposed between the pump frame and the rotor at the output end to support the rotor and allow rotational motion of the rotor with respect to the pump frame.

The rotor extends through the pump frame and wherein the rotor is coupled to an inner race of the bearing and the pump frame is coupled to an outer race of the bearing.

The pump frame is mechanically coupled to an axle of the stator at an input end opposite the output end, wherein the input end is configured to receive an electrical input.

A coupling member extends around an exterior of the rotor from the pump frame to the axle to fix the stator relative to the pump frame.

In another example, a method of driving a reciprocating pump includes powering an electric motor to cause rotation of a rotor of the motor, the rotor disposed outside of and around a stator of the motor, receiving a rotational output from the rotor at a drive directly connected to the rotor, translating the rotational output, by the drive, directly to linear, reciprocating motion, and providing, by the drive, a linear reciprocating input to a fluid displacement member connected to the drive to cause the pump rod to pump fluid by reciprocation.

The method of the preceding paragraph can optionally include, additionally and/or alternatively, any one or more of the following features, configurations, additional components, and/or steps:

Receiving the rotational output from a first end of the electric motor and providing electrical input to a second end of the electric motor opposite the first end.

Mechanically supporting the electric motor with a pump frame disposed at the first end.

Rotationally coupling the rotor to the pump frame at the first end, and mechanically fixing the stator to the pump frame at the second end.

In yet another example, a fluid displacement apparatus includes an electric motor, a drive, a pump, and a pump frame. The motor includes a stator defining an axis and a rotor disposed around the stator. The drive is connected to the rotor to receive a rotational output from the rotor and convert the rotational output to linear reciprocating motion. The pump includes a piston and a cylinder, the piston receiving the linear reciprocating motion from the drive to reciprocate the piston within the cylinder. The cylinder and the stator are connected to the pump frame to stabilize both the stator relative to the rotor and the cylinder relative to the piston.

The fluid displacement apparatus of the preceding paragraph can optionally include, additionally and/or alternatively, any one or more of the following features, configurations, and/or additional components:

One or more coupling members. The stator includes a first end and a second end opposite the first end, the first end attached to the pump frame while the second end extends away from the pump frame, and the one or more coupling members are attached to the second end of the stator and extend along the exterior of the rotor to connect to the pump frame.

One or more wires that extend into the second end of the stator, the one or more wires providing electrical power to operate the stator.

In yet another example, a drive system for a reciprocating fluid displacement pump includes an electric motor, a drive, a fluid displacement member, and a support frame. The electric motor includes a stator disposed on an axis and supported by an axle and a rotor disposed coaxially around the stator. The drive is directly connected to the rotor to receive a rotational output from the rotor. The fluid displacement member is mechanically coupled to the drive, wherein the drive is configured to convert the rotational output to a linear, reciprocating input to the fluid displacement member. The support frame is configured to mechanically support the electric motor and the fluid displacement pump, wherein the support frame is mechanically coupled to the stator.

The drive system of the preceding paragraph can optionally include, additionally and/or alternatively, any one or more of the following features, configurations and/or additional components:

The support frame is coupled to the rotor at a first end of the electric motor by a first bearing, the first bearing allowing rotation of the rotor within the support frame.

The support frame is mechanically coupled to the stator at a second end of the motor axially opposite a first end of the electric motor, wherein the drive is connected to the rotor at the first end.

The support frame includes a first frame member at the first end, a second frame member coupled to the stator at the second end, and at least one connecting member connecting the first and second frame members. The at least one connecting member extends across an outer surface of the rotor and is spaced from the rotor to allow rotation of the rotor within the support frame.

The second frame member comprises at least one projecting member, wherein the at least one projecting member extends radially outward from the axis such that a distal end of the at least one projecting member is disposed radially outward of the rotor, and wherein the at least one axially-extending member is connected to the at least one projecting member.

The electric motor is cantilevered from the first frame member such that the first end is connected to the first frame member and the second end is cantilevered.

The second frame member comprises a plurality of projecting members, wherein projecting members of the plurality of projecting members are symmetrically arranged about an axis of the electric motor.

The second frame member includes a plurality of projecting members, wherein projecting members of the plurality of projecting members are asymmetrically arranged about the axis.

The plurality of projecting members includes one of three projecting members and four projecting members.

Projecting members of the plurality of projecting members are arranged in an X-configuration.

Projecting members of the plurality of projecting members are arranged in a Y-configuration.

The first frame member includes at least one projecting member extending radially outward of the rotor, and wherein the at least one connecting member connects to the at least one projecting member of the first frame member.

The first frame member includes a first plurality of projecting members and the second frame comprises a second plurality of projecting members, and wherein a plurality of connecting members connect the first and second pluralities of projecting members.

Projecting members of the first plurality of projecting members are axially aligned with projecting members of the second plurality of projecting members.

The at least one connecting member is a tie rod.

The second frame member is in fixed contact with the axle.

The second frame member is supported by the axle and is in contact with an outer radial surface of the axle.

The second frame member is in contact with an end face of the axle.

A retaining element in fixed contact with the second frame member and a radially inner surface of the axle.

The axle is formed of a conducting material to transfer heat from the stator to the second frame member.

The second frame member is mechanically coupled to the axle adjacent to a second bearing and wherein the first and second frame members compress the first and second bearings therebetween to preload the first and second bearings.

A wave spring washer disposed between the second bearing and the second frame member.

A retaining element, wherein the retaining element secures the second frame member to the axle.

The retaining element connects to the axle by interfaced threading.

A control panel mechanically coupled to the first frame member and the second frame member and partially surrounding the rotor.

The first frame member forms a pump frame configured to partially house the fluid displacement member.

The support frame includes a plurality of connecting members extending across an exterior of the rotor between a first frame member at a first end of the motor and a second frame member at a second end of the motor, the drive member is connected to the rotor at a first end of the motor, and the support frame is configured to support both torque loads and pump reaction loads.

A first subset of the connecting members is positioned to support both torque loads and pump reaction loads.

In yet another example, a support frame for a reciprocating fluid displacement pump drive system having an electric motor with an inner stator and an outer rotor includes a first frame member, a second frame member, and at least one connecting member. The second frame member is disposed at an opposite end of the electric motor from the first frame member and separated from the first frame member. The at least one connecting member extends between and connecting the first frame member and the second frame member. The second frame member and the at least one connecting member are configured to at least partially house and to mechanically support the electric motor with the outer rotor.

The support frame of the preceding paragraph can optionally include, additionally and/or alternatively, any one or more of the following features, configurations and/or additional components:

The first and second frame members each include at least three projecting members, and wherein the connecting members connect projecting members of the first frame member with projecting members of the second frame member.

The projecting members of the first frame member are axially aligned with the projecting members of the second frame member.

The projecting members of each of the first and second frame members are arranged in one of a Y-configuration and an X-configuration.

The connecting members are tie rods.

In yet another example, a fluid displacement apparatus includes an electric motor extending along an axis to have a first end and a second end, a drive, a pump, a pump frame, and a motor frame. The electric motor includes a stator extending along the axis and a rotor disposed around the stator and extending along the axis. The drive is connected to the rotor to receive a rotational output from the rotor and convert the rotational output to linear reciprocating motion. The pump includes a piston and a cylinder, the piston receiving the linear reciprocating motion from the drive to reciprocate the piston within the cylinder. The cylinder and the stator are connected to the pump frame to stabilize the cylinder relative to the piston. The motor frame that stabilizes stator. The motor frame includes a plurality of connecting members that extend from the first end of the motor to the second end of the motor. The plurality of connecting members are arrayed around the rotor.

The fluid displacement apparatus of the preceding paragraph can optionally include, additionally and/or alternatively, any one or more of the following features, configurations and/or additional components:

The motor frame is fixed relative to the pump frame.

A first frame member and a second frame member. The first frame member is located on the first end of the motor and the second frame member located on the second end of the motor. Each of the plurality of connecting members extends from the first frame member to the second frame member.

The first frame member, the second frame member, and the plurality of connecting members form an exoskeleton around the motor which structurally supports the motor while allowing airflow through exoskeleton and around the rotor.

Either of the first frame member and the second frame member is star shaped.

In yet another example, a drive system for a reciprocating pump for pumping fluid includes an electric motor and a drive member. The electric motor includes a rotor. The rotor includes an eccentric drive extending from the rotor. The drive member is directly coupled to the eccentric drive and is configured to drive reciprocation of a fluid displacement member.

The drive system of the preceding paragraph can optionally include, additionally and/or alternatively, any one or more of the following features, configurations and/or additional components:

The eccentric drive is directly coupled to the drive member to provide a 1:1 ratio of rotor rotation to pump cycle.

The eccentric drive projects axially outward from an end of the rotor and offset from a rotational axis of the rotor.

The drive member is coupled to the eccentric drive by a bearing element allowing relative movement between the eccentric drive and the drive member.

The eccentric drive is integrally formed with the rotor.

The eccentric drive extends into a bore of the rotor and fastened to the rotor.

The drive comprises a sleeve and a bolt, wherein the sleeve is received in the bore of the rotor and the bolt is received in the sleeve and threadedly fastened to the rotor.

The rotor is disposed coaxially around the stator.

The rotor is formed from a housing that extends around the stator, wherein the housing comprises a permanent magnet array on an inner circumferential face.

The housing comprises a first cylindrical projection including the eccentric drive.

The first cylindrical projection extends in a first axial direction from a front end of the housing, and wherein the housing further comprises a second cylindrical projection, the second cylindrical projecting extending in a second axial direction from the front end of the housing into an axle of the stator.

The eccentric drive includes a pin that extends into each of the first cylindrical projection and the second projection.

The eccentric drive is formed from a non-ferrous material.

The housing further comprises a spacing member, wherein the spacing member extends axially outward from the first cylindrical projection and supports the eccentric drive.

The drive system further comprises a pump frame and wherein the first cylindrical projection is coupled to the pump frame by a first bearing, wherein the first bearing allows rotational motion of the rotor with respect to the pump frame.

The first cylindrical projection is coupled to the first bearing.

The housing extends through the pump frame and wherein the eccentric drive and drive member are positioned axially outward of the first bearing.

The eccentric drive and drive member are positioned axially inward of the first bearing.

The eccentric drive is integrally formed with the rotor.

There are no gears disposed between the rotor and the fluid displacement member.

The pump is a double displacement pump.

In yet another example, a method of driving a reciprocating pump includes powering an electric motor to cause rotation of a rotor on a rotational axis, providing rotational output of an electric motor directly to a drive member, providing, by the drive member, a linear reciprocating input to a pump rod of the pump, and spraying a fluid from the fluid displacement pump onto a surface. For one revolution of the rotor, the fluid displacement pump proceeds through one pump cycle.

The method of the preceding paragraph can optionally include, additionally and/or alternatively, any one or more of the following features, configurations, additional components, and/or steps:

Rotational output is provided through an eccentric drive on the rotor, wherein a position of the eccentric drive is offset from the rotational axis.

The eccentric drive is integrally formed with the rotor or extends into the rotor and is secured to the rotor.

In yet another example, a pumping system includes and electric motor, a drive member, and a reciprocating pump. The electric motor includes a rotor. The rotor includes an eccentric drive extending from the rotor. The drive member is directly coupled to the eccentric drive. The reciprocating pump includes a fluid displacement member coupled to the drive member and a pump cylinder at least partially housing the fluid displacement member. The drive member is configured to drive reciprocation of the fluid displacement member.

The pumping system of the preceding paragraph can optionally include, additionally and/or alternatively, any one or more of the following features, configurations, and/or additional components:

The eccentric drive is directly coupled to the drive member to provide a 1:1 ratio of rotor rotation to pump cycle.

The eccentric drive projects axially outward from an end of the rotor and offset from a rotational axis of the rotor.

The eccentric drive is integrally formed with the rotor or extends into the rotor.

The rotor is rotationally coupled to a pump frame by a first bearing and wherein the eccentric drive and drive member are positioned axially inward of the first bearing.

The rotor is rotationally coupled to a pump frame by a second bearing and wherein the eccentric drive and drive member are positioned axially outward of the second bearing.

The reciprocating pump is a double displacement pump such that the reciprocating pump is configured to output fluid during each of an upstroke and a downstroke of the fluid displacement member.

In yet another example, a drive system for a fluid displacement pump includes an electric motor, a drive, a fluid displacement member, and a pump frame. The electric motor includes a stator and a rotor. The stator and rotor are disposed on an axis. The drive is coupled to the rotor at a first end of the electric motor. The fluid displacement member is mechanically coupled to the drive, such that the electric motor experiences a pump load generated by reciprocation of the fluid displacement member during pumping. The pump frame is mechanically coupled to the electric motor and configured to support the fluid displacement pump and the electric motor.

The drive system of the preceding paragraph can optionally include, additionally and/or alternatively, any one or more of the following features, configurations, and/or additional components:

One of the pump frame and the stator is coupled to the rotor at the first end by a first bearing, the first bearing allowing rotational motion of the rotor relative to the one of the pump frame and the stator and supporting a pump load, wherein the pump load is an axial load along an axis of reciprocation of the pump.

The pump frame is mechanically coupled to the stator at a rear end of the electric motor opposite the first end.

The rotor is disposed coaxially around the stator and wherein the rotor is formed from a housing and a plurality of magnets on an inner circumferential face of the housing.

The housing is coupled to an inner race of the first bearing and the pump frame is coupled to an outer race of the first bearing.

A second bearing disposed between the rotor and the stator adjacent to the rear end to allow rotational motion of the rotor with respect to the stator, the second bearing positioned to experience pump loads.

The rotor is coupled to an outer race of the second bearing and the stator is coupled to an inner race of the second bearing.

The rotor is coupled to an inner race of the second bearing and the stator is coupled to an outer race of the second bearing.

The rotor extends into an axle of the stator at the first end.

A third bearing disposed between the rotor and the axle to allow rotational movement of the rotor with respect to the stator and support the rotor relative to the stator such that an air gap is maintained between the stator and a permanent magnet array disposed on the rotor.

The rotor is coupled to an inner race of the third bearing and the axle is coupled to an outer race of the third bearing.

The first bearing is positioned at a first radius from a rotational axis of the electric motor and the second bearing is positioned at a second radius from the rotational axis, wherein the first radius is greater than the second radius.

The third bearing member is positioned at a third radius from the rotational axis, wherein the third radius is greater than the second radius and less than the first radius.

The stator is coupled to the rotor at the first end by the first bearing, and wherein the stator is mechanically fixed to the pump frame at the first end, wherein pump reaction forces generated by the fluid displacement member during pumping are transmitted to the pump frame via the drive, the rotor, the first bearing, and the stator.

The stator is coupled to the rotor at a rear end opposite the first end of the electric motor by a second bearing, the second bearing allowing rotational motion of the rotor relative to the stator, and wherein pump reaction forces generated by the fluid displacement member during pumping are transmitted to the pump frame via the drive, the rotor, the first bearing, the second bearing, and the stator.

In yet another example, a drive system for a reciprocating fluid displacement system includes an electric motor, a drive, a fluid displacement member, and a pump frame. The electric motor includes a stator and a rotor. The stator and rotor are disposed on an axis. The drive is coupled to the rotor at a first end of the electric motor. The fluid displacement member is mechanically coupled to the drive, wherein the drive converts rotational output from the rotor to linear, reciprocating input to the fluid displacement member. The pump frame is mechanically coupled to the electric motor. The pump reaction forces generated by the fluid displacement member during pumping are transmitted to the pump frame via the drive and the rotor.

The drive system of the preceding paragraph can optionally include, additionally and/or alternatively, any one or more of the following features, configurations, and/or additional components:

A first bearing disposed between the rotor and one of the stator and the pump frame at the first end. The first bearing supports a pump load. The pump load is an axial load along an axis of reciprocation of the pump.

Pump reaction forces generated by the fluid displacement member during pumping are transmitted to the pump frame via the drive, the rotor, and the first bearing.

Pump reaction forces generated by the fluid displacement member during pumping are transmitted to the pump frame via the drive, the rotor, the first bearing, and the stator.

A second bearing disposed between the rotor and the stator at a rear end of the electric motor opposite the first end, the second bearing positioned to experience pump loads.

The pump frame is mechanically fixed to the stator at the rear end and fully separated from the stator at the first end, and wherein pump reaction forces generated by the fluid displacement member during pumping are transmitted to the pump frame via the drive, the rotor, the second bearing, and the stator.

A third bearing disposed between the rotor and an axle of the stator at the first end to provide rotational movement of the rotor with respect to the stator and to maintain a gap between the stator a plurality of permanent magnets disposed on the rotor, wherein the rotor is coupled to an inner race of the third bearing and the axle is coupled to an outer race of the third bearing.

The third bearing is disposed axially between the first bearing and the second bearing.

The pump frame is mechanically fixed to the stator at the first end, and wherein pump reaction forces generated by the fluid displacement member during pumping are transmitted to the pump frame via the drive, the rotor, the second bearing, and the stator.

The first bearing is positioned at a first radius from a rotational axis of the electric motor and the second bearing is positioned at a second radius from the rotational axis, wherein the first radius is greater than the second radius.

In yet another example, a pumping apparatus includes a frame, at least two bearing, an electric motor, a drive, and a pump. The electric motor includes a stator and a rotor configured to output rotational motion. The rotor is supported by the at least two bearings, the at least two bearings supporting rotation of the rotor. The drive is configured to receive the rotational motion and convert the rotational motion into linear reciprocating motion. The pump includes a piston and a cylinder. The piston is configured to receive the linear reciprocating motion to reciprocate within the cylinder through an upstroke and a down stroke. The piston receives a downward reaction force when moving through the up stroke and an upward reaction force when moving through the down stroke. Both of the upward reaction force and the downward reaction force travel through the drive, the rotor, and then to the at least two bearings.

The pumping apparatus of the preceding paragraph can optionally include, additionally and/or alternatively, any one or more of the following features, configurations, and/or additional components:

The at least two bearings transfer rotational forces associated with rotation of the rotor and both of the upward and downward reaction forces to the frame.

In yet another example, a drive system for powering a reciprocating pump for pumping fluid to generate a fluid spray includes an electric motor, an eccentric drive member, and a drive. The electric motor includes a stator and a rotor. The rotor is configured to rotate on a rotational axis. The eccentric drive member extends from the rotor. The drive is coupled to the eccentric driver and is configured to drive reciprocation of a fluid displacement member.

The drive system of the preceding paragraph can optionally include, additionally and/or alternatively, any one or more of the following features, configurations, and/or additional components:

The eccentric drive member is directly coupled to the rotor and to the drive to provide a 1:1 ratio of rotor rotation to pump cycles of the fluid displacement member.

The eccentric drive member projects axially outward from an end of the rotor and is radially offset from the rotational axis.

The drive is coupled to the eccentric drive member by a bearing allowing relative movement between the eccentric drive member and the drive.

The eccentric drive member is integrally formed with the rotor.

The eccentric drive member extends into a bore formed in a body of the rotor and is fastened to the rotor within the bore.

The eccentric drive member comprises a sleeve and a bolt, wherein the sleeve is received in the bore of the rotor and the bolt is received in the sleeve and threadedly fastened to the rotor.

The rotor is formed from a housing that extends around the stator, wherein the housing comprises a permanent magnet array on an inner circumferential face of a body of the housing.

The housing comprises a first cylindrical projection extending axially along the rotational axis and including the eccentric drive member.

The first cylindrical projection extends in a first axial direction from a first end of the housing, and wherein the housing further comprises a second cylindrical projection, the second cylindrical projection extending in a second axial direction from the first end of the housing into an axle of the stator, the second axial direction opposite the first axial direction.

The eccentric drive member includes a pin that extends into each of the first cylindrical projection and the second projection.

The eccentric drive member is formed from a non-ferrous material.

A pump frame and wherein the first cylindrical projection is coupled to the pump frame.

The first cylindrical projection is coupled to the pump frame by a first bearing, wherein the first bearing allows rotational motion of the rotor with respect to the pump frame.

The housing extends through the first bearing such that the eccentric drive member and drive are disposed on an axially opposite side of the first bearing from the stator.

There are no gears coupling the rotor and the fluid displacement member.

In yet another example, a method of driving a reciprocating pump for generating a pressurized fluid spray for spraying onto a surface includes powering an electric motor to cause rotation of a rotor on a rotational axis, providing a rotational output from the rotor to a drive, and providing, by the drive, a linear reciprocating input to a fluid displacement member of the pump to cause reciprocation of the fluid displacement member along a pump axis to pump fluid. The rotor is connected to the fluid displacement member by the drive such that for one revolution of the rotor the fluid displacement pump proceeds through one pump cycle.

The method of the preceding paragraph can optionally include, additionally and/or alternatively, any one or more of the following features, configurations, additional components, and/or steps:

Providing the rotational output to the drive by an eccentric drive member coupled to and extending from the rotor, wherein the eccentric driver is configured radially offset from the rotational axis and rotates about the rotational axis.

In yet another example, a pumping system for pumping a fluid to generate a pressurized fluid spray includes an electric motor, an eccentric drive member, a drive, and a reciprocating pump. The electric motor includes a stator and a rotor. The rotor is configured to rotate on a rotational axis. The eccentric drive member extends from the rotor. The drive is coupled to the eccentric drive member to receive a rotational output from the rotor. The reciprocating pump includes a fluid displacement member coupled to the drive and a pump cylinder at least partially housing the fluid displacement member. The drive is configured to receive the rotational output from the motor and convert the rotational output into a linear reciprocating motion to drive reciprocation of the fluid displacement member.

The pumping system of the preceding paragraph can optionally include, additionally and/or alternatively, any one or more of the following features, configurations, and/or additional components:

The eccentric drive member is directly coupled to the rotor and to the drive to provide a 1:1 ratio of rotor rotation to pump cycles of the fluid displacement member.

The eccentric driver projects axially outward from an end of the rotor and away from the stator, and wherein the eccentric drive member is radially offset from the rotational axis of the rotor.

The eccentric drive member is integrally formed with a body of the rotor.

The rotor is rotationally coupled to a pump frame by a first bearing and wherein the eccentric driver and drive member are positioned on an axially opposite side of the first bearing from a permanent magnet array of the rotor.

In yet another example, a drive system for a reciprocating fluid displacement pump configured to pump a fluid for spraying of the fluid includes an electric motor, a drive, and a fluid displacement member. The electric motor includes a stator defining an axis, and a rotor disposed coaxially around the stator. The drive is connected to the rotor to receive a rotational output from the rotor. The fluid displacement member is mechanically coupled to the drive. The drive converts the rotational output to a linear, reciprocating input to the fluid displacement member to power pumping by the fluid displacement member.

The drive system of the preceding paragraph can optionally include, additionally and/or alternatively, any one or more of the following features, configurations, and/or additional components:

The fluid displacement member is mechanically coupled to the drive at a first axial end of the electric motor.

The electric motor further comprises a second axial end through which the electric motor is configured to receive electrical power, wherein the second axial end is disposed opposite the first axial end along the axis.

A pump frame mechanically supporting the electric motor and the fluid displacement member.

The electric motor is cantilevered from the pump frame.

The pump frame is mechanically coupled to each of the rotor and the stator.

A support member connects the pump frame to an axle of the stator at the second axial end such that the stator is fixed to the pump frame to prevent relative movement of the stator and the pump frame.

The support member extends around an exterior of the rotor from the pump frame to the axle.

The rotor comprises a housing and a permanent magnet array disposed on an inner circumferential face of the housing.

The housing is rotationally coupled to a pump frame at a first axial end of the electric motor, wherein the pump frame supports the fluid displacement member.

The stator is fixed to an axle and wherein the housing fully radially overlaps the stator and the axle at the first axial end and at least partially radially overlaps the stator at a second axial end of the electric motor disposed opposite the first end on the axis.

The housing includes an opening at the second axial end such that the housing is closed at the first axial end and open at the second axial end.

The axle extends axially outward through the opening and beyond the housing at the second axial end.

The pump frame is statically connected to a portion of the axle disposed outside of the housing such that the stator is fixed to the pump frame at the second axial end.

A pump frame supporting the electric motor, and a first bearing. The electric motor is dynamically supported by the pump frame at a first axial end of the electric motor that is coupled to the drive. The first bearing is disposed between the pump frame and the rotor at the first axial end to support the rotor on the pump frame and allow rotational motion of the rotor with respect to the pump frame.

The rotor extends through the pump frame and wherein the rotor is coupled to an inner race of the bearing and the pump frame is coupled to an outer race of the bearing.

The pump frame is mechanically coupled to the stator at a second axial end of the electric motor opposite the first axial end.

The rotor is formed by a cylindrical body having a first end wall at the first axial rotor end and a second end wall at a second axial rotor end opposite the first axial rotor end, wherein the first wall is closed to fully radially overlap the stator and wherein the second wall includes an opening extending therethrough and aligned on the axis.

In yet another example, method of driving a reciprocating pump to pump a fluid to generate a fluid spray for spraying onto a surface includes powering an electric motor to cause rotation of a rotor of the electric motor, the rotor disposed outside of and around a stator of the motor, receiving a rotational output from the rotor at a drive connected to the rotor, translating the rotational output, by the drive, to linear, reciprocating motion, and providing, by the drive, a linear reciprocating input to a fluid displacement member of the pump that is connected to the drive to cause the fluid displacement member to pump the fluid by reciprocation.

The method of the preceding paragraph can optionally include, additionally and/or alternatively, any one or more of the following features, configurations, additional components, and/or steps:

Receiving the rotational output from a first axial end of the electric motor and providing an electrical input to the electric motor to power the electric motor through a second axial end of the electric motor disposed opposite the first axial end.

Mechanically supporting the electric motor with a pump frame disposed at the first axial end and mechanically supporting the reciprocating pump with the pump frame.

Rotationally coupling the rotor to the pump frame at the first axial end and mechanically fixing the stator to the pump frame at the second axial end.

In yet another example, fluid displacement apparatus includes an electric motor, a drive, a pump, and a pump frame. The electric motor includes a stator defining an axis and a rotor disposed around the stator to rotate about the stator. The drive is connected to the rotor to receive a rotational output from the rotor and convert the rotational output to a linear reciprocating motion. The pump comprises a piston and a cylinder. The piston receives the linear reciprocating motion from the drive to reciprocate the piston within the cylinder. The cylinder and the stator are connected to the pump frame to stabilize both the stator relative to the rotor and the cylinder relative to the piston.

The fluid displacement apparatus of the preceding paragraph can optionally include, additionally and/or alternatively, any one or more of the following features, configurations, and/or additional components:

The pump frame is dynamically coupled to the rotor at a first axial end of the electric motor such that the rotor can move relative to the pump frame and the pump frame is statically coupled to an axle of the stator at a second axial end of the electric motor opposite the first axial end such that the stator is fixed relative to the pump frame.

One or more wires that extend into the stator at the second axial end, the one or more wires providing electrical power to operate the stator.

In yet another example, a pumping system includes an electric motor, a drive, a pump, and a pump frame. The electric motor includes a stator and a rotor. The stator and rotor are disposed on an axis. The drive is coupled to the rotor to receive a rotational output from the rotor and convert the rotational output to linear reciprocating motion. The pump includes a piston and a cylinder, the piston receiving the linear reciprocating motion from the drive to reciprocate the piston within the cylinder. The cylinder and the stator are connected to the pump frame to stabilize both the stator relative to the rotor and the cylinder relative to the piston. The pumping system can include any of the features of the pumping systems or apparatuses of the preceding paragraphs one or more of any feature referenced herein and/or shown in any one or more of the figures.

In yet another example, a sprayer includes an electric motor comprising a stator and a rotor, the rotor configured to output rotational motion; a drive that converts the rotational motion output by the electric motor into linear reciprocating motion; a pump including a piston configured to be linearly reciprocated by the drive; and a controller configured to output electrical energy to the electric motor to control operation of the electric motor.

The sprayer of the preceding paragraph can optionally include, additionally and/or alternatively, any one or more of the following features, configurations, and/or additional components:

The controller causes the electric motor to reverse rotational direction of the rotor between two modes. In a first mode, the rotor rotates clockwise making a plurality of complete revolutions to drive the piston through a first plurality of pumping strokes. In a second mode, the rotor rotates counterclockwise making a plurality of complete revolutions to drive the piston through a second plurality of pumping strokes.

The controller causes the rotor to switch between the first mode and the second mode periodically.

The controller causes the rotor to switch between the first mode and the second mode periodically based on a time-based schedule.

The controller causes the rotor to switch between the first mode and the second mode based on ceasing supply of electrical energy to the electric motor.

The controller causes the electric rotor to switch between the first mode and the second mode based on turning the sprayer on and off.

The controller causes the rotor to switch between the first mode and the second mode based on stalling of the rotor.

The switch between the first mode and the second mode is based on reaching a locked rotor condition.

The controller causes the rotor to switch between the first mode and the second mode based on a rotational speed of the rotor.

The controller causes the rotor to switch between the first mode and the second mode based on a parameter of spray fluid measured downstream of the pump.

The controller causes the electric rotor to switch between the first mode and the second mode based on the measured parameter not meeting the set pressure within a predetermined period of time even while the piston is reciprocated by the rotor.

The parameter is pressure.

The controller causes the rotor to switch between the first mode and the second mode based on the measured parameter not meeting a set pressure.

The controller causes the electric motor to switch between the first mode and the second mode based on the measured parameter not meeting the set pressure within a predetermined period of time while the piston is reciprocated by the rotor.

The controller is configured to deliver driving electric energy to the electric motor when the rotor is stalled due to a resistance of spray fluid applied to the piston at a pressure level and the controller is configured to continue to deliver driving electrical energy to the electric motor so that the rotor is urged forward while the rotor is stalled and so that pressure continues to be applied to the piston through the rotor and the drive and the rotor resumes rotating when spray fluid pressure decreases.

The pressure level is set by the user.

The rotor resumes rotating when spray fluid pressure decreases below the pressure level.

The controller is configured to cease delivering driving electrical energy to the electric motor based on the rotor being stalled for a predetermined period of time.

The predetermined period of time is at least five minutes.

A fluid sensor configured to monitor a parameter of the spray fluid output by the pump. The controller is configured to monitor the parameter while the controller has ceased delivering driving electrical energy to the electric motor and, based on a change in the parameter, resume delivering electrical energy to the electric motor to rotate the rotor to operate the pump.

The controller is configured to cease delivering driving electrical energy to the electric motor based on a sensed temperature of the electric motor or surrounding ambient air.

A temperature sensor configured to monitor a temperature of the electric motor and/or surrounding ambient air.

The controller causes the electric rotor to switch between the first mode and the second mode based on a parameter of electrical energy being delivered to the motor exceeding a threshold.

The parameter is electrical current.

The controller causes the electric rotor to switch between the first mode and the second mode based on the measured parameter not meeting the set pressure within a predetermined period of time even while the piston is reciprocated by the rotor.

The controller is configured to stall the rotor based on resistance from spray fluid through the rotor.

The controller is configured to stall the rotor based on resistance from spray fluid through the rotor at a pressure level.

The controller is configured to continue to deliver electrical energy to the electrical motor so that the rotor is urged forward while the rotor is stalled so that pressure continues to be applied to the piston while it is stalled through the rotor and the drive.

The controller is configured to continue to deliver electrical energy to the electrical motor so that the rotor is urged forward while the rotor is stalled so that pressure continues to be applied to the piston while it is stalled through the rotor and the drive, and the rotor resumes rotating when spray fluid pressure decreases.

The controller is configured to continue to deliver electrical energy to the electrical motor so that the rotor is constantly urged forward while the rotor is stalled so that pressure continues to be applied to the piston while it is stalled through the rotor and the drive and so that the rotor resumes rotating when spray fluid pressure decreases below a pressure level due to the constant urging on the rotor causing the piston to overcome the lower pressure of the spray fluid.

While the invention has been described with reference to preferred embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A fluid sprayer comprising:

an electric motor comprising a stator and a rotor, the stator and rotor disposed on an axis;

a drive coupled to the rotor and configured to convert a rotational output of the rotor into reciprocating linear motion;

a pump comprising a fluid displacement member mechanically coupled to the drive to be reciprocated by the drive;

a fluid outlet that sprays the fluid output by the pump;

a controller configured to output driving electrical energy to the electric motor to control operation of the electric motor;

wherein the controller is configured to receive a pressure setting that is set by a user and control a level of power provided to the electric motor based on the pressure setting such that the rotor stalls while power is delivered to the electric motor to control output spray pressure relative to the pressure setting; and wherein the controller is configured to vary the level of power provided to the electric motor while the rotor is stalled by varying a current level provided to the electric motor and such that the current level is lower during at least a portion of the rotor stall than at a start of the rotor stall.

2. The fluid sprayer assembly of claim 1, wherein the controller is configured to deliver the driving electrical energy to the electric motor while the rotor remains stalled due to a resistance of spray fluid applied to the piston, and wherein the controller is configured to continue to deliver the driving electrical energy to the electric motor so that the rotor urges the fluid displacement member while the rotor remains stalled so that pressure continues to be applied to the fluid displacement member through the rotor and the drive with the rotor stationary.

3. The fluid sprayer assembly of claim 1, wherein the rotor resumes rotating from the stall when spray fluid pressure downstream from the pump decreases due to resumption of spraying from the spray gun.

4. The fluid sprayer assembly of claim 1, wherein the controller is configured to cease delivering the electrical energy to the electric motor based on the rotor being stalled for a period of time.

5. The fluid sprayer assembly of claim 4, wherein the period of time is a predetermined period of time.

6. The fluid sprayer assembly of claim 5, wherein the period of time is greater than ten seconds.

7. The fluid sprayer assembly of claim 5, wherein the period of time is greater than five minutes.

8. The fluid sprayer assembly of claim 1, further comprising a fluid sensor configured to monitor a parameter of the spray fluid output by the pump, wherein the controller is configured to:

monitor the parameter while the controller has ceased delivering the driving electrical energy to the electric motor, and resume, based on a change in the parameter, delivering the driving electrical energy to the electric motor to rotate the rotor to operate the pump.

9. The fluid sprayer assembly of claim 8, wherein the parameter is a fluid pressure output by the pump.

10. The fluid sprayer assembly of claim 1, further comprising:

a pressure transducer configured to generate pressure information regarding a fluid pressure output by the pump;

wherein the controller is configured to determine the power level of the driving electrical energy provided to the electric motor based on the pressure information output by the pressure transducer.

11. A fluid sprayer assembly comprising:

an electric motor comprising a stator and a rotor, the stator and rotor disposed on an axis;

a drive coupled to the rotor and configured to convert a rotational output of the rotor into reciprocating linear motion;

a pump comprising a fluid displacement member mechanically coupled to the drive to be reciprocated by the drive;

a fluid outlet that sprays the fluid output by the pump;

a controller configured to output driving electrical energy to the electric motor to control operation of the electric motor, wherein the controller is configured to receive a pressure setting that is set by a user and control a level of power provided to the electric motor based on the pressure setting such that the rotor stalls while power is delivered to the electric motor to control output spray pressure relative to the pressure setting; and a motor sensor configured to sense rotation of the rotor on the axis, wherein the controller is configured to control the level of power provided to the electric motor based on an output from the motor sensor regarding a rotational status of the rotor.

12. A fluid sprayer assembly comprising:

an electric motor comprising a stator and a rotor, the stator and rotor disposed on an axis;

a drive coupled to the rotor and configured to convert a rotational output of the rotor into reciprocating linear motion;

a pump comprising a fluid displacement member mechanically coupled to the drive to be reciprocated by the drive;

a fluid outlet that sprays the fluid output by the pump;

a controller configured to output driving electrical energy to the electric motor to control operation of the electric motor;

wherein the controller is configured to receive a pressure setting that is set by a user and control a level of power provided to the electric motor based on the pressure setting such that the rotor stalls while power is delivered to the electric motor to control output spray pressure relative to the pressure setting; and wherein the controller is configured to initiate a count based on the rotor stalling, and wherein the controller is configured to stop providing the driving electrical energy to the electric motor based on the count reaching a count threshold.

13. The fluid sprayer assembly of claim 12, wherein the count is a temporal count and the count threshold is a temporal threshold.

14. A fluid sprayer comprising:

an electric motor comprising a stator and a rotor, the stator and rotor disposed on an axis;

a drive coupled to the rotor and configured to convert a rotational output of the rotor into reciprocating linear motion;

a pump comprising a fluid displacement member mechanically coupled to the drive to be reciprocated by the drive;

a fluid outlet that sprays the fluid output by the pump;

a controller configured to output driving electrical energy to the electric motor to control operation of the electric motor;

wherein the controller is configured to receive a pressure setting that is set by a user and control a level of power provided to the electric motor based on the pressure setting such that the rotor stalls while power is delivered to the electric motor to control output spray pressure relative to the pressure setting; and wherein:

the electric motor includes a first axial end and a second axial end;

the rotor includes a housing with an opening at the second axial end;

the stator is located at least partially inside of the rotor;

a support frame supports the electric motor;

a stator support extends through the opening of the housing and holds the stator stationary relative to the support frame; and the pump is located closer to the first end of the electric motor than to the second end of the electric motor.

15. A method of spraying fluid by a fluid sprayer, the method comprising:

receiving, by a controller of an electric motor, a pressure setting that is set by a user, the pressure setting corresponding to a set output pressure for a pump, the pump connected to the electric motor by a drive to be driven by the electric motor via the drive and pump fluid downstream to a fluid outlet for spraying, the electric motor including a stator and a rotor configured to rotate on an axis;

providing, by the controller, driving electrical energy to the electric motor to power the electric motor; and controlling, by the controller, a level of electric current provided to the electric motor based on the pressure setting such that the rotor stalls while power is delivered to the electric motor to control output spray pressure relative to the pressure setting; and reducing the level of electric current provided to the electric motor while the rotor stalls to reduce a force applied by the rotor while continuing to urge the rotor by the reduced level of electric current; and increasing the level of electric current provided to the electric motor after reducing the level of electric current to increase the force applied by the rotor and cause pumping by the pump.

16. The method of claim 15, further comprising:

delivering the driving electrical energy to the electric motor while the rotor remains stalled due to a resistance of spray fluid applied to the piston, and continuing to deliver the driving electrical energy to the electric motor so that the rotor urges the fluid displacement member while the rotor remains stalled so that pressure continues to be applied to the fluid displacement member through the rotor and the drive with the rotor stationary.

17. The method of claim 15, further comprising:

resuming rotation of the rotor from the stall when spray fluid pressure downstream from the pump decreases due to resumption of spraying from the spray gun.

18. The method of claim 15, further comprising:

stopping, by the controller, delivery of the driving electrical energy to the electric motor based on the rotor being stalled for a period of time.

19. A method of spraying fluid by a fluid sprayer, the method comprising:

receiving, by a controller of an electric motor, a pressure setting that is set by a user, the pressure setting corresponding to a set output pressure for a pump, the pump connected to the electric motor by a drive to be driven by the electric motor via the drive and pump fluid downstream to a fluid outlet for spraying, the electric motor including a stator and a rotor configured to rotate on an axis;

providing, by the controller, driving electrical energy to the electric motor to power the electric motor; and controlling, by the controller, a level of power provided to the electric motor based on the pressure setting such that the rotor stalls while power is delivered to the electric motor to control output spray pressure relative to the pressure setting;

stopping, by the controller, delivery of the driving electrical energy to the electric motor based on the rotor being stalled for a period of time, wherein stopping, by the controller, delivery of the driving electrical energy to the electric motor based on the rotor being stalled for a period of time comprises:

initiating a count based on the rotor stopping rotation while the controller continues providing the driving electrical energy; and stopping, by the controller, of the delivery of the driving electrical energy to the electric motor based on the count reaching a count threshold.

* * * * *